US011528692B2

(12) United States Patent
Papasakellariou

(10) Patent No.: US 11,528,692 B2
(45) Date of Patent: Dec. 13, 2022

(54) SCHEDULING UPLINK TRANSMISSIONS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 16/782,924

(22) Filed: Feb. 5, 2020

(65) Prior Publication Data

US 2020/0178226 A1 Jun. 4, 2020

Related U.S. Application Data

(63) Continuation of application No. 15/452,665, filed on Mar. 7, 2017, now Pat. No. 10,568,081.

(60) Provisional application No. 62/310,913, filed on Mar. 21, 2016, provisional application No. 62/312,033, filed on Mar. 23, 2016, provisional application No. 62/313,900, filed on Mar. 28, 2016, provisional application No. 62/330,966, filed on May 3, 2016, provisional application No. 62/335,353, filed on May 12, 2016.

(51) Int. Cl.
*H04W 72/04* (2009.01)
*H04L 1/18* (2006.01)
*H04W 52/14* (2009.01)
*H04W 52/28* (2009.01)

(52) U.S. Cl.
CPC ......... *H04W 72/042* (2013.01); *H04L 1/1861* (2013.01); *H04W 52/143* (2013.01); *H04W 52/281* (2013.01)

(58) Field of Classification Search
CPC ............... H04L 5/0055; H04L 1/1896; H04L 1/1628; H04L 1/1864; H04W 24/10
See application file for complete search history.

(56) References Cited

U.S. PATENT DOCUMENTS

| 2011/0164489 A1 | 7/2011 | Papasakellariou et al. |
| 2012/0250656 A1* | 10/2012 | Noh ................ H04L 27/2607 370/330 |
| 2013/0044711 A1 | 2/2013 | Aiba et al. |

(Continued)

FOREIGN PATENT DOCUMENTS

| CN | 104901775 A | 9/2015 |
| CN | 105009499 A | 10/2015 |

(Continued)

OTHER PUBLICATIONS

Notice of Allowance dated May 26, 2021 in connection with Chinese Patent Application No. 2017800180133, 5 pages.

(Continued)

*Primary Examiner* — Romani Ohri

(57) ABSTRACT

For scheduling transmissions of data channels, control channels, or random access channels using downlink control information (DCI) formats, a DCI format can configure a transmission of one or multiple data channels over respective one or multiple transmission time intervals. A first DCI format can configure the parameters for a channel transmission and a second DCI format can trigger the channel transmission and indicate respective one or more transmission time intervals.

20 Claims, 34 Drawing Sheets

(56) References Cited

U.S. PATENT DOCUMENTS

| | | | |
|---|---|---|---|
| 2013/0083695 | A1 | 4/2013 | Narasimha et al. |
| 2013/0128838 | A1* | 5/2013 | Montojo ............ H04W 72/042 370/329 |
| 2013/0301586 | A1* | 11/2013 | Fan ...................... H04L 1/1607 370/329 |
| 2014/0078974 | A1 | 3/2014 | Falahati et al. |
| 2014/0198701 | A1* | 7/2014 | Ostergaard ............ H04W 76/20 370/311 |
| 2014/0198733 | A1* | 7/2014 | Yin ........................ H04L 1/1812 370/329 |
| 2014/0204853 | A1 | 7/2014 | Ko et al. |
| 2014/0269452 | A1 | 9/2014 | Papasakellariou |
| 2014/0293893 | A1* | 10/2014 | Papasakellariou .......................... H04W 72/0446 370/329 |
| 2014/0328260 | A1 | 11/2014 | Papasakellariou et al. |
| 2015/0085797 | A1 | 3/2015 | Ji et al. |
| 2015/0208262 | A1 | 7/2015 | Siomina |
| 2015/0282134 | A1* | 10/2015 | Suzuki ................ H04L 27/2602 370/329 |
| 2016/0044638 | A1 | 2/2016 | Gao et al. |
| 2016/0050667 | A1 | 2/2016 | Papasakellariou et al. |
| 2016/0165591 | A1* | 6/2016 | Li ...................... H04W 72/0413 370/280 |
| 2016/0255676 | A1* | 9/2016 | Vajapeyam ......... H04W 74/006 370/329 |
| 2016/0345299 | A1 | 11/2016 | Suzuki et al. |
| 2016/0374084 | A1* | 12/2016 | Zhang .................. H04L 1/1896 |
| 2017/0150367 | A1 | 5/2017 | Han et al. |
| 2017/0318564 | A1 | 11/2017 | Lee et al. |
| 2018/0152923 | A1* | 5/2018 | Xiong .................. H04L 5/0053 |

FOREIGN PATENT DOCUMENTS

| | | |
|---|---|---|
| CN | 105323049 A | 2/2016 |
| EP | 2871883 A1 | 5/2015 |
| KR | 10-2012-0135871 A | 12/2012 |
| WO | 2015/111323 A1 | 7/2015 |
| WO | 2015113613 A1 | 8/2015 |

OTHER PUBLICATIONS

Office Action dated Mar. 18, 2021 in connection with Korean Patent Application No. 10-2018-7022384, 7 pages.
Weixin, "Hybrid Auto Retransl request (HARQ)", Sep. 29, 2019, 2 pages.
Notification of the First Office Action dated Nov. 4, 2020 in connection with Chinese Application No. 201780018013.3, 8 pages.
Examination Report in connection with Indian Patent Application No. 201837025798 dated Jul. 15, 2020, 8 pages.
Nokia Networks, Alcatel-Lucent, Alcatel-Lucent Shanghai Bell, "On LTE FS3 enhancements to support LAA UL," R1-160773, 3GPP TSG-RAN WG1 Meeting #84, St. Julian's, Malta, Feb. 15-19, 2016, 4 pages.
Non-Final Office Action dated Jul. 21, 2021, in connection to related U.S. Appl. No. 16/779,185, 15 pages.
Korean Intellectual Property Office, Notification of a Decision to Grant a Patent dated Dec. 29, 2021 regarding Application No. 10-2021-7038308, 4 pages.
Ericsson, "NB-IoT—DCI content", 3GPP TSG-RAN1—Ad Hoc NB-IoT, R1-161821, Mar. 2016, 3 pages.
Extended European Search Report dated Oct. 7, 2021 regarding Application No. 21186728.8, 5 pages.

\* cited by examiner

SCHEDULING UPLINK TRANSMISSIONS

CROSS-REFERENCE TO RELATED APPLICATION AND CLAIMS OF PRIORITY

This application is a continuation of U.S. Non-Provisional patent application Ser. No. 15/452,665 filed Mar. 7, 2017, now U.S. Pat. No. 10,568,061, and claims priority to: U.S. Provisional Patent Application No. 62/310,913 filed on Mar. 21, 2016; U.S. Provisional Patent Application No. 62/312,033 filed on Mar. 23, 2016; U.S. Provisional Patent Application No. 62/313,900 filed on Mar. 28, 2016; U.S. Provisional Patent Application No. 62/330,966 filed on May 3, 2016; and U.S. Provisional Patent Application No. 62/335,353 filed on May 12, 2016. The above-identified patent documents are incorporated herein by reference.

TECHNICAL FIELD

The present disclosure relates generally to wireless communication systems and, more specifically, to scheduling transmissions and receptions of data channels, control channels, or random access channels.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is important.

SUMMARY

Embodiments of the present disclosure provide methods and apparatus for scheduling transmissions and receptions of data channels, control channels, or random access channels.

In a first embodiment, a UE includes a receiver and a transmitter. The receiver is configured to receive a downlink control information (DCI) format that configures transmissions of a number of physical uplink data channels (PUSCHs) over a number of subframes up to a predetermined maximum number of $N_{SF}$ subframes. The DCI format includes a number of subframes field that is represented by $\lceil \log_2(N_{SF}) \rceil$ bits and indicates a number $n_{SF} \le N_{SF}$ of subframes for $n_{SF}$ PUSCH transmissions. The DCI format also includes a timing offset field that includes a timing offset $o_t$ for a subframe of a first of the PUSCH transmissions that is determined as $n+k+o_t$, n is the subframe of the DCI format reception, and k is a minimum number of subframes for a PUSCH transmission after the DCI format reception. The DCI format further includes a hybrid automatic repeat request (HARQ) process number field that is represented by $\lceil \log_2(N_{HARQ}) \rceil$ bits and indicates a HARQ process number $n_{HARQ}$ from a total of $N_{HARQ}$ HARQ processes. HARQ process number $n_Q$ applies for the first PUSCH transmission, HARQ process number $(n_{HARQ}+j-1) \bmod N_{HARQ}$ applies for a j-th of the PUSCH transmissions, and $1 \le j \le n_{SF}$. The DCI format additionally includes a new data indicator (NDI) field that is represented by $N_{SF}$ bits and indicates whether a PUSCH transmission, from the $n_{SF}$ PUSCH transmissions, conveys a new data transport block (TB) or a retransmission of a data TB. $\lceil \; \rceil$ is a ceiling function that rounds a number to its immediately next larger integer and $\log_2(x)$ is a logarithm function with base 2 resulting a logarithm with base 2 for number x. The transmitter is configured to transmit the $n_{SF}$ PUSCH transmissions over the $n_{SF}$ subframes.

In a second embodiment, a base station includes a transmitter and a receiver. The transmitter is configured to transmit a DCI format that configures transmissions of a number of PUSCHs over a number of subframes up to a predetermined maximum number of $N_{SF}$ subframes. The DCI format includes a number of subframes field that is represented by $\lceil \log_2(N_{SF}) \rceil$ bits and indicates a number $n_{SF} \le N_{SF}$ of subframes for $n_{SF}$ PUSCH transmissions. The DCI format also includes a timing offset field that includes a timing offset $o_t$ for a subframe of a first of the PUSCH transmissions that is determined as $n+k+o_t$, n is the subframe of the DCI format reception, and k is a minimum number of subframes for a PUSCH transmission after a DCI format reception. The DCI format further includes a HARQ process number field that is represented by $\lceil \log_2(N_{HARQ}) \rceil$ bits and indicates a HARQ process number $n_{HARQ}$ from a total of $N_{HARQ}$ HARQ processes. HARQ process number n applies for the first PUSCH transmission, HARQ process number $(n_{HARQ}+j-1) \bmod N_{HARQ}$ applies for a j-th of the PUSCH transmissions, and $1 \le j \le n_{SF}$. The DCI format additionally includes a new data indicator (NDI) field that is represented by $N_{SF}$ bits and indicates whether a PUSCH transmission, from the $n_{SF}$ PUSCH transmissions, conveys a new data TB or a retransmission of a data TB. $\lceil \; \rceil$ is a ceiling function that rounds a number to its immediately next larger integer and $\log_2(x)$ is a logarithm function with base 2 resulting a logarithm with base 2 for number x. The receiver is configured to receive the $n_{SF}$ PUSCH transmissions over the $n_{SF}$ subframes.

In a third embodiment, a UE includes a receiver and a transmitter. The receiver is configured to receive a first DCI format in a subframe having a first index that configures parameters for a transmission of a channel. The receiver is also configured to receive a second DCI format in a subframe having a second index that triggers the transmission of the channel. The transmitter is configured to transmit the channel in a subframe having a third index.

In a fourth embodiment, a base station includes a transmitter and a receiver. The transmitter is configured to transmit a first DCI format in a subframe having a first index that configures parameters for a transmission of a channel. The transmitter is also configured to transmit a second DCI format in a subframe having a second index that triggers the transmission of the channel. The receiver is configured to receive the channel in a subframe having a third index.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
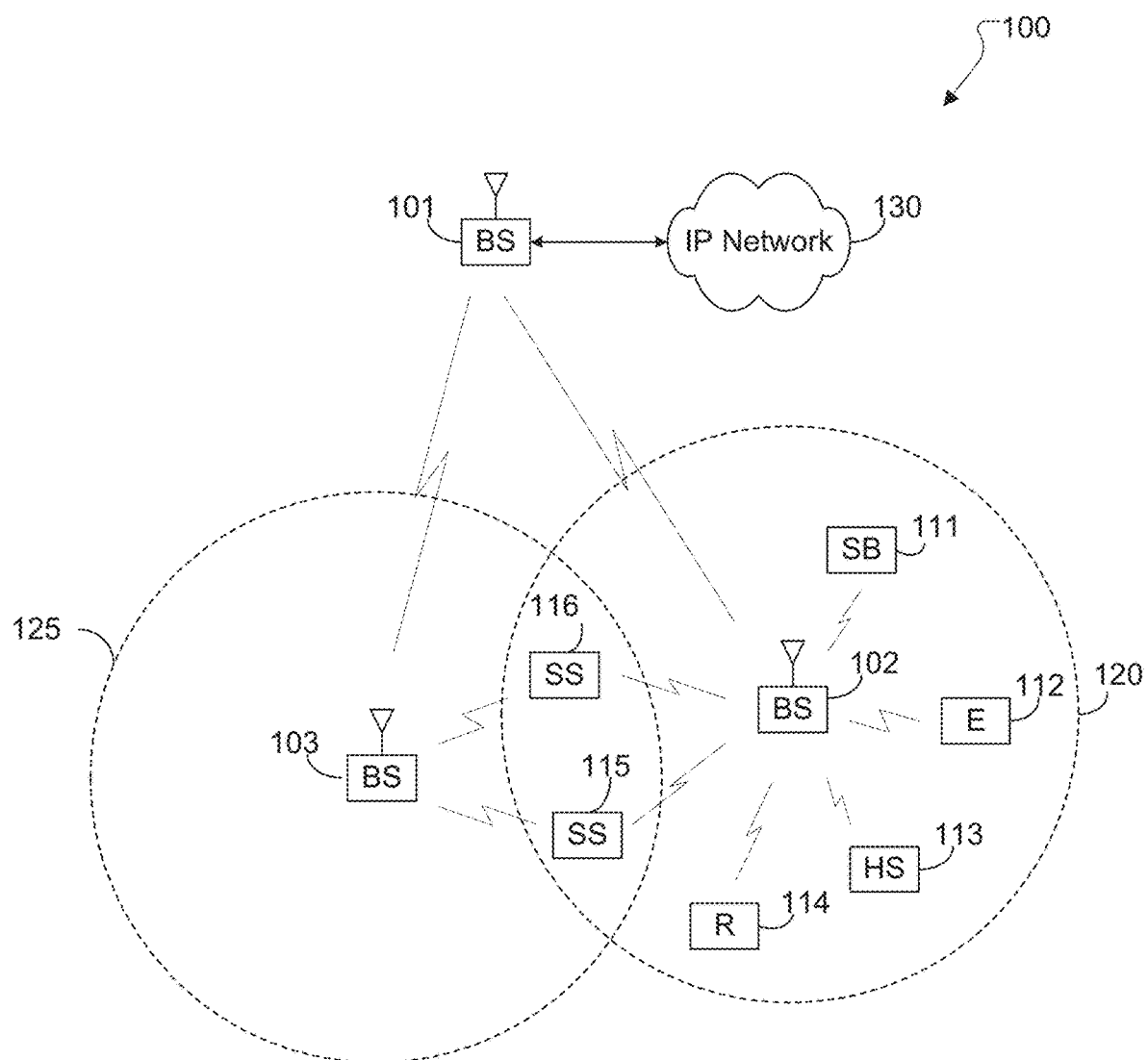
FIG. 1 illustrates an example wireless network according to this disclosure.

FIGS. 1 through 34, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any suitably arranged wireless communication system.

The following documents and standards descriptions are hereby incorporated by reference into the present disclosure as if fully set forth herein:

TS 36.211 v13.1.0, "E-UTRA, Physical channels and modulation" ("REF 1"); 3GPP TS 36.212 v13.1.0, "E-UTRA, Multiplexing and Channel coding" ("REF 2"), 3GPP TS 36.213 v13.1.0, "E-UTRA, Physical Layer Procedures" ("REF 3"); 3GPP TS 36.321 v13.1.0, "E-UTRA, Medium Access Control (MAC) protocol specification" ("REF 4"); 3GPP TS 36.331 v13.1.0, "E-UTRA, Radio Resource Control (RRC) Protocol Specification" ("REF 5"); ETSI EN 301 893 V1.7.1, Harmonized European Standard, "Broadband Radio Access Networks (BRAN); 5 GHz high performance RLAN" ("REF 6"); and IEEE, "Part 11: Wireless LAN Medium Access Control (MAC) and Physical Layer (PHY) Specifications", http://standards.ieee.org/get-ieee802/802.11.html. ("REF 7")

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System.'

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In this disclosure, a UE is also commonly referred to as a terminal or a mobile station, can be fixed or mobile, and can be a cellular phone, a personal computer device, or an automated device. An eNB is generally a fixed station and can also be referred to as a base station, an access point, or other equivalent terminology.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support scheduling uplink transmissions and random access in unlicensed carriers.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
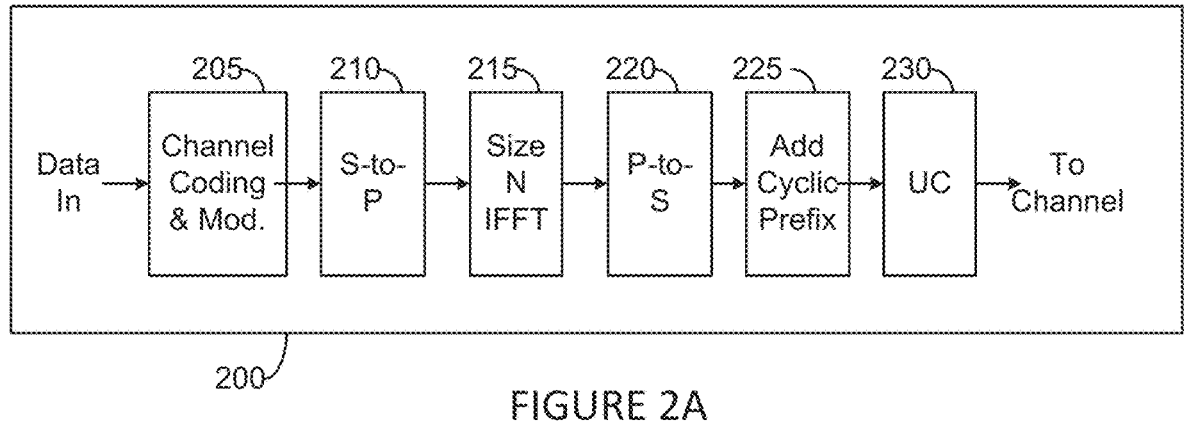
FIGS. 2A and 2B illustrate example wireless transmit and receive paths according to this disclosure.
Figure 2B:
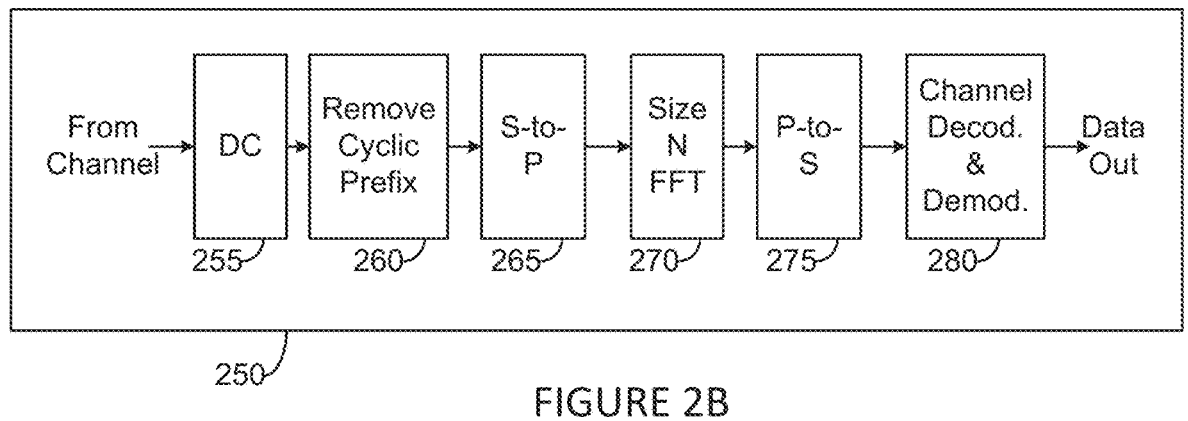

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support scheduling uplink transmissions and random access in unlicensed carriers.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
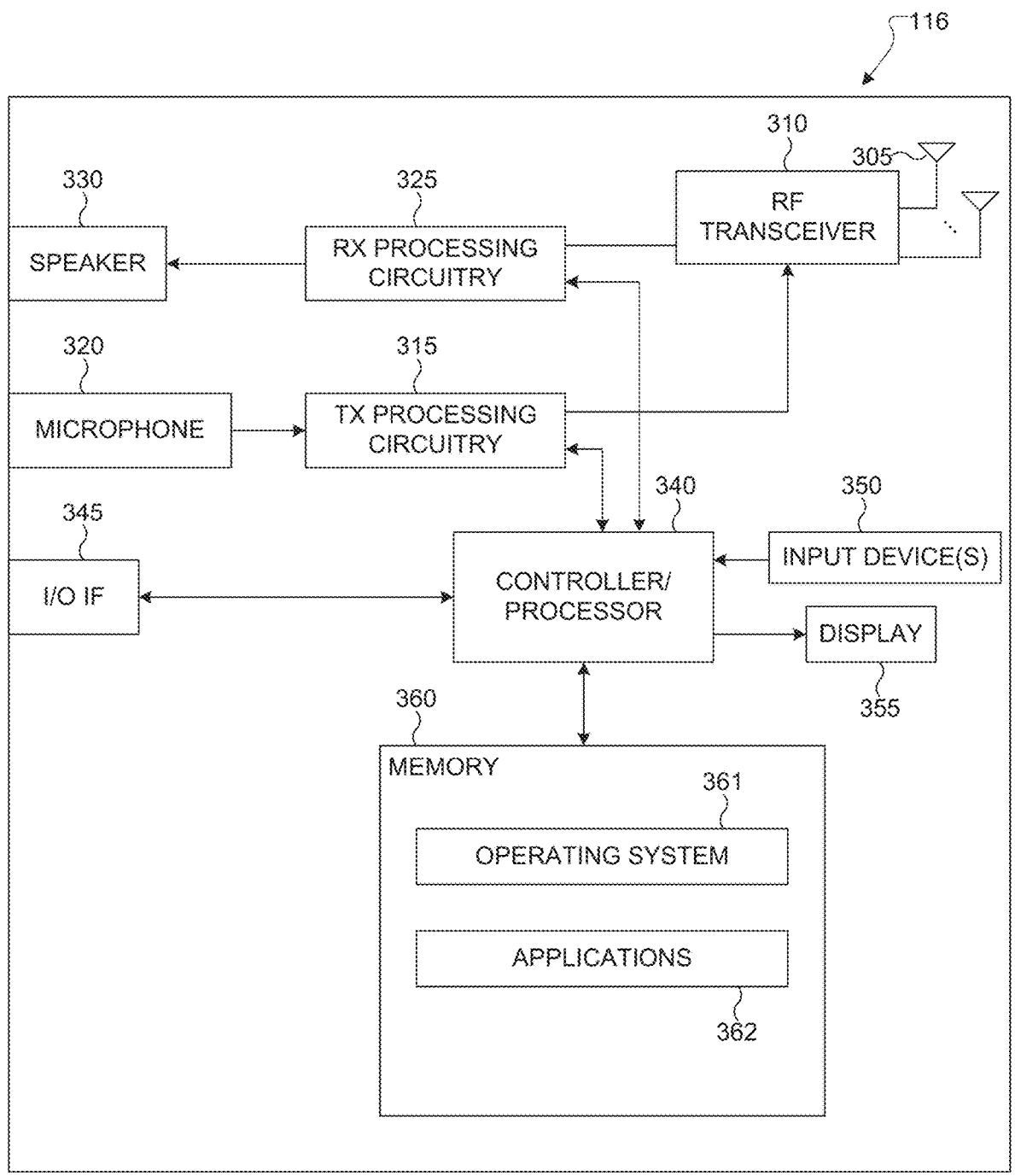
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
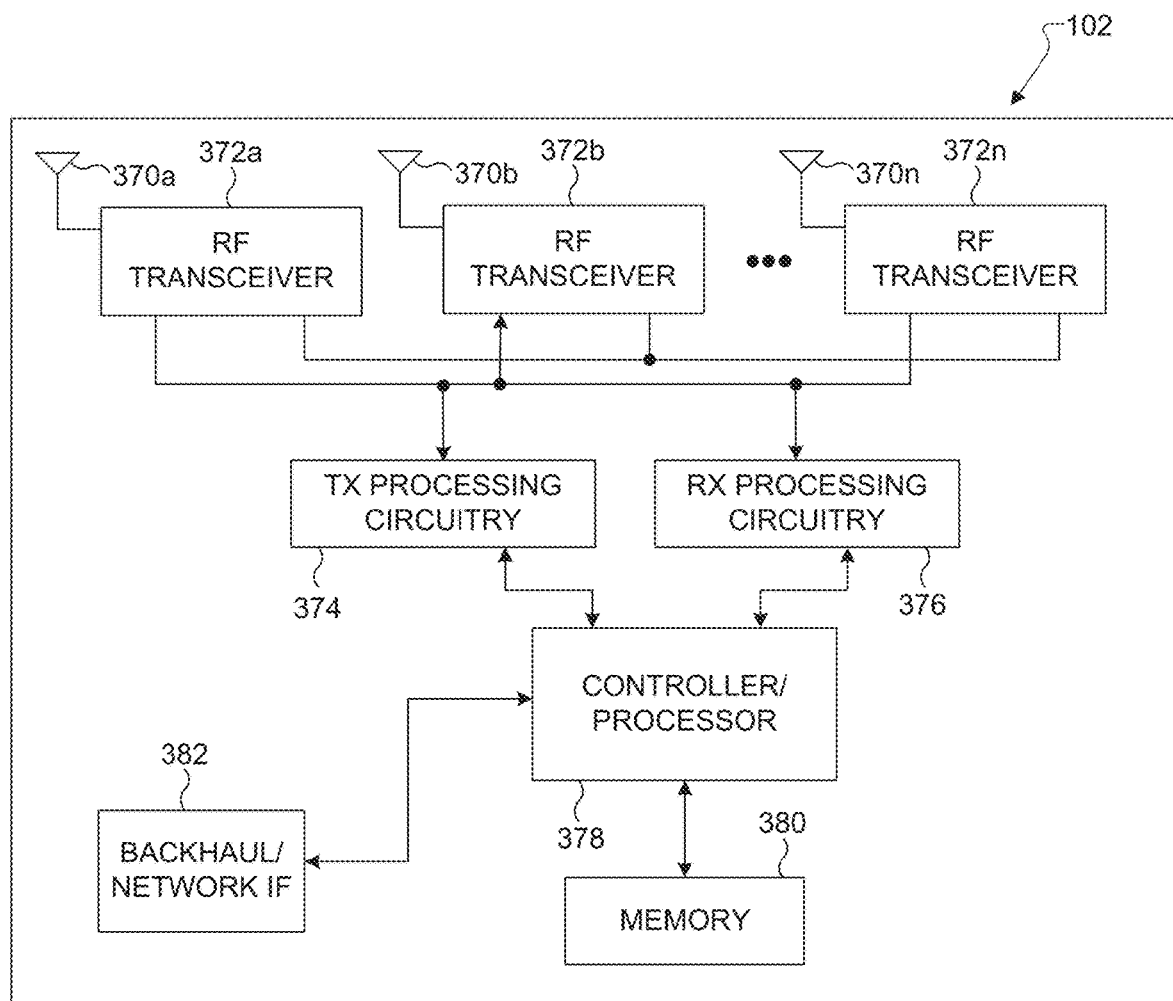
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting scheduling uplink transmissions and random access in unlicensed carriers as described in embodiments of the present disclosure. In some embodiments, the controller/processor 378 supports communications between entities, such as web RTC. The controller/ processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of Frequency Division Duplexing (FDD) cells and Time Division Duplexing (TDD) cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

A communication system includes a downlink (DL) that conveys signals from transmission points such as base stations or eNBs to UEs and an uplink (UL) that conveys signals from UEs to reception points such as eNBs. A UE, also commonly referred to as a terminal or a mobile station, may be fixed or mobile and may be a cellular phone, a personal computer device, or an automated device. An eNB, which is generally a fixed station, may also be referred to as an access point or other equivalent terminology.

Downlink (DL) transmissions from an eNB to a UE or uplink (UL) transmissions from the UE to the eNB can be in one or more licensed frequency bands, in one or more unlicensed frequency bands, or both in one or more unlicensed frequency bands and one or more licensed frequency bands. In an unlicensed frequency band, an eNB and a UE typically content for access as the unlicensed frequency band needs to be shared with other radio access technologies, such as Wi-Fi based ones, or with other operators deploying communications with respective eNB and UEs in the unlicensed band. Conversely, in a licensed frequency band, it is not necessary for an eNB and a UE to content for access and when contention happens, the associated mechanism can be controlled by the operator.

In some wireless networks, DL signals include data signals conveying information content, control signals conveying DL control information (DCI), and reference signals (RS) that are also known as pilot signals. An eNB transmits data information or DCI through respective physical DL shared channels (PDSCHs) or physical DL control channels (PDCCHs). The PDCCH can be an enhanced PDCCH (EPDDCH) but the term PDCCH will be used for brevity to denote PDCCH or EPDCCH. A PDCCH is transmitted over one or more control channel elements (CCEs). An eNB transmits one or more of multiple types of RS including a UE-common RS (CRS), a channel state information RS (CSI-RS), and a demodulation RS (DMRS). A CRS is transmitted over a DL system bandwidth (BW) and can be used by UEs to demodulate data or control signals or to perform measurements. To reduce CRS overhead, an eNB can transmit a CSI-RS with a smaller density in the time and/or frequency domain than a CRS. For channel measurement, non-zero power CSI-RS (NZP CSI-RS) resources can be used. For interference measurement reports (IMRs), CSI interference measurement (CSI-IM) resources associated with zero power CSI-RS (ZP CSI-RS) resources can be used [3]. A CSI process includes NZP CSI-RS and CSI-IM resources. DMRS is transmitted only in the BW of a respective PDSCH and a UE can use the DMRS to demodulate information in a PDSCH.

In some implementations, UL signals also include data signals conveying information content, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH or the UE can transmit data and some UCI in a PUSCH and transmit remaining UCI in a PUCCH when the eNB configures the UE for simultaneous PUSCH and PUCCH transmission. UCI includes hybrid automatic repeat request acknowledgement (HARQ-ACK) information, indicating correct or incorrect detection of data transport blocks (TBs) in a PDSCH, scheduling request (SR) indicating whether a UE has data in its buffer, and CSI enabling an eNB to select appropriate parameters for link adaptation of PDSCH or PDCCH transmissions to a UE.

CSI includes a channel quality indicator (CQI) informing an eNB of a DL signal to interference and noise ratio (SINR) experienced by the UE, a precoding matrix indicator (PMI) informing an eNB how to apply beam-forming for DL transmissions to the UE, and a rank indicator (RI) informing the eNB of a rank for a PDSCH transmission. UL RS includes DMRS and sounding RS (SRS). A UE transmits DMRS only in a BW of a respective PUSCH or PUCCH and an eNB can use a DMRS to demodulate information in a PUSCH or PUCCH. A UE transmits SRS to provide an eNB with an UL CSI. A SRS transmission from a UE can be periodic (P-SRS, or trigger type 0 SRS) or aperiodic (A-SRS, or trigger type 1 SRS) as triggered by a SRS request field included in a DCI format conveyed by a PDCCH scheduling PUSCH or PDSCH.

A transmission time interval (TTI) for DL transmission or for UL transmission is referred to as a subframe (SF) and includes two slots. A unit often SFs is referred to as a system frame. A system frame is identified by a system frame number (SFN) ranging from 0 to 1023 and can be represented by 10 binary elements (or bits). A BW unit for a DL transmission or for an UL transmission is referred to as a resource block (RB), one RB over one slot is referred to as a physical RB (PRB), and one RB over one SF is referred to as a PRB pair. An RB includes of $N_{sc}^{RB}$ sub-carriers. One sub-carrier over a SF symbol is referred to as resource element (RE). For example, a SF can have duration of one millisecond and a RB can have a bandwidth of 180 KHz and include 12 REs with inter-RE spacing of 15 KHz. A RE is identified by the pair of indexes (k,l) where k is a frequency domain index and l in a time domain index. An eNB informs parameters for a PDSCH transmission to a UE or parameters for a PUSCH transmission from the UE, through a DCI format with cyclic redundancy check (CRC) scrambled by a cell radio network temporary identifier (C-RNTI), that is conveyed in a PDCCH the eNB transmits to the UE and is respectively referred to as DL DCI format or UL DCI format.

In some implementations, a UE decodes a DCI format 1A for PDSCH scheduling and a DCI format 0 for PUSCH scheduling. These two DCI formats are designed to have a same size and are often jointly referred to as DCI format 0/1A. Another DCI format, DCI format 1C, can schedule a PDSCH providing SIBs, or a random access response (RAR), or paging information. DCI format 1C can also be used on indicate a subframe configuration for operation on unlicensed spectrum (see also REF 3). Another DCI format, DCI format 3 or DCI format 3A (often jointly referred to as DCI format 3/3A) can provide transmission power control (TPC) commands to one or more UEs for adjusting a transmission power of respective PUSCHs or PUCCHs.

A DCI format includes cyclic redundancy check (CRC) bits in order for a UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier. For a DCI format scheduling a PDSCH conveying SI, the RNTI can be an SI-RNTI. For a DCI format scheduling a PDSCH providing a RAR, the RNTI can be an RA-RNTI. For a DCI format scheduling a PDSCH paging a group of UEs, the RNTI can be a P-RNTI. For a DCI format indicating a subframe configuration for operation on unlicensed spectrum, the RNTI can be a CC-RNTI. For a DCI format providing TPC commands to a group of UEs, the RNTI can be a TPC-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH conveying a DCI format scheduling a PDSCH to a UE or a PUSCH from a UE can be transmitted in a same DL cell as the PDSCH transmission or in a same DL cell as the DL cell linked to an UL cell for the PUSCH transmission. This is referred to as self-scheduling. In case a UE is configured for operation with carrier aggregation (CA), the PDCCH transmitted in a different DL cell than a DL cell of an associated PDSCH or a DL cell linked to an UL cell of an associated PUSCH.

Table 1 provides information elements (IEs), or fields, for a DCI format scheduling a PUSCH transmission with a maximum of one data TB within a BW of $N_{RB}^{UL}$ RBs.

TABLE 1

IEs of a DCI Format Scheduling PUSCH (based on a DCI Format 0)

| DCI Format 0 IE | Number of Bits | Functionality |
| --- | --- | --- |
| Differentiation Flag DCI Format 0 vs. DCI Format 1A | 1 | Differentiates DCI Format 0 from DCI Format 1A |
| Cross-carrier indicator field (CIF) | 0 or 3 | Enabled only when UE is configured with CA and cross-carrier scheduling |
| RB assignment and hopping resource allocation | $[\log_2(N_{RB}^{UL}(N_{RB}^{UL}+1)/2]$ | Assigns PUSCH RBs |
| Frequency hopping (FH) Flag | 1 | Indicates whether or not PUSCH is with FH |
| Modulation and Coding Scheme (MCS) | 5 | Provides MCS for data TB |
| HARQ process number | 4 | Provides a HARQ process number (see also REF 2) |
| Redundancy Version (RV) | 2 | Provide a RV for data TB encoding (see also REF 2) |
| NDI | 1 | Indicates new transmission or re-transmission of data TB |
| TPC Command | 2 | Adjusts PUSCH transmission power |
| CS and OCC Index | 3 | CS and OCC for PUSCH DMRS |
| CSI Request | 1 | Indicates whether UE shall include CSI reports in PUSCH |
| SRS Request | 1 | Indicates whether UE shall transmit SRS |
| DL Assignment Index (DAI) | 2 | Number of DL assignments for transmission of associated HARQ-ACK in PUSCH (see also REF 3) |
| UL Index | 2 | Number of SFs for PUSCH transmissions (see also REF 3) |
| Padding Bits (for size 0 = size 1 A) | Variable | For same size of DCI Format 0 and DCI Format 1A |
| C-RNTI | 16 | Identifies UE for DCI Format 0 |

Figure 4:
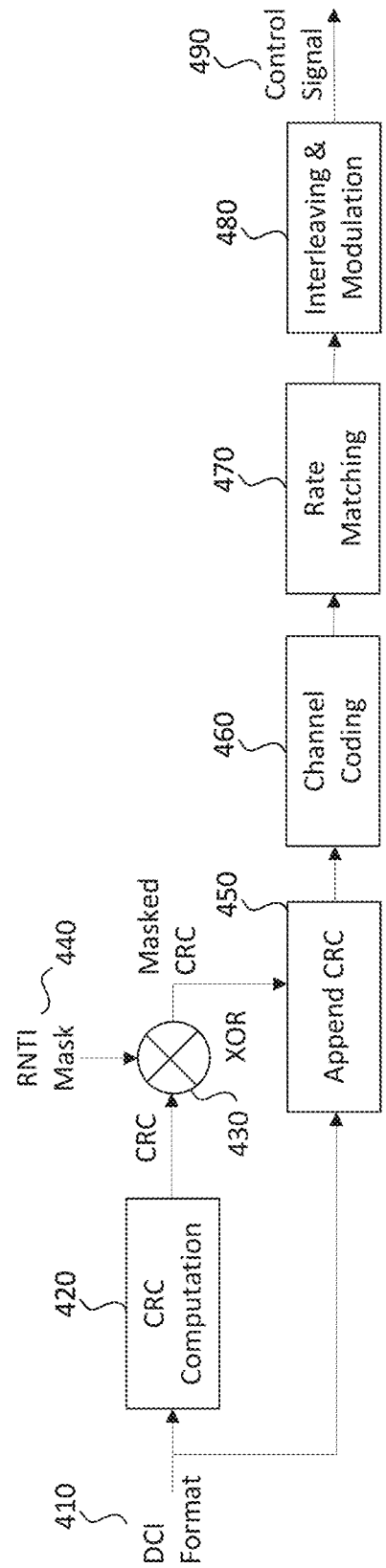
FIG. 4 illustrates an example encoding process for a downlink control information (DCI) format for use with an eNB according to this disclosure.

FIG. 4 illustrates an example encoding process for a DCI format for use with an eNB according to this disclosure. The embodiment of encoding process for a DCI format shown in FIG. 4 is for illustration only. Other embodiments could be used without departing from the scope of the present disclosure.

An eNB separately codes and transmits each DCI format in a respective PDCCH. A RNTI for a UE, for which a DCI format is intended, masks a CRC of a DCI format codeword in order to enable the UE to identify that a particular DCI format is intended for the UE. The CRC of (non-coded) DCI format bits 410 is determined using a CRC computation operation 420, and the CRC is masked using an exclusive OR (XOR) operation 430 between CRC bits and RNTI bits 440. The XOR operation 430 is defined as XOR(0,0)=0, XOR(0,1)=1, XOR(1,0)=1, XOR(1,1)=0. The masked CRC bits are appended to DCI format information bits using a CRC append operation 150. Channel coding is performed using a channel coding operation 460 (such as tail biting convolutional coding (TBCC)), followed by a rate matching operation 470 applied to allocated resources. Interleaving and modulation operations 480 are performed, and the output control signal 490 is transmitted. In the present example, both a CRC and an RNTI include 16 bits; however, it will be understood that either or both of the CRC and the RNTI could include more or fewer than 16 bits.

Figure 5:
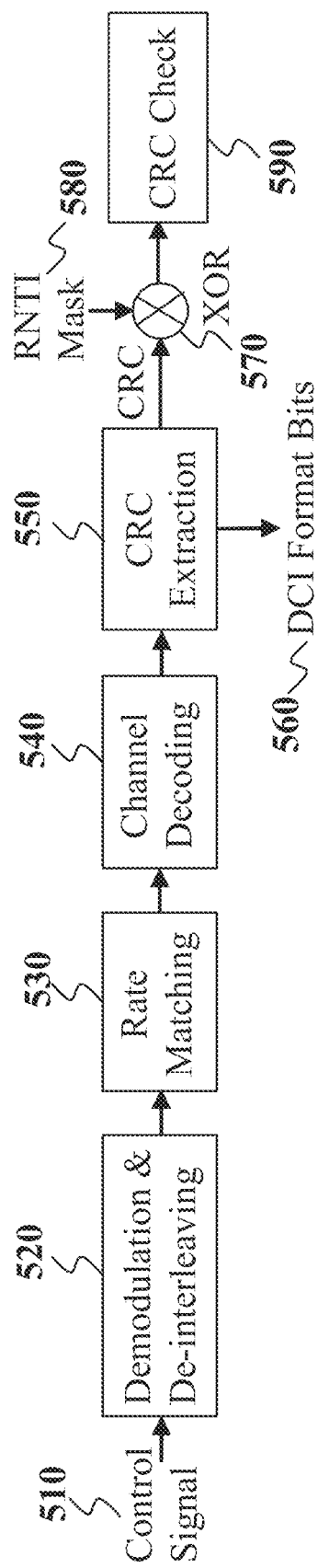
FIG. 5 illustrates an example decoding process for a DCI format for use with a UE according to this disclosure.

FIG. 5 illustrates an example decoding process for a DCI format for use with a UE according to this disclosure. The embodiment of decoding process for a DCI format in FIG. 5 is for illustration only. Other embodiments could be used without departing from the scope of the present disclosure.

A UE performs reverse operations of an eNB transmitter to determine whether the UE has a DCI format assignment in a DL SF. A received control signal 510 is demodulated and the resulting bits are de-interleaved at operation 520. A rate matching applied at an eNB transmitter is restored through operation 530, and data is decoded at operation 540. After decoding the data, DCI format information bits 560 are obtained after extracting CRC bits 550. The DCI format information bits are de-masked 570 by applying the XOR operation with a RNTI 580. A UE performs a CRC check 590. If the CRC check passes, the UE determines that the DCI format corresponding to the received control signal 510 is valid and determines parameters for signal reception or signal transmission. If the CRC test does not pass, the UE disregards the presumed DCI format.

Figure 6:
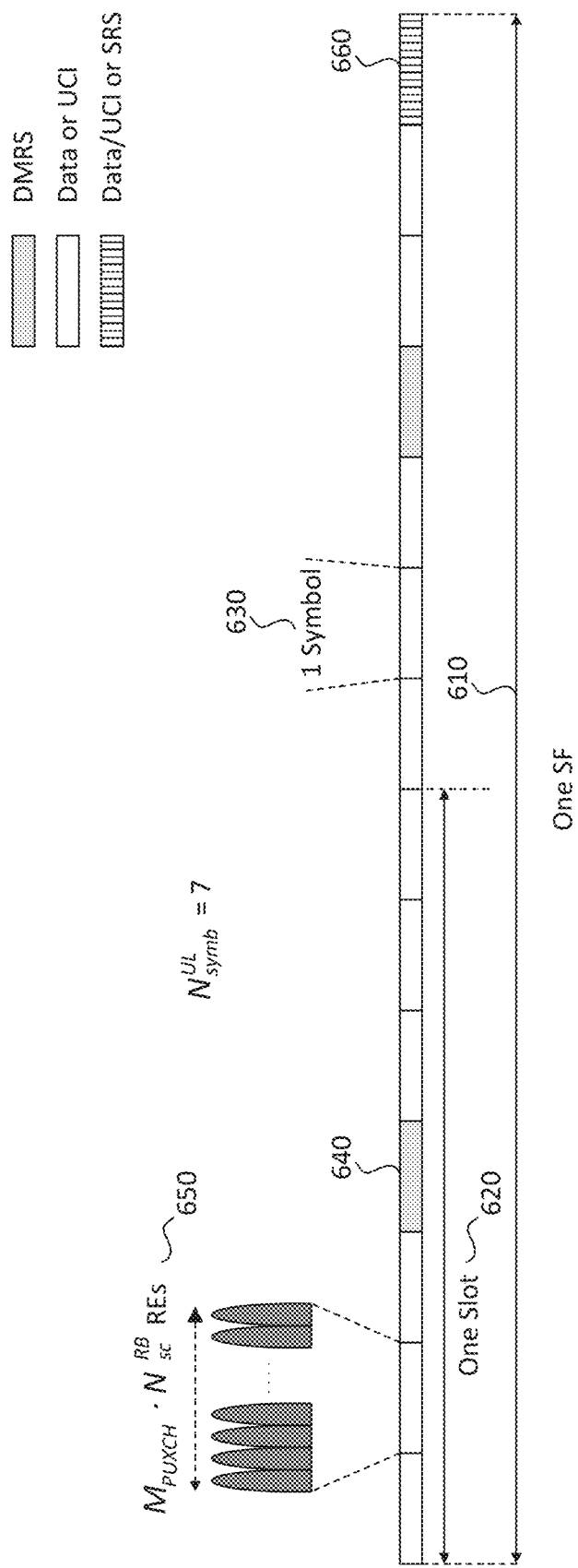
FIG. 6 illustrates an example UL subframe (SF) structure for PUSCH transmission or PUCCH transmission according to this disclosure.

FIG. 6 illustrates an example UL SF structure for PUSCH transmission or PUCCH transmission according to this disclosure. The embodiment shown in FIG. 6 is for illustration only. Other embodiments could be used without departing from the scope of the present disclosure.

UL signaling can use Discrete Fourier Transform Spread OFDM (DFT-S-OFDM). A SF 610 includes two slots and each slot 620 includes $N_{symb}^{UL}$ symbols 630 where UE transmits data information, UCI, or RS including one symbol per slot where the UE transmits DMRS 640. A system BW includes $N_{RB}^{UL}$ Each RB includes $N_{sc}^{RB}$ (virtual) REs. A UE is assigned $M_{PUXCH}$ RBs 640 for a total of $M_{sc}^{PUXCH}=M_{PUXCH} \cdot N_{sc}^{RB}$ REs 650 for a PUSCH transmission BW ('X'='S') or for a PUCCH transmission BW ('X'='C'). A last SF symbol can be used to multiplex SRS transmissions 660 from one or more UEs. A number of UL SF symbols available for data/UCI/DMRS transmission is $N_{symb}^{PUXCH}=2 \cdot (N_{symb}^{UL}-1) - N_{SRS} \cdot N_{SRS}=1$ when a last SF symbol supports SRS transmissions from UEs that overlap at least partially in BW with a PUXCH transmission BW; otherwise, $N_{SRS}=0$. Therefore, a number of total REs for a PUXCH transmission is $M_{sc}^{PUXCH} \cdot N_{symb}^{PUXCH}$.

Figure 7:
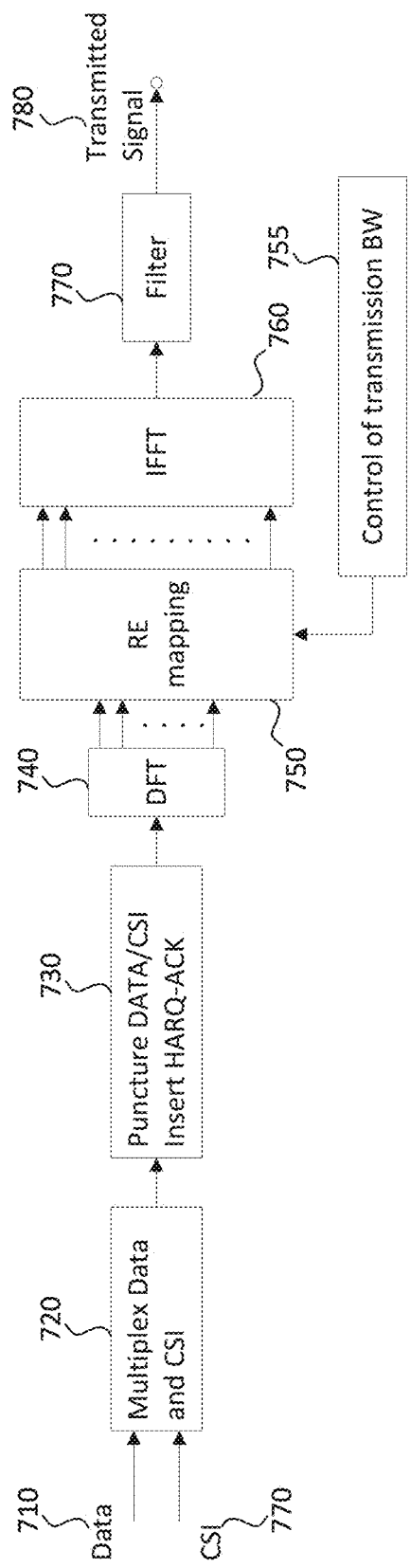
FIG. 7 illustrates a transmitter block diagram for uplink control information (UCI) and data in a PUSCH according to this disclosure.

FIG. 7 illustrates a transmitter block diagram for UCI and data in a PUSCH according to this disclosure. The embodiment shown in FIG. 7 is for illustration only. Other embodiments could be used without departing from the scope of the present disclosure.

Coded and modulated CSI symbols 705, when any, and coded and modulated data symbols 710, when any, are multiplexed by multiplexer 720. HARQ-ACK symbols, when any, are also multiplexed, data/CSI is punctured by puncturing unit 730 to accommodate HARQ-ACK in overlapping REs. Subsequently, a discrete Fourier transform (DFT) filter 740 applies a DFT, a transmission BW selector 755 selects REs 750 corresponding to an assigned transmission BW, filter applies an inverse fast Fourier transform (IFFT) 760, followed by time-domain filtering by filter 770 and a signal transmitted 780. Encoders, modulators, cyclic prefix insertion, as well as other processing units such as a power amplifier or RF filtering are well known in the art and are omitted for brevity.

Figure 8:
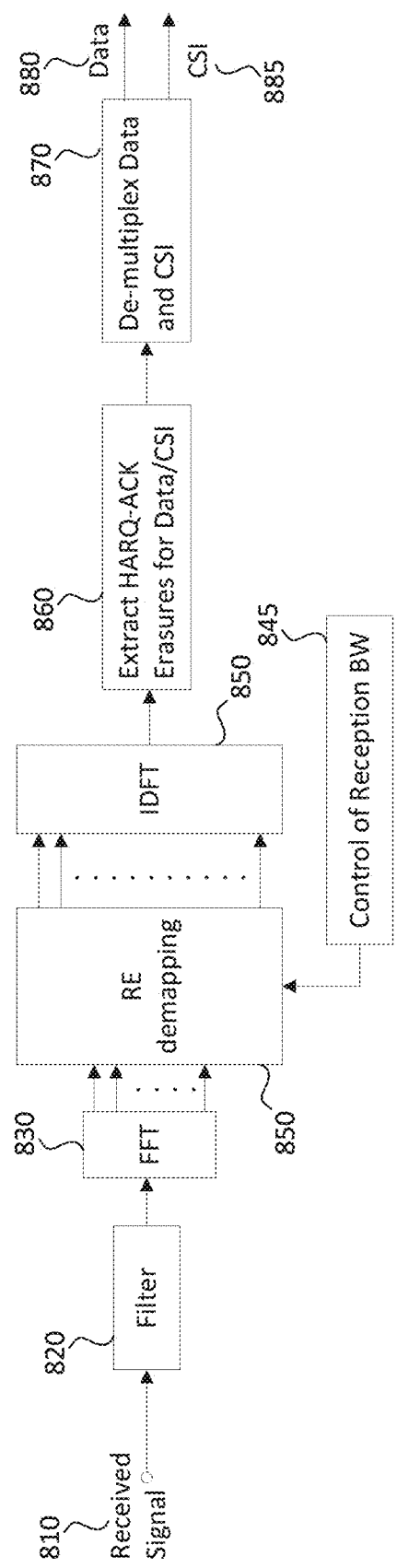
FIG. 8 illustrates a receiver block diagram for UCI and data in a PUSCH according to this disclosure.

FIG. 8 illustrates a receiver block diagram for UCI and data in a PUSCH according to this disclosure. The embodiment shown in FIG. 8 is for illustration only. Other embodiments could be used without departing from the scope of the present disclosure.

A digital signal 810 is filtered 820, a filter applies a fast Fourier transform (FFT) 830, a reception BW selector 845 selects REs 840 used by a transmitter, filter 850 applies an inverse DFT (IDFT), HARQ-ACK symbols are extracted and respective erasures for data/CSI symbols are placed by unit 860, and a de-multiplexer 870 de-multiplexes data symbols 880 and CSI symbols 585. Demodulators, decoders, cyclic prefix extraction, as well as other processing units such as analog-to-digital converted or radio frequency (RF) filtering are well known in the art and are omitted for brevity.

The transmitter structure in FIG. 7 and the receiver structure in FIG. 8 can also be used for a PUCCH transmission using a PUCCH Format 4 or a PUCCH Format 5. An exception is that HARQ-ACK and CSI are jointly, instead of separately, encoded (and there is no data transmission).

An RB allocation for a PUSCH transmission, also referred to as resource allocation (RA), can be either over a single interlace of contiguous RBs (RA type 0) or over two non-contiguous interlaces of contiguous RBs (RA type 1). An UL grant includes a RA field indicating a RA for an associated PUSCH transmission.

For RA type 0, a RA field indicates to a UE a set of contiguously allocated (virtual) RB indices denoted by $n_{VRB}$. The RA field includes a resource indication value (RIV) corresponding to a starting RB ($RB_{START}$) and a length in terms of contiguously allocated RBs ($L_{CRBs} \geq 1$). The RIV is defined by $RIV = N_{RB}^{UL} \cdot (L_{CRBs}-1) + RB_{START}$ when $(L_{CRBs}-1) \leq \lfloor N_{RB}^{UL}/2 \rfloor$, and by $RIV = N_{RB}^{UL} \cdot (N_{RB}^{UL} + L_{CRBs} - 1) + (N_{RB}^{UL} - 1 - RB_{START})$ when $(L_{CRBs}-1) > \lfloor N_{RB}^{UL}/2 \rfloor$.

For RA type 1, a RA field indicates to a UE two sets of RBs with each set including one or more consecutive RB groups (RBGs) of size P. A combinatorial index r includes $$\left\lceil \log_2 \binom{\lceil N_{RB}^{UL}/P+1 \rceil}{4} \right\rceil$$

bits where ⌈ ⌉ is the ceiling function that rounds a number to its immediately next larger integer. The bits from the RA field typically represent r (see also REF 3). The combinatorial index r corresponds to a starting and ending RBG index of RB set 1, $s_0$ and $s_1-1$, and RB set 2, $s_2$ and $s_3-1$ respectively, and $$r = \sum_{i=0}^{M-1} \binom{N-s_i}{M-1}$$

with M=4 and N=N P+1

When using an unlicensed frequency band for communication between an eNB and a UE, such communication can often have to satisfy regulatory requirements for using the unlicensed frequency band. A first requirement can be that a transmission from either the eNB or the UE occupies at least eighty percent (80%) of an available BW on the unlicensed frequency band. A second requirement can be that a transmission power per megahertz (MHz), also referred to as power spectral density (PSD), does not exceed a predefined value such as 10 or 13 decibels (dB) per milliwatt (dBm). A maximum PSD requirement can result to a limited coverage for transmission from a UE to an eNB when using an unlicensed frequency band. Typically, a maximum UE transmission power can be 23 dBm but a UE needs to reduce it, for example to 10 dBm, when the UE transmits a signal with continuous BW occupation over 1 megaHertz (MHz). One way to satisfy a maximum PSD requirement while avoiding materially compromising UL coverage is for a UE to transmit a signal having a discontinuous BW occupation. For example, a UE can transmit an UL channel, such as a PUSCH or a PUCCH, over one or more RBs that are interleaved throughout a BW of an unlicensed frequency band so that the PSD in the one or more RBs, each RB spanning 180 KHz, can be 17 dBm but the PSD can be less than 10 dBm/MHz.

Additional requirements can also exist. For example, a third requirement can be that prior to transmitting on an unlicensed cell, an eNB or a UE need to perform carrier sensing and apply a listen before talk (LBT) procedure to contend for access to the unlicensed frequency band. An LBT procedure can include a clear channel assessment (CCA) procedure to determine whether or not a channel in the unlicensed frequency band is available. When the CCA determines that the channel is not available, for example because it is used by another device such as a WiFi device, the eNB or the UE can apply an extended CCA procedure to increase a likelihood of gaining access to the unlicensed frequency band. An extended CCA procedure includes a random number of CCA procedures (from 1 to q) according to an extended CCA counter. Each CCA procedure can include detecting an energy level on the channel of the unlicensed frequency band and determining whether or not the energy level is below a threshold. When the energy level is at or below the threshold, the CCA procedure is successful and the eNB or the UE can access the channel. When the energy level is above the threshold, the CCA procedure is unsuccessful and the eNB or the UE cannot access the channel.

Scheduling Uplink Transmissions in Unlicensed Bands

Figure 9:
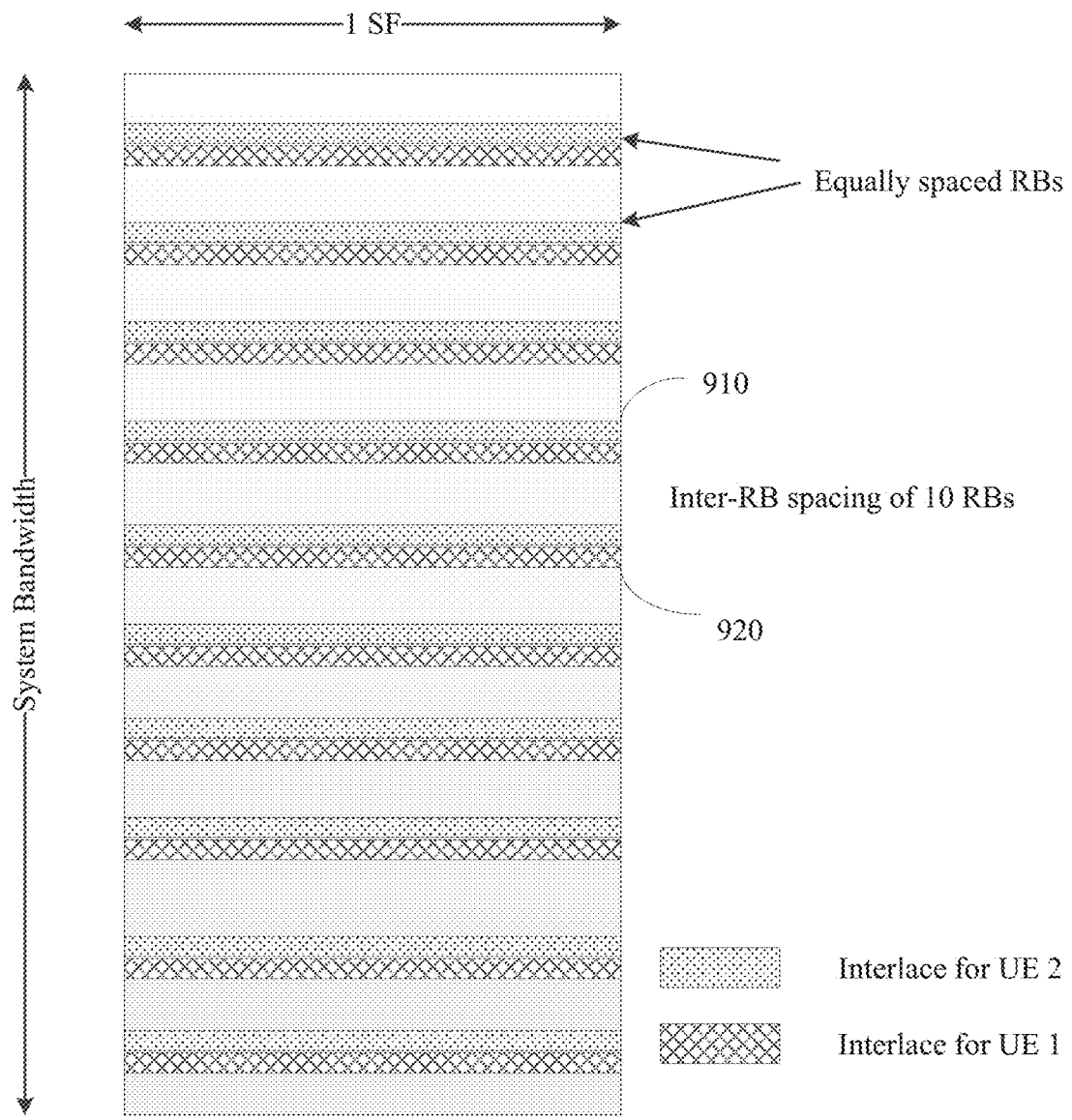
FIG. 9 illustrates a transmission of an UL channel transmission, such as a PUSCH or a PUCCH, over ten RBs interleaved in frequency according to this disclosure.

FIG. 9 illustrates a transmission of an UL channel transmission, such as a PUSCH or a PUCCH, over ten RBs interleaved in frequency according to this disclosure. The embodiment shown in FIG. 9 is for illustration only. Other embodiments could be used without departing from the scope of the present disclosure.

An UL channel transmission is in groups of interleaved RBs where a group of interleaved RBs is referred to as interlace. Each interlace includes RBs separated by 10 RBs in a system BW. For a 20 MHz BW that includes 100 RBs, there are 10 interlaces of RBs and each interlace includes 10 RBs. A first UE is allocated a first interlace of RBs 910 and a second UE is allocated a second interlace of RBs 920. A UE can be allocated multiple interlaces up to all interlaces of RBs in a system BW. Other realizations are also possible such as for example a number of 5 interlaces with 20 equally spaced RBs per interlace. For a PUSCH transmission or for a PUCCH transmission from a UE on an unlicensed cell, transmission in one or more of last SF symbols or one or more first SF symbols can be suspended in order for the UE or for other UEs to perform CCA and the SF structure in FIG. 9 can be modified accordingly.

Since an interlace includes non-contiguous RBs, a channel estimate for a PUSCH transmission over an interlace needs to generally be obtained per RB due to a possible frequency selective channel. This results to a degraded accuracy for a channel estimate as only REs in one PRB can be used and creates edge effects for first and last REs in a RB. It is desirable for a PUSCH transmission over multiple interlaces to enable enhancing an accuracy of a respective channel estimate.

Moreover, a UE typically needs to perform a CCA before transmitting a PUSCH in SF n response to a detection of a DCI format in SF n−k, where typically k≥4, it is possible that the CCA fails and the UE does not transmit the PUSCH. In heavily loaded cells where many UEs can contend for access to a channel medium at a time, it is likely that the PDCCH transmissions conveying UL grants to UEs are not reciprocated by respective PUSCH transmission. To reduce a possible waste in DL resources for PDCCH transmissions scheduling PUSCH transmissions that do not materialize, multi-SF scheduling is one solution where an UL grant schedules multiple PUSCH transmissions over respective multiple SFs by including a multi-SF allocation field indicating a number of PUSCH transmissions. With multi-SF scheduling, a single resource allocation value, a single MCS value, and a single CS/OCC value are applicable for all of the multiple PUSCH transmissions. Unavailability of an unlicensed cell for PUSCH transmissions at a SF also requires that PUSCH retransmissions are supported by an asynchronous HARQ process. Therefore, multi-SF PUSCH scheduling needs to accommodate PUSCH transmissions for different HARQ processes. Additionally, A-CSI multiplexing over multiple PUSCH transmissions needs to be supported as, with multi-SF scheduling, there is only a single opportunity to trigger A-CSI reporting over multiple SFs.

Therefore, there is a need to define allocation of multiple interlaces for a PUSCH transmission in order to improve channel estimation accuracy and design a respective resource allocation field in an UL grant.

There is another need to enable multi-SF PUSCH scheduling of multiple PUSCH transmissions for asynchronous HARQ retransmissions without significantly increasing an UL grant size.

Also, there is another need to enable A-CSI multiplexing over multiple PUSCH transmissions in order to accommodate a single A-CSI triggering opportunity over multiple SFs in case of multi-SF scheduling.

In the following, unless otherwise explicitly mentioned, reference is with respect to PUSCH transmissions over one or more interlaces.

Resource Allocation for PUSCH Transmission Over Interlaces

A UE can be allocated by an eNB one or more interlaces of RBs for a PUSCH transmission. When the UE is allocated multiple interlaces, it is preferable that the interlaces result to contiguous RBs in order to improve channel estimation by utilizing single filters over the contiguous RBs instead of obtaining a channel estimate per RB that would be necessary in case of non-contiguous RBs due to a frequency selective channel. PUSCH transmission over contiguous RBs when an eNB allocates to a UE a number of interlaces for PUSCH transmission is realized by assigning interlaces with consecutive indexes. Therefore, even though the RBs of each interlace are non-contiguous and are substantially distributed over the system BW, blocks of contiguous RBs can result by assigning interlaces with consecutive indexes for a PUSCH transmission.

Figure 10:
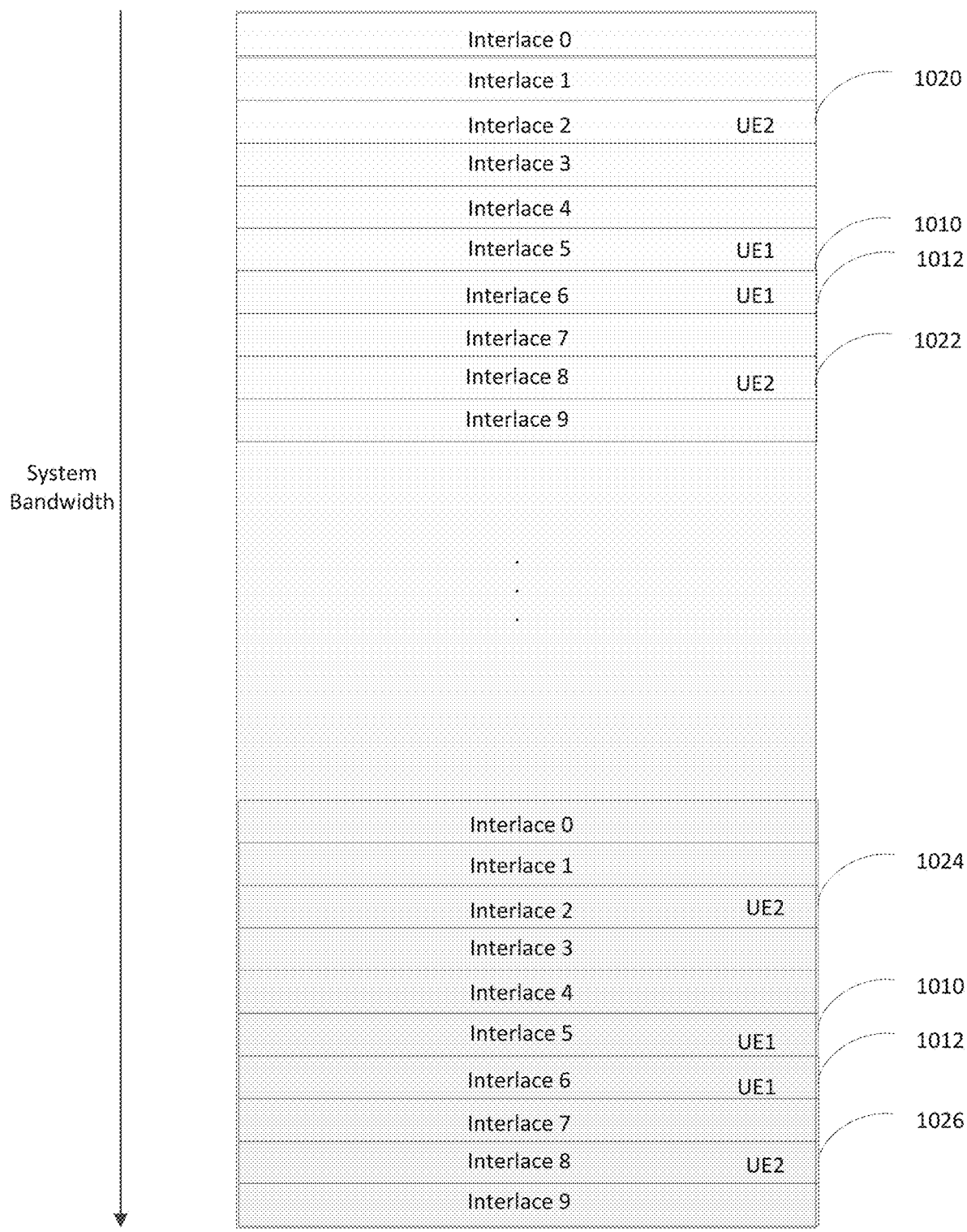
FIG. 10 illustrates an example of an allocation of two interlaces with consecutive indexes for a PUSCH transmission from a first UE and an example of an allocation of two interlaces with non-consecutive indexes for a PUSCH transmission from a second UE according to this disclosure.

FIG. 10 illustrates an example of an allocation of two interlaces with consecutive indexes for a PUSCH transmission from a first UE and an example of an allocation of two interlaces with non-consecutive indexes for a PUSCH transmission from a second UE according to this disclosure. The embodiment shown in FIG. 10 is for illustration only. Other embodiments could be used without departing from the scope of the present disclosure.

There are 10 interlaces in a system BW and are indexed from 0 to 9 according to an ascending order of a lowest indexed RB in each interlace. A first UE is allocated two interlaces with contiguous indexes of 5 and 6, 1010 and 1012, for a PUSCH transmission to an eNB. A second UE is allocated two interlaces with non-contiguous indexes of 2 and 8, 1020, 1022, 1024, and 1026, for a PUSCH transmission to an eNB. Due to the separation of the RBs for interlaces with indexes 2 and 8 and a possible frequency selective channel medium, the eNB cannot apply a single channel estimator over the two RBs. As a consequence, channel estimation accuracy for a PUSCH reception for the second UE is degraded and a resulting reception reliability of a respective data TB is also degraded.

In order to realize performance and implementation complexity benefits, this disclosure provides that interlaces of RBs allocated to a PUSCH transmission have consecutive indexes. Allocation of a number of interlaces for a PUSCH transmission is referred to as RA type 3. For a PUSCH transmission over $M_I$ interlaces, from a total of $N_I^{UL}$ interlaces of an UL system BW, and subject to a restriction that the indexes of the $M_I$ interlaces are consecutive, a RA field in an associated UL grant includes $\lceil \log_2(M_I \cdot (M_I+1)/2) \rceil$ bits providing a resource indication value for interlaces $RIV_I$. Similar to RA type 0, $RIV_i$ indicates a starting interlace ($I_{START}$) and a length in terms of contiguously allocated RBs ($L_{CIs} \geq 1$) and is defined by $RIV_I = N_I^{UL} \cdot (L_{CIs}-1) + I_{START}$ when $(L_{CIs}-1) \leq \lfloor N_I^{UL}/2 \rfloor$, and by $RIV_I = N_I^{UL} \cdot (N_I^{UL} + L_{CIs}-1) + (N_I^{UL}-1-I_{START})$ when $(L_{CIs}-1) > \lfloor N_I^{UL}/2 \rfloor$. For example, for a 20 MHz system BW that includes 100 RBs, there are $N_I^{UL}=10$ interlaces in case of 10 RBs per interlace and a number of required bits for the RA type 3 field in an UL grant is 6 while there are $N_I^{UL}=20$ interlaces in case of 5 RBs per interlace and a number of required bits for the RA type 3 field in an UL grant is 8. As for $M_I=10$ interlaces or for $M_I=20$ interlaces it is $M_I \cdot (M_I+1)/2 < 2^{\lceil \log_2(M_I \cdot (M_I+1)/2) \rceil}$, remaining states (for $M_I \cdot (M_I+1)/2 \leq RIV_I \leq 2^{\lceil \log_2(M_I \cdot (M_I+1)/2) \rceil} - 1$) can be used to indicate other combinations of clusters with non-contiguous indexes, such as clusters 0 and 5, as is subsequently discussed for transmission of a Msg3 associated with a random access process.

Multi-SF Scheduling of PUSCH Transmissions

In a first example multi-SF scheduling is enabled by including a multi-SF allocation field in an UL grant. For example, for a maximum number of $N_{SF}=4$ SFs for multi-SF PUSCH transmissions, a multi-SF allocation field of $\lceil \log_2(N_{SF}) \rceil = 2$ bits in an UL grant can indicate scheduling of one or more PUSCH transmissions over 1 SF, 2 SFs, 3 SFs, or 4 SFs. A limitation for the multi-SF scheduling in the first example is that an SF for a first PUSCH transmission needs to be predetermined, for example by a timing relation relative to a SF of a PDCCH transmission conveying an associated UL grant.

In a second example, an index field for a first SF of a PUSCH transmission can also be included in an UL grant.

In a first approach, an index field is a separate field than a multi-SF allocation field. For example, a maximum number of $N_{SF}=4$ SFs for multi-SF PUSCH transmissions, an index field of 2 bits can indicate a first SF can for a respective PUSCH transmission. This can enable an eNB to opportunistically transmit PDCCH to a UE in a first SF, depending on available PDCCH capacity in the first SF or depending, for example, on an availability of an unlicensed cell in the first SF, in order to schedule a PUSCH transmission from the UE in a second SF without the second SF being constrained to be a first UL SF where the UE can transmit PUSCH that occurs at least four SFs after the first SF. Equivalently, for a PDCCH transmission in SF n, an index field in a DCI format with value $o_t$ can act as a timing offset to a PUSCH transmission SF that can be determined as an UL SF with index n+k+$o_t$ (modulo 10) where n+k is an earliest UL SF where PUSCH can be transmitted and, for example, k≥4.

In a second approach, similar to UL/DL configuration 0 in a TDD system, an UL index field of 4 bits in an UL grant that functions as a bit-map can indicate both a number of SFs for a same number of PUSCH transmissions and a first SF for the number of PUSCH transmissions. For example, a bit-map of 4 bits with values {0, 1, 1, 1} can indicate that an associated UL grant schedules PUSCH transmissions over a second, a third, and a fourth SF and that the SF for a first PUSCH transmission is the second SF. A disadvantage of the second approach occurs when $N_{SF}$ is large as a bit-map size is equal to the value of $N_{SF}$.

When a UE detects an UL grant that schedules PUSCH transmissions on a cell over a number of two or more SFs and over a number of $M_I$ interlaces, it can be beneficial to randomize an interference caused by the multiple PUSCH transmissions to transmissions in neighboring cells using a same frequency band. For a PUSCH transmission with RA type 3 (interlace), frequency domain scheduling is not material and the $M_I$ interlaces can be any of the $N_I^{UL}$ interlaces of an UL system BW (potentially subject to the $M_I$ interlaces having contiguous indexes). A shift can then apply on the indexes of interlaces used for each PUSCH transmissions in different SFs by adding the cell-specific shift to a lowest interlace index from the indexes (modulo $N_I^{UL}$).

In a first example, the shift can be time-invariant and cell-specific such as (PCID)mod $N_I^{UL}$ where PCID is a physical cell ID for the cell. For example, for $N_I^{UL}=10$ and (PCID)mod $N_I^{UL}=2$, when four interlaces with indexes 2, 3, 4, 5 are assigned by an UL grant for a PUSCH transmission over four SFs, the first, second, third, and fourth PUSCH transmissions can be on interlaces with indexes {2, 3, 4, 5}, {4, 5, 6, 7}, {6, 7, 8, 9}, and {8, 9, 0, 1}, respectively. Some indexes of interlaces, such as for example index 0, can precluded from use as they can be semi-statically configured for other transmissions such as PUCCH or PRACH transmissions. For example, for $N_I^{UL}=10$ and when interlace with index 0 is precluded, a cycling of interlaces for the multiple PUSCH transmissions can be over the indexes of interlaces from 1 to 9.

Figure 11:
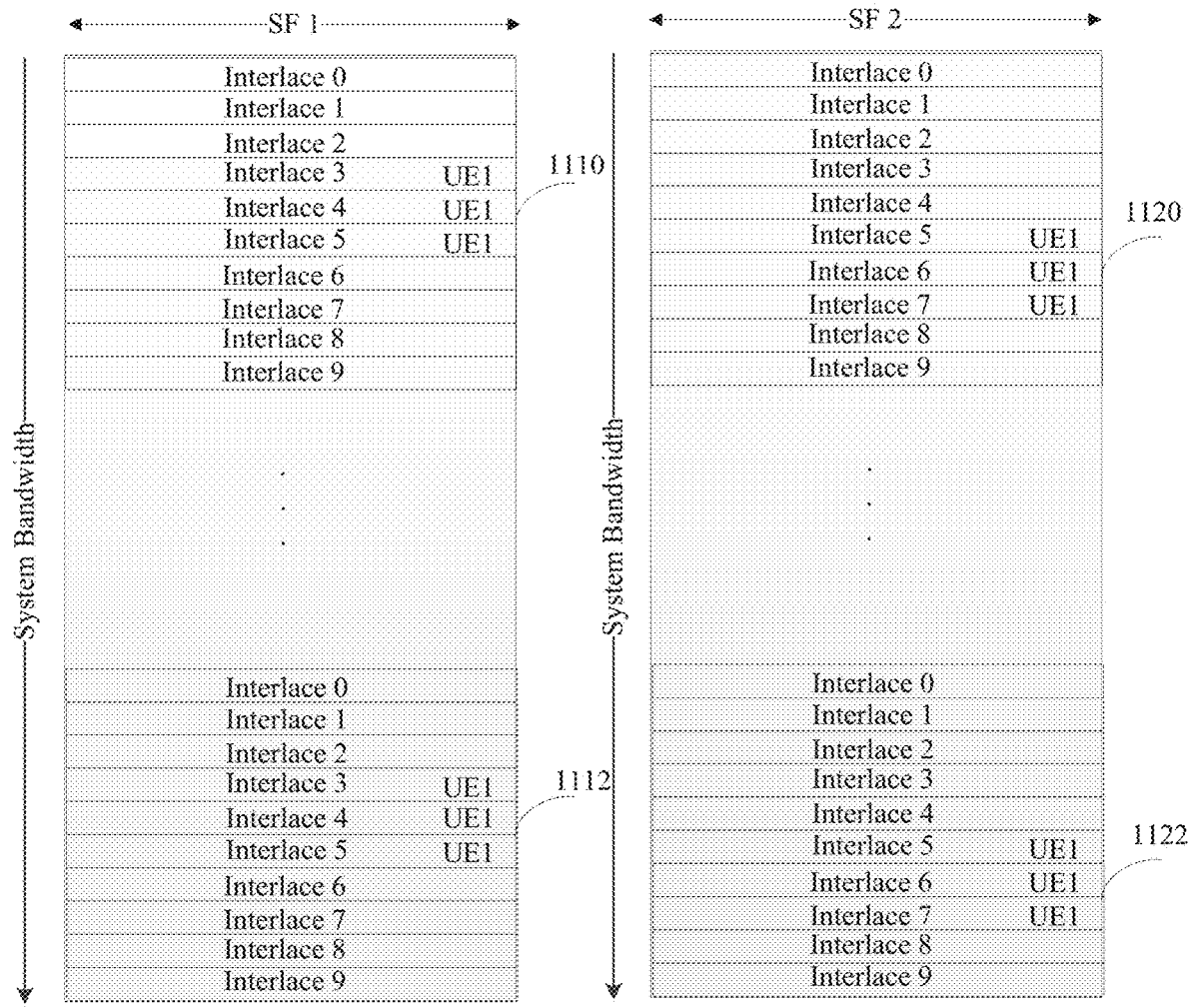
FIG. 11 illustrates an example of shifting for interlace indexes used for multiple PUSCH transmissions from a UE according to this disclosure.

FIG. 11 illustrates an example of shifting for interlace indexes used for multiple PUSCH transmissions from a UE according to this disclosure. The embodiment shown in FIG. 11 is for illustration only. Other embodiments could be used without departing from the scope of the present disclosure.

A UE detects an UL grant transmitted from an eNB that schedules two PUSCH transmissions over two respective SFs on a cell having a PCID and a system BW that includes $N_I^{UL}=10$ interlaces of RBs. The UE determines an offset value (PCID)mod $N_I^{UL}=2$. An RA type 3 field in the UL grant indicates a first transmission on interlaces 3, 4, and 5, 810 and 1112, and the UE transmits the PUSCH in the first SF on interlaces 3, 4, and 5, 1110 and 1112. The UE transmits the PUSCH in the second SF on interlaces 5, 6, and 7, 1120 and 1122.

In a second example, the shift can be time-variant such as $\lfloor (n_s-n_{s0})/2 \rfloor$ mod $N_I^{UL}$ where $n_s$ is an index of a slot in a frame ranging from 0 to 19 and $n_{s0}$ is an index of a slot for a first PUSCH transmission from the multi-SF PUSCH transmissions triggered by an UL grant. Operation is similar to a cell-specific shift.

In a third example, the shift can be both time-variant and cell-specific by combining the approaches in the first example and the second example.

When PUSCH retransmissions are asynchronous, an UL grant needs to include a field for a HARQ process number, a field for a RV, and a field for a NDI as for example in Table 1. For multi-SF PUSCH scheduling, this implies that a HARQ process number field, a RV field, and an NDI field need to be included in the UL grant for each PUSCH transmission. All other fields in the UL grant scheduling multiple PUSCH transmissions to a UE are applicable for each of the multiple PUSCH transmissions. For example, same respective values for an interlace assignment, a MCS, and an OCC/CS apply. A TPC command value is applied in a first PUSCH, from the multiple PUSCH, that the UE is able to transmit and an associated transmission power adjustment remains applicable for the remaining PUSCH transmissions from the multiple PUSCH transmissions.

In order to avoid having a variable size for an UL grant depending on a respective number of PUSCH transmission that the UL grant schedules, an HARQ process number field, a RV field, and an NDI field need to be included in the UL grant for a maximum possible number of scheduled PUSCH transmissions. For example, for a maximum number of 4 PUSCH transmissions that can be scheduled by an UL grant, the UL grant needs to include 4 HARQ process number fields, 4 RV fields, and 4 NDI fields regardless of an actual number of scheduled PDSCH transmissions that can be smaller than 4. A typical size for a HARQ process number field is 3 or 4 bits, a typical size for a RV field is 2 bits, and a NDI size is 1 bit, thereby resulting to a total size of 24 to 28 bits that represents a substantial increase in a size of an UL grant scheduling a single PUSCH transmission that is typically about 50 bits.

An increase in an UL grant size supporting scheduling of PUSCH transmissions in respective multiple SFs can be avoided by linking a value for each of HARQ process number, RV, and NDI for a PUSCH transmissions in a later SF to a HARQ process number, RV, and NDI for a PUSCH transmission in a first SF from the multiple SFs. A value for each of the HARQ process number, RV, and NDI for the PUSCH transmission in the first SF is indicated by respective fields in the UL grant.

In a first example, the above link is predefined such as for example by applying a same NDI value, a same RV value, and a serial increase in a HARQ process number, modulo the maximum HARQ process number, according to a serial increase of a number of SF, from the multiple SFs, relative to the first SF. For example, when an UL grant schedules PUSCH transmissions in 4 SFs and indicates a first HARQ process number $n_{HARQ}$ for a PUSCH transmission in the first SF, from a total of $N_{HARQ}$ HARQ processes, the HARQ process number for PUSCH transmissions in the second, third, and fourth SFs are respectively $(n_{HARQ}+1)\bmod N_{HARQ}$, $(n_{HARQ}+2)\bmod N_{HARQ}$, and $(n_{HARQ}+3)\bmod N_{HARQ}$. Therefore, a HARQ process number associated with a j-th PUSCH transmission, $1<j\leq N_{SF}$, is $(n_{HARQ}+j-1)\bmod N_{HARQ}$.

Figure 12:
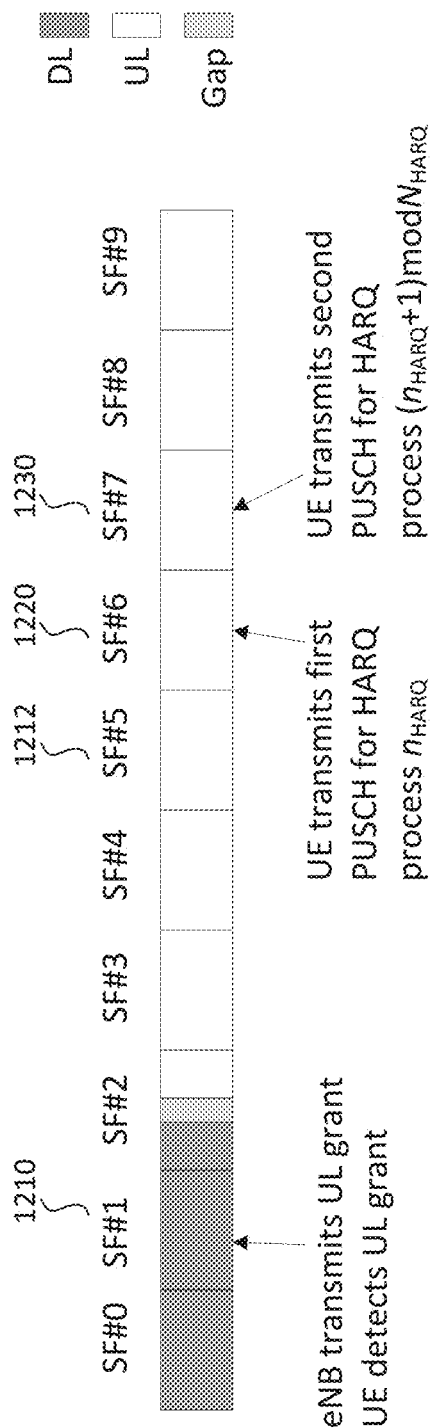
FIG. 12 illustrates an example determination of a HARQ process number in case of multi-SF PUSCH scheduling by an UL grant according to this disclosure.

FIG. 12 illustrates an example determination of a HARQ process number in case of multi-SF PUSCH scheduling by an UL grant according to this disclosure. The embodiment shown in FIG. 12 is for illustration only. Other embodiments could be used without departing from the scope of the present disclosure.

In a first SF, SF #1 1210, an eNB transmits and a UE detects an UL grant. The UL grant includes a HARQ process number field, a multi-SF index field, and a first-SF index field. The multi-SF index field value indicates scheduling of PUSCH transmissions over two SFs. The first-SF index field value indicates a first SF that is 5 SFs after the SF of the UL grant detection. For example, the first-SF index field can include 2 bits where the value of '00', '01', '10', and '1' are respectively interpreted to introduce an offset of 0, 1, 2, and 3 SFs after the fourth SF (SF #5 1212) relative to the SF of the UL grant detection for a first SF of a PUSCH transmission. Then, in the present example, the first-SF index field has a value of '01'. The HARQ process number field has a value of $n_{HARQ}$ indicating a HARQ process from a total of $N_{HARQ}$ processes. The UE transmits a data TB for HARQ process with number $n_{HARQ}$ in a first PUSCH in SF #6 1220 and transmits a data TB for HARQ process with number $(n_{HARQ}+1)\bmod N_{HARQ}$ in a second PUSCH in SF #6 1230.

The first example requires that all multiple PUSCH transmissions have a same NDI and a same RV and consecutive HARQ process numbers. Using a same RV when a different RV is preferable, or reducing a number of supported RVs for example from RV0, RV2, RV3, and RV1 to RV0 and RV2 for a corresponding reduction in a number of required bits from 2 to 1, only results to a minor degradation in PUSCH reception reliability and it is not a limiting factor for the first example. Using the same NDI is more restrictive as it precludes multi-SF scheduling when a first number from the multiple PUSCH transmissions need to be retransmissions for data TBs for respective HARQ processes and a remaining number from the multiple PUSCH transmissions need to be new transmissions for data TBs for respective HARQ processes. Given the smaller communication reliability on an unlicensed cell, it can be a frequent event that consecutive HARQ processes correspond to retransmissions of data TBs and new transmissions of data TBs.

In a second example, same mechanisms as in the first example apply with the exception that a 1-bit NDI field is included in an UL grant supporting multi-SF scheduling for each of a respective maximum number $N_{SF}$ of PUSCH transmissions. This maximum number can be specified in a system operation. For example, for an UL grant capable of scheduling a maximum number of 4 PUSCH transmissions, an additional 3 NDI bits are included relative to the first example, for a total of 4 NDI bits. Therefore, the second example enables substantial flexibility in multi-SF scheduling for a marginal increase in an associated UL grant size.

In a third example, a size of an UL grant scheduling a single PUSCH transmission and a size of an UL grant scheduling multiple PUSCH transmissions is same in order to adaptively support either a single PUSCH transmission or multiple PUSCH transmissions without increasing an associated required number of PDCCH decoding operations at a UE. A 1-bit UL flag field is introduced in an UL grant for single-SF scheduling and in an UL grant for multi-SF scheduling in order to differentiate a respective UL grant type. An RV field is not included in an UL grant for multi-SF scheduling that can be restricted to be used only for initial transmissions of respective data TBs. An UL grant for single-SF scheduling can be used either for initial transmission or for a retransmission of data TBs. By disabling the function of the RV field that exists in an UL grant for single-SF scheduling, the respective bits can be used to have a multi-SF field function as an UL index field using a bit-map, as it was previously described, that indicates both a number of PUSCH transmissions and the respective SFs.

Combinations for the previous three examples are also possible. For example, the RV field can be excluded also for the first example and a UE can use by default a RV value of 0 when a NDI value is 1 and use a RV value of 2 when the NDI value is 0.

Figure 13:
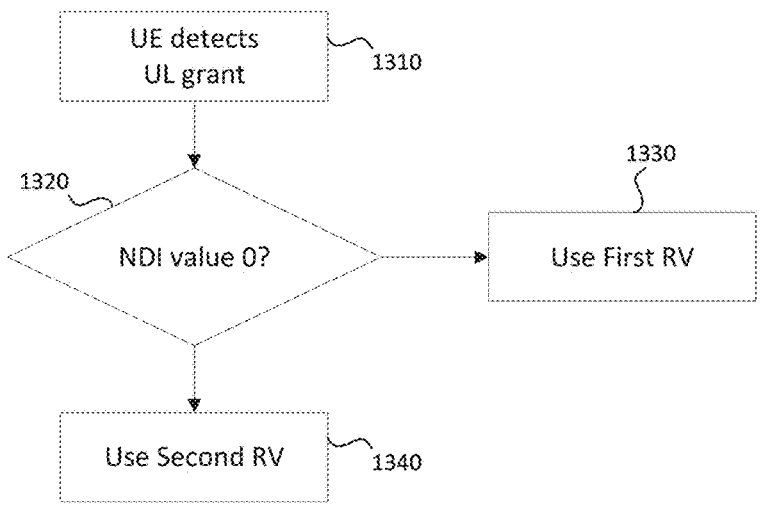
FIG. 13 illustrates an example determination by a UE of a redundancy version (RV) to apply for a data TB transmission depending on a value of a new data indicator (NDI) field.

FIG. 13 illustrates an example determination by a UE of a RV to apply for a data TB transmission depending on a value of a NDI field. The embodiment shown in FIG. 13 is for illustration only. Other embodiments could be used without departing from the scope of the present disclosure.

A UE detects an UL grant 1310. The UL grant includes a NDI field, a HARQ process number field, and does not include a RV field. The UE examines whether or not a value of the NDI field is 0 1320. When the value of the NDI field is 0, the UE uses a first predetermined RV value, such as a RV value of 2, for a retransmission of a data transport block corresponding to a HARQ process indicated by the HARQ process number field 1330. When the value of the NDI field is 1, the UE uses a second predetermined RV value, such as a RV value of 0, for a new transmission of a data TB corresponding to a HARQ process indicated by the HARQ process number field 1340.

UCI Multiplexing for Multi-SF Scheduling of PUSCH Transmissions

When a UE detects an UL grant transmitted from an eNB and scheduling multiple PUSCH transmissions in respective multiple SFs and triggering an A-CSI report, the UE can multiplex the A-CSI report in the first SF where the UE can transmit a PUSCH. However, for operation on unlicensed spectrum, the eNB (or the UE) cannot know in advance the first SF where the UE can transmit PUSCH, the MCS and resource allocation are same for all PUSCH transmissions, and the UE cannot always increase a PUSCH transmission power when the UE multiplexes A-CSI in the PUSCH in order to offset a reduction in a code rate for the date.

In another realization, A-CSI reports for individual cells, or SF sets, or processes can be distributed across the multiple PUSCH transmissions in order to provide a somewhat uniform impact on the data information and avoid a need for a material increase in a power of a PUSCH transmission that includes UCI relation to a power of other PUSCH transmissions. For example, for an UL grant scheduling $N_{PUSCH}$ transmissions and triggering $N_{CSI} > N_{PUSCH}$ reports, each PUSCH transmission can include $\lfloor N_{CSI}/N_{PUSCH} \rfloor$ A-CSI reports and the first PUSCH transmission can include $\lceil N_{CSI}/N_{PUSCH} \rceil$ A-CSI reports. A-CSI reports can have different sizes and therefore different A-CSI payloads can be multiplexed in different PUSCH transmissions despite a number of A-CSI reports being same. Also, an eNB can also trigger a number of A-CSI reports that is larger than a maximum number of A-CSI reports that can be supported in a single PUSCH transmission.

Figure 14:
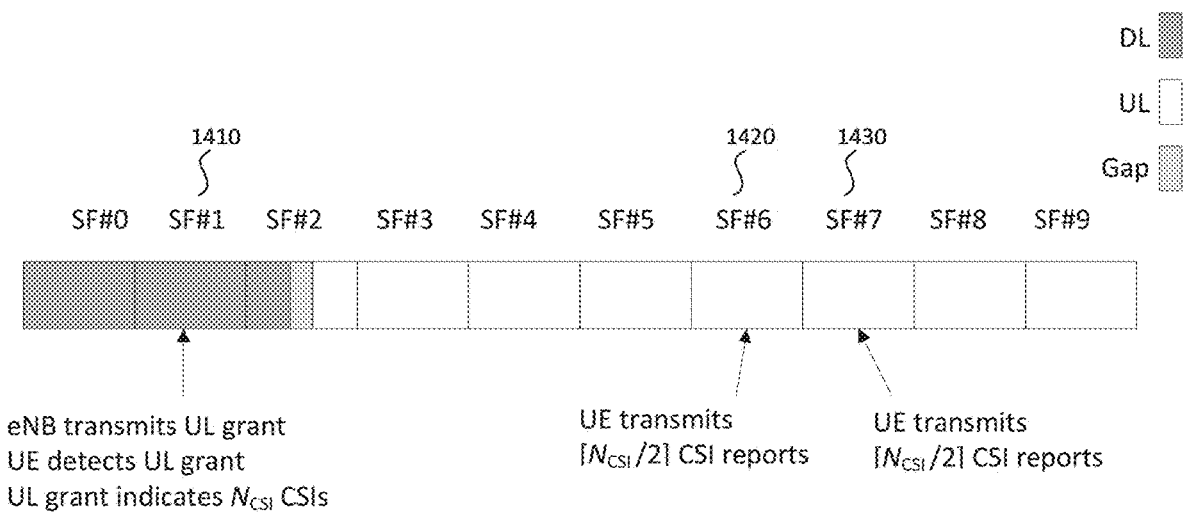
FIG. 14 illustrates an example for multiplexing a number of CSI reports in a number of PUSCH transmission scheduled by an UL grant according to this disclosure.

FIG. 14 illustrates an example for multiplexing a number of CSI reports in a number of PUSCH transmission scheduled by an UL grant according to this disclosure. The embodiment shown in FIG. 14 is for illustration only. Other embodiments could be used without departing from the scope of the present disclosure.

In a first SF, SF #1 1410, an eNB transmits and a UE detects an UL grant. The UL grant includes an A-CSI request field and a multi-SF index field. The A-CSI request field value maps to a state corresponding to a number of $N_{CSI}$ CSI reports for respective cells, or SF sets, or CSI processes. The UE transmits $\lceil N_{CSI}/2 \rceil$ CSI reports in a first PUSCH over a first SF 1420. The UE transmits $\lfloor N_{CSI}/2 \rfloor$ CSI reports in a second PUSCH over a second SF 1430. When the UE is unable to transmit the first PUSCH in the first SF, the UE can be configured to multiplex all $N_{CSI}$ CSI reports in the second PUSCH in the second SF.

When a UE detects an UL grant transmitted from an eNB and scheduling multiple PUSCH transmissions in respective multiple SFs and the UE needs to multiplex HARQ-ACK information in one of the multiple PUSCH transmissions according to a timing relation between detected DL assignments and transmission of respective HARQ-ACK information, unlike the A-CSI transmission, the UE does not postpone the HARQ-ACK transmission to a next PUSCH transmission when the UE is not capable to transmit the PUSCH where the HARQ-ACK information needs to be multiplexed according to the timing relation. Instead, the UE transmits the HARQ-ACK information either in a PUSCH or PUCCH on a licensed cell or in a PUSCH or PUCCH of another unlicensed cell where the UE. A UE can be configured with PUCCH resources in multiple unlicensed cells to improve a likelihood that the UE is able to transmit PUCCH at the expense of some loss in spectral efficiency.

One fundamental requirement in an operation of a communication system is a capability for a UE to establish a connection setup with an eNB or to synchronize its transmission with the eNB; a respective process is commonly referred to as random access. Random access is used for several purposes, including: initial access when establishing a radio link; re-establishing a radio link after radio-link failure (RLF), handover when UL synchronization needs to be established to a new cell, UL synchronization, UE positioning based on UL measurements, and as a SR at least when a UE is not configured dedicated SR resources on a PUCCH. Random access can be either contention based (multiple UEs can possibly use a same resource to transmit a random access preamble to an eNB) or contention-free (an eNB assigns a dedicated resource for a random access preamble transmission to a UE).

Figure 15:
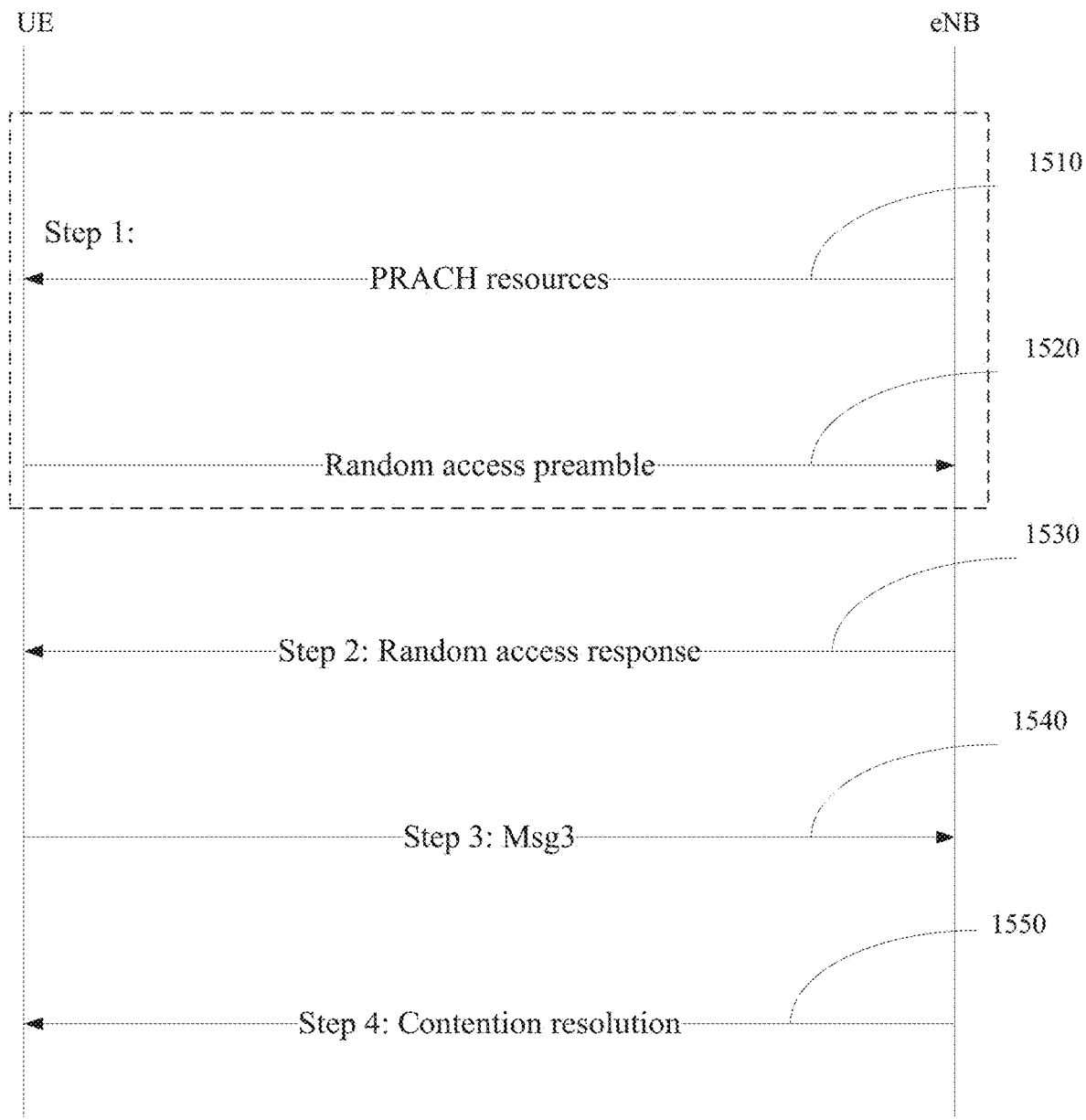
FIG. 15 illustrates an overview of a contention-based random access process according to this disclosure.

FIG. 15 illustrates an overview of a contention-based random access process according to this disclosure. The embodiment shown in FIG. 15 is for illustration only. Other embodiments could be used without departing from the scope of the present disclosure.

In Step 1 a UE acquires information for physical random access channel (PRACH) resources 1510 from an eNB and determines resources for a random access (RA) preamble transmission 1520 (also referred to as PRACH transmission). In Step 2, the UE receives a RAR 1530 from the eNB. In Step 3, the UE transmits a PUSCH that is referred to as message 3 (Msg3) 1540 to the eNB. In Step 4, the eNB and the UE perform contention resolution 1550 through a message that is conveyed in a PDSCH and is referred to as message 4 (Msg4). As is subsequently discussed, only the first two steps are needed for contention-free random access.

The four steps in FIG. 15 are now described in more detail. In Step 1, for contention-based random access, a UE acquires a SIB that conveys information for PRACH resources and for a PRACH format (examples are presented in FIG. 16). PRACH resources includes a set of SFs where a PRACH transmission can occur, of RBs where a PRACH can be transmitted in the frequency domain, and of a number of $(64-N_{cf})$ Zadoff-Chu (ZC) sequences for a UE to select from to generate an RA preamble ($N_{cf}$ is a number of ZC sequences reserved by an eNB to use for contention-free PRACH transmissions). A PRACH occupies 6 RBs. A UE transmits a PRACH using the determined PRACH resources thereby allowing an eNB to estimate transmission timing for the UE. UL synchronization is necessary as otherwise a UE cannot properly communicate other UL signaling to an eNB and can interfere with other UEs. Contention-free random access is triggered by an eNB through a transmission of a DCI format to the UE, referred to as PDCCH order, triggering a PRACH transmission from the UE. The PDCCH conveys a DCI format 1A that includes a RA preamble index and a RA preamble mask index that enables collision avoidance for the RA preamble transmission.

In Step 2, upon detecting a RA preamble transmitted from a UE, an eNB transmits a DCI format with CRC scrambled by a RA-RNTI and scheduling a PDSCH conveying a RAR. The RAR includes a timing advance (TA) command for the UE to adjust its transmission timing. The RAR also includes the associated RA preamble in order to link the TA command to a respective RA preamble and therefore to a respective UE. The RAR can also include an UL grant for the UE to transmit an Msg3 and a temporary C-RNTI (TC-RNTI) in case of contention-based random access or a PUSCH conveying data in case of contention-free random access. When a UE fails to detect, within a RAR time window configured by the eNB, a RAR that includes an RA preamble transmitted by the UE, the UE retransmits a PRACH, increases a respective preamble transmission counter and, when possible, a PRACH transmission power. In Step 3, a UE transmits Msg3 in a PUSCH where the Msg3 can include a TC-RNTI. The exact contents of Msg3 depend on the state of the UE and in particular on whether or not the UE is previously connected to the eNB. In Step 4, the eNB transmits a contention-resolution message to the UE in a PDSCH. Step 4 also resolves any contention issue that can arise when multiple UEs try to access a network using a same RA preamble. Once a random access process is successful, the TC-RNTI is converted to C-RNTI. Step 1 uses physical-layer processing specifically designed for a random access process. The subsequent three steps utilize a same physical-layer processing as for PDSCH or PUSCH transmissions after a UE has established communication with an eNB where Step 2 does not use HARQ retransmissions while Step 3 and Step 4 can use HARQ retransmissions.

Contention-free random access is for a UE to establish synchronization with a cell having a different timing advance group (TAG) than a cell where the UE has synchronized UL transmissions, for reestablishing UL synchronization upon DL data arrival, for handover, and for positioning. Only Step 1 and Step 2 of the random access process described above are used as there is no need for contention resolution in a contention-free scheme where Step 2 can deliver C-RNTI instead of TC-RNTI.

Figure 16:
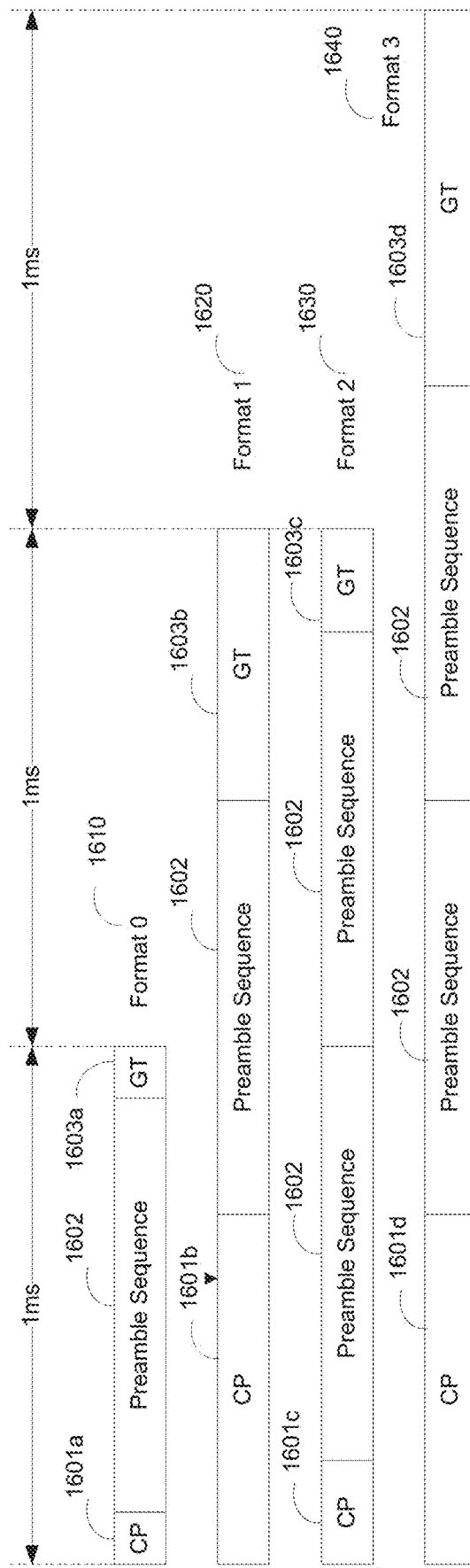
FIG. 16 illustrates four examples of PRACH formats according to this disclosure.

FIG. 16 illustrates four examples of PRACH formats according to this disclosure. The embodiment shown in FIG. 16 is for illustration only. Other embodiments could be used without departing from the scope of the present disclosure.

In each PRACH format, there is a cyclic prefix (CP) 1601, a preamble sequence 1602, and a guard time (GT) 1603. Each preamble sequence has a length of 0.8 milliseconds (ms). In format 0 410, both CP and GT are equal to approximately 0.1 ms. In format 1 1620, the CP and GT are respectively 0.68 ms and 0.52 ms. In format 2 1630 and format 3 1640, the preamble is repeated once to provide energy gain. In format 2, both CP and GT equal approximately 0.2 ms. In 3, the CP and GT are respectively 0.68 ms and 0.72 ms. An additional PRACH format, referred to as format 4, exists and is transmitted over two SF symbols in an UL pilot time slot (UpPTS) region of a special SF in time division duplex (TDD) systems.

Figure 17:
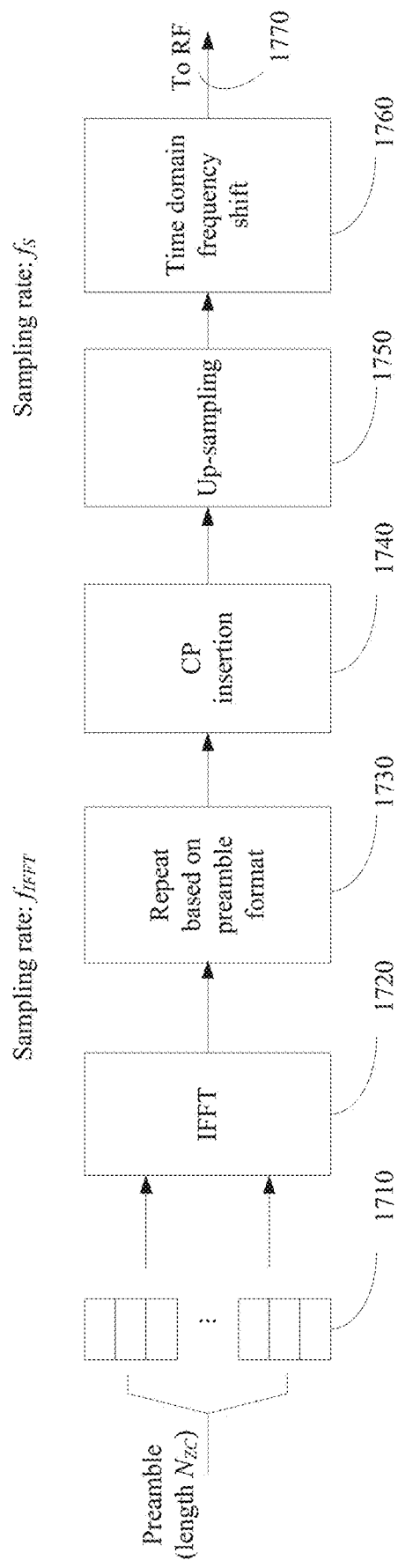
FIG. 17 illustrates an example for PRACH transmission from a UE according to this disclosure.

FIG. 17 illustrates an example for PRACH transmission from a UE according to this disclosure. The embodiment shown in FIG. 17 is for illustration only. Other embodiments could be used without departing from the scope of the present disclosure.

A RA preamble with length $N_{zC}$ 1710 is processed by an inverse fast Fourier transform (IFFT) 1720. The RA preamble is repeated based on a preamble format 1730 when the preamble format is 2, or 3. For preamble format 0 or 1, the RA preamble is not repeated. CP is inserted 1740 prior to the RA-preamble and up-sampling 1750 is subsequently applied. Finally, a time domain frequency shift 1760 is applied and a signal is transmitted by a radio frequency (RF) 1770 component of a UE.

Figure 18:
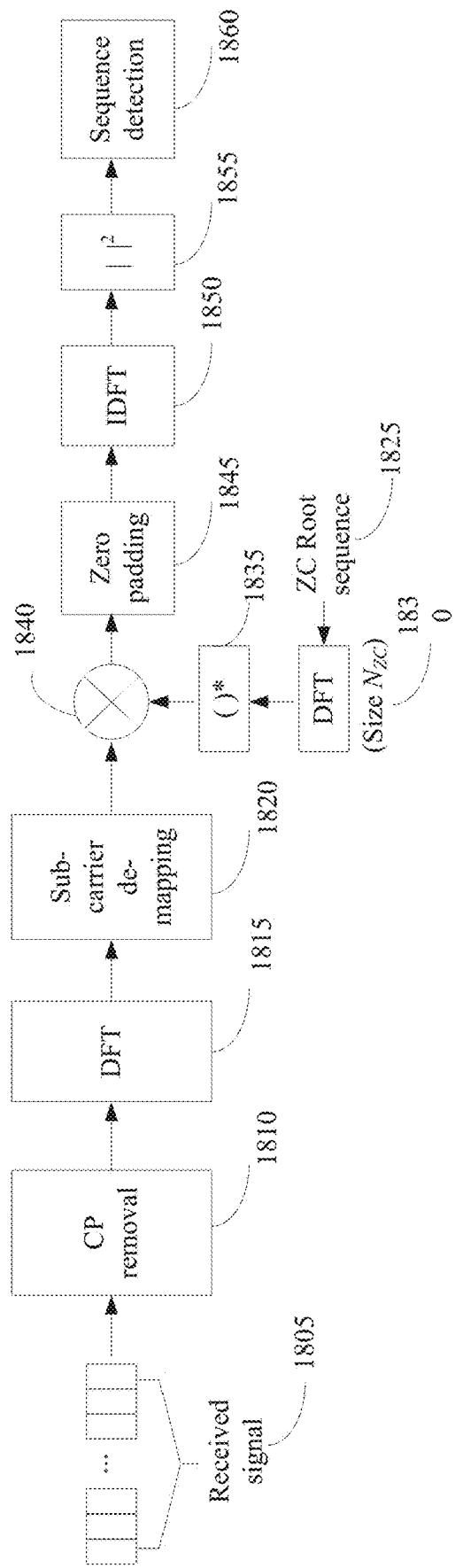
FIG. 18 illustrates an example for PRACH detection at an eNB according to this disclosure.

FIG. 18 illustrates an example for PRACH detection at an eNB according to this disclosure. The embodiment shown in FIG. 18 is for illustration only. Other embodiments could be used without departing from the scope of the present disclosure.

A received signal 1805 is first processed by CP removal unit 1810 and subsequently a discrete Fourier transform (DFT) is applied by DFT filter 1815 follow by RE demapping by demapper 1820 to obtain the REs of a RA preamble transmission. Correlation with a replica of a RA preamble that is the conjugate of the DFT 1830 of ZC root sequence 1825 is then applied by correlator 1840. For contention-based PRACH transmissions, the ZC sequence 1825 can be each of the available sequences. Zero padding 1845 is applied to the correlator output, the result is processed by inverse DFT (IDFT), the energy of the IDFT output is obtained 1855 and finally a sequence detection unit 1860 determines whether a RA preamble was transmitted based on a detected energy for a respective sequence where, for example, a sequence 1825 resulting a largest energy, or an energy above a threshold, can be considered as detected. When there are multiple receiver antennas, respective received signals can be combined 1855 before sequence detection 1860.

From a physical layer (L1) perspective, a random access process includes a transmission of an RA preamble and a RAR. Remaining messages are scheduled by higher layers on a PDSCH or a PUSCH and may not be considered as part of L1 random access process. The following steps 1 to 6 are required for a L1 random access process:

Step 1. A L1 RA process triggered upon a request of a preamble transmission by higher layers.

Step 2. A RA preamble index, a target PRACH received power (PREAMBLE_RECEIVED_TARGET_POWER), a corresponding RA-RNTI and a PRACH resource indicated by higher layers as part of the request.

Step 3. An PRACH transmission power $P_{PRACH}$ is determined as:

$P_{PRACH}$=min$\{P_{CMAX,c}(i)$, PREAMBLE_RECEIVED_TARGET_POWER+$PL_c\}$[dBm], where $P_{CMAX,c}(I)$ is a configured UE transmit power for SF i of cell c (see also REF 3), $PL_c$ is a DL path-loss estimate calculated in a UE for cell c, and PREAMBLE_RECEIVED_TARGET_POWER is a target received power.

Step 4. An RA preamble sequence selected from an RA preamble sequence set using the preamble index or indicated by a PDCCH order.

Step 5. A single preamble transmitted over 6 RBs using the selected preamble sequence with transmission power $P_{PRACH}$ on the indicated PRACH resource.

Step 6. Detection of a PDCCH with indicated RA-RNTI attempted during a RAR window controlled by higher layers. When detected, a corresponding transport block is passed to higher layers that parse the transport block and indicate an UL grant to the physical layer. This is referred to as RAR grant.

For a L1 random access process, an UL transmission timing for a UE after an PRACH transmission is as follows:

a. When a PDCCH with associated RA-RNTI is detected in SF n and a corresponding transport block in a PDSCH contains a response to a transmitted RA preamble sequence, a UE shall, according to information in the response, transmit a transport block in a PUSCH in a first SF $n+k_1$, $k_1 \geq 6$, when a UL delay field in RAR is set to zero where $n+k_1$ is a first available UL SF for PUSCH transmission. The UE shall postpone a PUSCH transmission to a next available UL SF after $n+k_1$ when the UL delay field is set to 1.

b. When a RAR is received in SF n and a corresponding transport block in a PDSCH does not contain a response to a transmitted preamble sequence, a UE shall, when requested by higher layers, transmit a new RA preamble sequence no later than in SF n+5.

c. When no RAR is received in SF n, where SF n is a last SF of a RAR window, a UE shall, when requested by higher layers, transmit a new preamble sequence no later than in SF n+4.

In case a random access procedure is initiated by a PDCCH order in SF n, a UE shall, when requested by higher layers, transmit an RA preamble in a first SF $n+k_2$, $k_2 \geq 6$, where a PRACH resource is available. When a UE is configured with multiple TAGs and when the UE is configured with a carrier indicator field (CIF) that is included in a DCI format conveyed by a PDCCH to identify an intended cell, the UE shall use the CIF value from the detected PDCCH order to determine the cell for a corresponding PRACH transmission.

Once a UE transmits a PRACH, and regardless of a possible occurrence of a measurement gap, the UE shall monitor a PDCCH for RAR scheduling. Such a PDCCH is identified by a RA-RNTI in a RAR window that starts at a SF that contains the end of a PRACH transmission plus three SFs and has length of ra-Response WindowSize SFs as configured by higher layers. A RA-RNTI associated with a PRACH is computed as:

$$RA\text{-}RNTI = 1 + t\_id + 10 * f\_id$$

where t_id is an index of a first SF of a specified PRACH ($0 \leq t\_id < 10$) and f_id is an index of a specified PRACH within that SF, in ascending order of frequency domain ($0 \leq f\_id < 6$). For a FDD system, f_id=0. A UE can stop monitoring for RAR(s) after successful reception of a RAR containing an RA preamble identifier that matches a transmitted RA preamble.

When using an unlicensed frequency band for communication between an eNB and a UE, such communication can often have to satisfy regulatory requirements for using the unlicensed frequency band. A first requirement can be that a transmission from either the eNB or the UE occupies at least eighty percent (80%) of an available BW on the unlicensed frequency band. A second requirement can be that a transmission power per megahertz (MHz), also referred to as power spectral density (PSD), does not exceed a predefined value such as 10 or 13 deciBell per milliwatt (dBm). Additional requirements can also exist. For example, a third requirement can be that prior to transmitting in an unlicensed frequency band, an eNB or a UE perform a listen before talk (LBT) procedure to contend for access to the unlicensed frequency band. An LBT procedure can include a clear channel assessment (CCA) procedure to determine whether or not a channel in the unlicensed frequency band is available. When the CCA determines that the channel is not available, for example because it is used by another device such as a WiFi device, the eNB or the UE can apply an extended CCA procedure to increase a likelihood of gaining access to the unlicensed frequency band. An extended CCA procedure includes a random number of CCA procedures (from 1 to q) according to an extended CCA counter. Each CCA procedure can include detecting an energy level on the channel of the unlicensed frequency band and determining whether or not the energy level is below a threshold. When the energy level is at or below the threshold, the CCA procedure is successful and the eNB or the UE can access the channel. When the energy level is above the threshold, the CCA procedure is unsuccessful and the eNB or the UE cannot access the channel.

A maximum PSD requirement can result to a limited coverage for transmission from a UE to an eNB when using an unlicensed frequency band. Typically, a maximum UE transmission power can be 23 dBm but a UE needs to reduce it, for example to 10 dBm, when the UE transmits a signal with continuous BW occupation over 1 MHz. One way to satisfy a maximum PSD requirement while avoiding materially compromising UL coverage is for a UE to transmit a signal having a discontinuous BW occupation. For example, a UE can transmit an UL channel, such as a PUSCH or a PUCCH, over one or more RBs that are interleaved throughout a BW of an unlicensed frequency band so that the PSD in the one or more RBs, each RB spanning 180 KHz, can be 23 dBm but the PSD per MHz can be less that the maximum value specified by regulations. For example, for a BW of 20 MHz corresponding to 100 RBs, when a UE transmits an UL channel in one RB every ten RBs and the maximum PSD requirement is 10 dBm over six RBs (1.08 MHz), the UE can transmit the UL channel with a PSD of 2.2 dBm per RB or 22.2 dBm over the ten discontinuous RBs.

As unlicensed frequency bands cannot be guaranteed to be available at any time instance and cannot offer seamless mobility support, carrier aggregation (CA) is one possible mechanism to exploit unlicensed frequency bands while maintaining continuous connectivity through a licensed band. A band can also be referred to as a carrier or as a cell and CA operation for a UE can include communication on both one or more licensed cells and one or more unlicensed cells.

Random Access in Unlicensed Carriers

Figure 19:
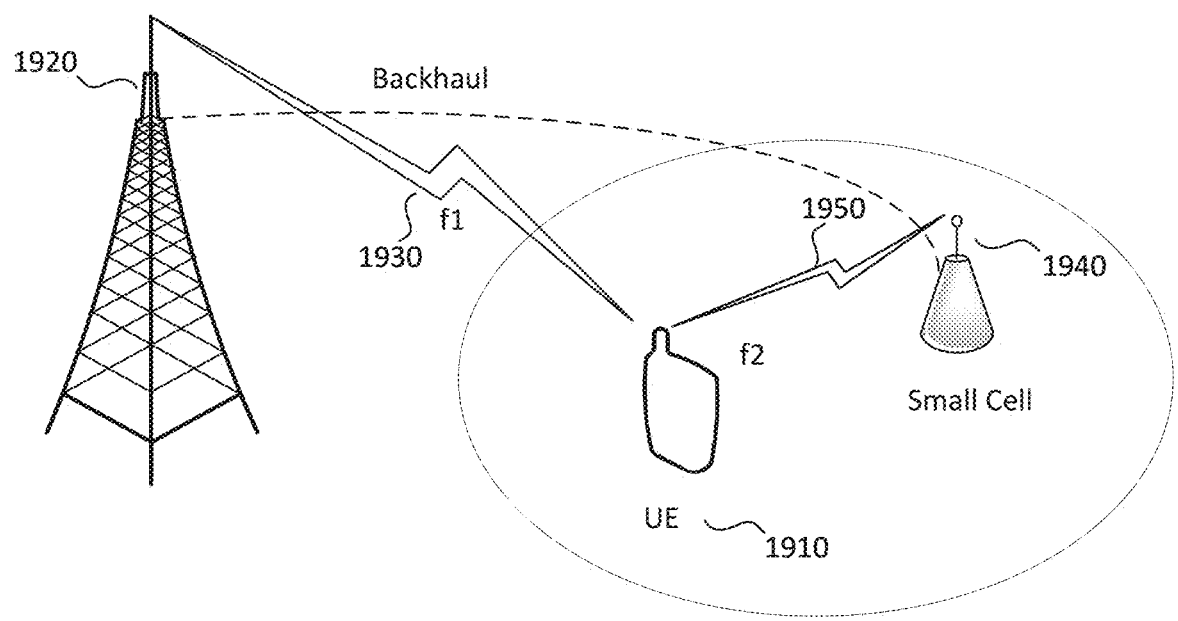
FIG. 19 is a diagram illustrating a communication using CA according to this disclosure.

FIG. 19 is a diagram illustrating a communication using CA according to this disclosure. The embodiment shown in FIG. 19 is for illustration only. Other embodiments could be used without departing from the scope of the present disclosure.

A UE 1910, communicates with a first cell 1920 corresponding to a macro-cell using a first carrier frequency f1 1930 and with a second cell 1940 corresponding to a small cell over carrier frequency f2 1950. The first carrier frequency can correspond to a licensed frequency band and the second carrier frequency can correspond to an unlicensed frequency bad. The first cell and the second cell are connected over a backhaul that introduces negligible latency.

As a distance from a UE to a first cell can be different than a distance from the UE to a second cell, the UE needs to apply a different timing advance command for transmissions to the first cell than for transmission to the second cell. A group of cells that includes a primary cell (PCell) and requires a first timing advance (TA) are referred to as a primary timing advance group (pTAG) while a group of secondary cells that do not belong in the pTAG are referred to as secondary TAG (sTAG). A PDCCH order is typically used to enable contention-free random access in order for a UE to transmit a PRACH to a cell in the sTAG and then obtain a timing advance (TA) command from a RAR message following the PRACH transmission in order for the UE to synchronize its transmission. Several design aspects need to be addressed for a random access process on an unlicensed cell in order to fulfill regulatory requirements and coexist with other UL transmissions that can be over clusters of RBs as in FIG. 9.

A design aspect results from a need to satisfy a regulatory requirement for a maximum transmission power per MHz while providing a PRACH structure that can avoid a coverage loss associated with limitations in the maximum transmission power of the UE.

A second design issue relates to enabling a coexistence among PUSCH or PUCCH transmissions having an interleaved RB structure and a PRACH transmission over a number of contiguous RBs such as 6 RBs.

A third design issue is to improve a probability for a PRACH transmission considering that an intended unlicensed cell that is indicated by a PDCCH order can be unavailable at a time of the PRACH transmission.

A fourth design issue is to improve a probability for a successful RAR transmission in response to a PRACH transmission on an unlicensed cell.

Therefore, there is a need to design a PRACH transmission structure that enables increased coverage while satisfying a regulatory requirement for a PSD.

There is another need to support coexistence of UL transmissions using a waveform of interleaved RBs and of a PRACH transmission over a number of contiguous RBs.

There is another need to increase a probability of a PRACH transmission on a sTAG with unlicensed cells.

Also, there is another need to increase a probability of a RAR reception associated with PRACH transmission on one or more unlicensed cells.

The following descriptions primarily consider contention-free random access but general aspects for a random access process, including contention-based random access, are also considered.

PRACH Structure for Increase Coverage in an Unlicensed Cell

A PRACH needs to be able to provide time accuracy in the range of 3 microseconds. For example, for TDD operation, a typical requirement is for synchronization of +/−1.5 microseconds. Even a tighter synchronization requirement, such as +/−0.5 microseconds, is required to enable positioning or coordinated multi-point (CoMP). A PRACH transmission over 6 RBs, corresponding to a BW of 1080 KHz, can theoretically provide a timing accuracy that is inversely proportional to the transmission BW or equivalently about +/−0.5 microseconds. Considering an existence of UEs with low signal-to-interference and noise ratios (SINR), a timing accuracy within +/−1.5 microseconds can be obtained for practically all UEs in a cell.

PRACH transmissions on an unlicensed cell need to achieve a same level of time estimation accuracy as PRACH transmissions on a licensed cell. This cannot be achieved by a PRACH transmission over a cluster of interleaved RBs with large separation, such as in FIG. 9, as a channel medium cannot be guaranteed to be relatively constant between any two RBs. Then, an eNB needs to obtain a time estimate over 1 RB and a resulting accuracy is 6 times worse than the one obtained over 6 contiguous RBs as for a PRACH transmission on a licensed cell.

A UE communicating on an unlicensed cell is typically limited in mobility and channel coherence in the time domain is larger than the channel coherence in the frequency domain. Regarding frequency coherence, for the ETU channel, an root mean square (rms) delay spread of τ=1 microsecond, the 50% and 90% coherence BWs are respectively 1/(5τ) and 1/(50τ) or 200 KHz and 20 KHz while for the EPA channel, the rms delay spread of τ=0.05 microseconds, the 50% and 90% coherence BWs are respectively 4 MHz and 400 KHz. Therefore, when RBs for a PRACH transmission have a large separation in the frequency domain, it is not possible for an eNB to perform frequency interpolation of a received signal across RB and the eNB needs to perform cross-correlations to determine a PRACH arrival time per RB. Regarding time coherence, using Clarke's model for a Doppler frequency of $f_D$, the 50% channel coherence time is $\sqrt{9/(16\pi \cdot f_D^2)}$. For a UE speed of 30 kilometers per hour, the 50% channel coherence time is ~1.7 milliseconds while a minimum sampling interval (in theory) to reconstruct the channel is $1/(2 \cdot f_D)$ or 3 milliseconds and both are substantially larger than the SF symbol duration of about 71.4 microseconds. Therefore, time-domain interpolation over a few SF symbols can be performed while frequency domain interpolation over RBs separated by about 1 MHz or more cannot be performed.

For relatively small cell sizes, such as ones with radius up to 1.4 Km, PRACH format 4 can be used. Transmission can be in 2 SF symbols and the UpPTS part of a special SF can be used. However, as the PRACH needs to be transmitted over 6 consecutive RBs, whenever regulatory requirements need to be satisfied, the maximum PSD needs to be in the range of 10 dBm/MHz and this can significantly limit coverage even for small cell sizes due to shadowing. The coverage loss can be compensated by repetitions of the PRACH format 4 over one SF. With 6 repetitions over one SF of 14 symbols (two SF symbols are not used for repetitions in order to allow for CCA and possibly SRS transmission) the coverage gain is about 8 dB and, combined with an additional about 4 dB gain due to frequency diversity, can provide a similar coverage on an unlicensed cell for a maximum UE transmission power of 10 dBm/MHz as on a licensed cell for a maximum UE transmission power of 23 dBm/MHz (or 23 dBm per 1.08 MHz for 6 RBs).

Figure 20:
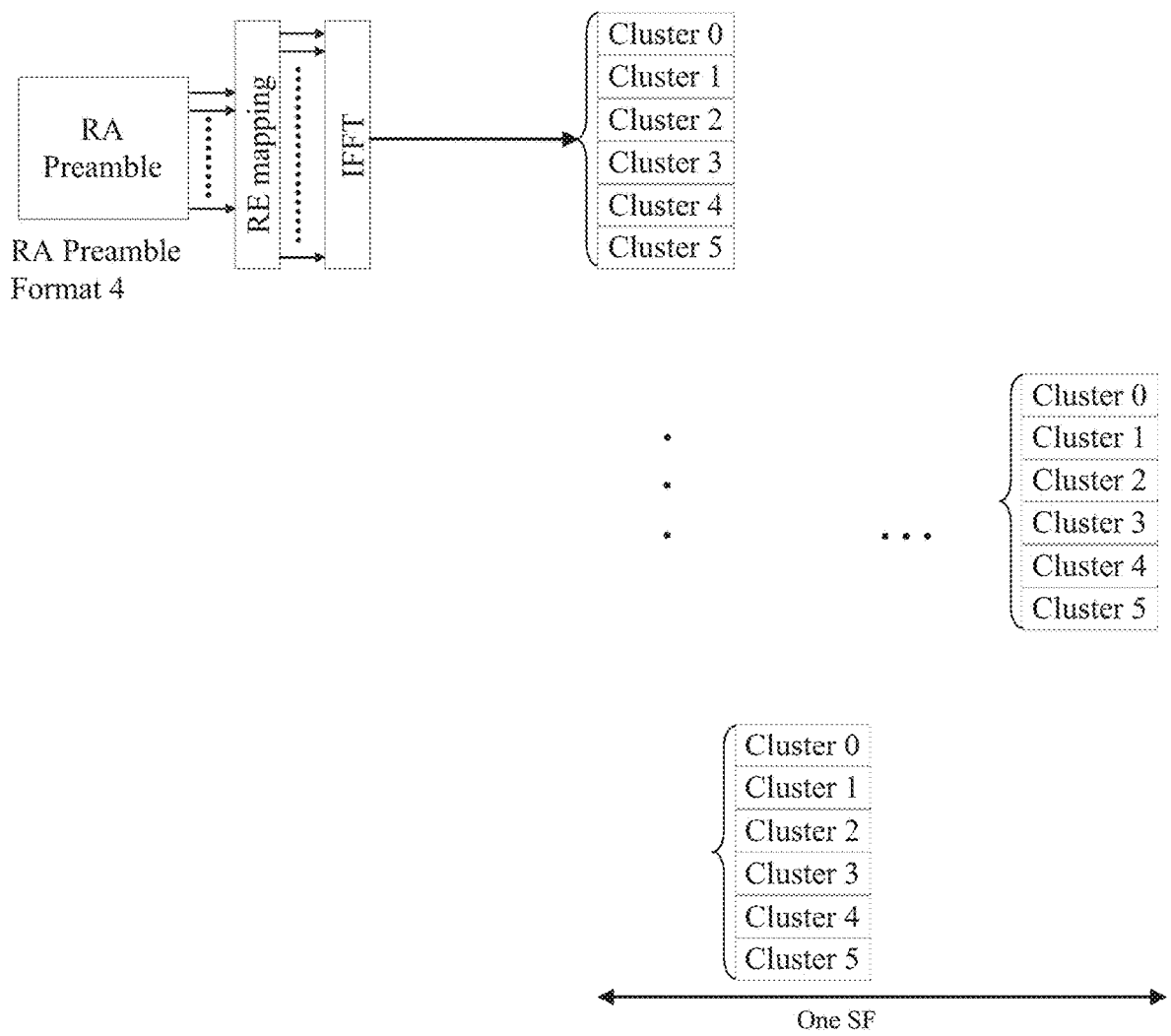
FIG. 20 illustrates repetitions of a PRACH format 4 transmission over six of the twelve symbols of a SF that includes fourteen symbols according to this disclosure.

FIG. 20 illustrates repetitions of a PRACH format 4 transmission over six of the twelve symbols of a SF that includes fourteen symbols according to this disclosure. The embodiment shown in FIG. 20 is for illustration only. Other embodiments could be used without departing from the scope of the present disclosure.

For a PRACH format 4 transmission with repetitions in the time domain over one SF, an effective transmission duration is same as for a single PRACH format 0 and therefore a same channel access priority class can apply.

For larger cell sizes, such as ones with radius between about 1.4 Km and 14 Km, a longer PRACH duration of about one SF is needed such as one based on PRACH format 0. Then, an associated propagation delay and time uncertainty can be accommodated through a longer GT. Considering that it is desirable to minimize an orthogonality loss in the frequency domain between PRACH REs and surrounding PUSCH REs, an RE spacing for PUSCH needs to be an integer multiple of the RE spacing for the PRACH. For a 15 KHz RE spacing for the PUSCH, an RE spacing for a new PRACH format can be same as for PRACH format 0 and equal to 1.25 KHz resulting to an RA preamble sequence length of 800 microseconds or equal to 2.5 KHz resulting to an RA preamble sequence length of 400 microseconds.

For PRACH duration of 13 SF symbols (928 microseconds), 128 microseconds need to be allocated to the CP duration and the GT duration. To maximize coverage for a maximum delay spread of 6 microseconds, the CP duration is (928−800)/2+6/2=67 microseconds, a resulting GT duration is 61 microseconds and a supportable cell radius of (3e8×61e−6)/2=9.15 Km. Then, a CP duration can be 2048 samples and a GT duration can be 1884 samples, or 1856 samples for an integer multiple of 64, where a sample duration is 1/30.72 microseconds. For PRACH duration of 12 SF symbols or 857 microseconds, 57 microseconds need to be allocated to the CP duration and the GT duration. For CP duration of 31 microseconds, a resulting GT duration is 26 microseconds and a supportable cell radius of (3e8×26e−6)/2=3.9 Km.

As a supportable cell radius materially reduces when reducing a PRACH transmission period to less than one SF, it is beneficial to consider sequence lengths shorter than 800 microseconds and CP and GT durations above 100 microseconds while maintaining a RE spacing for the PRACH that is an integer sub-multiple of the RE spacing of 15 KHz assumed for other UL transmissions. For a RE spacing of 2.5 KHz, a RA preamble sequence length is 400 microseconds. A ZC sequence of length (prime number) in the range of 400 can be used, such as for example 409, 419, 421, 431, and so on. For CP duration of 231 microseconds, GT duration can be 226 microseconds and a supportable cell radius is (3e8×226e−6)/2=33.9 Km. Similar, for a PRACH transmission over a partial SF of 1 slot (500 microseconds), a CP duration can be (500−400)/2+6/2=53 microseconds, a GT duration can be 47 microseconds, and a supportable cell radius is (3e8×100e−6)/2=15 Km. However, even though the supportable cell radius increases, a supportable cell coverage decreases by 3 dB and the RA preamble sequence length decreases by a factor of 2. Repetitions in the frequency domain such as over multiple sub-bands of 6 RBs or in the time domain such as over two or more SFs can be considered to recover the 3 dB loss in coverage and provide additional coverage. A modified PRACH format 0, referred to as PRACH format 5, is transmitted over 12 SF symbols or 13 SF symbols.

For power limited UEs, one approach to overcome a coverage loss from a regulatory PSD constraint regarding a maximum transmission power per MHz and avoid transmitting a PRACH over substantially the whole system BW, is to modify the PRACH transmission structure to be intermittent in frequency per SF symbol. A UE can concentrate a PRACH transmission power in some of the 6 RBs per SF symbol by nulling REs for the other RBs. An eNB can reconstruct the PRACH transmission over the 6 RBs by combining individual transmissions per RB in each of the 6 RBs.

Figure 21:
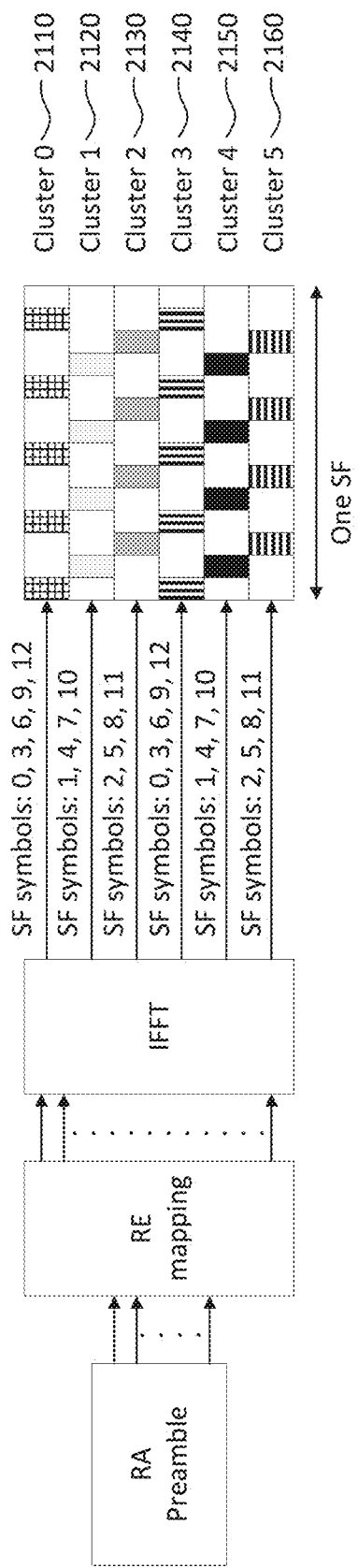
FIG. 21 illustrates a first example for a modified PRACH transmission structure over 12 SF symbols according to this disclosure.

FIG. 21 illustrates a first example for a modified PRACH transmission structure over 12 SF symbols according to this disclosure. The embodiment shown in FIG. 21 is for illustration only. Other embodiments could be used without departing from the scope of the present disclosure.

A PRACH transmission is over SF symbols {0, 3, 6, 9, 12} in a first RB and in a fourth RB associated with RB cluster 0 2110 and RB cluster 3 2140, respectively, over SF symbols {1, 4, 7, 10} in a second RB and in a fifth RB associated with RB cluster 1 2120 and RB cluster 4 2150, respectively, and over SF symbols {2, 5, 8, 11} in a third RB and in a sixth RB associated with RB cluster 2 2130 and RB cluster 5 2160, respectively. It is also possible for a UE to not transmit the PRACH in SF symbol number 13, depending on a design for a LBT observation interval and possible SRS transmissions. Although the PRACH transmission is shown to not occur in the last SF symbol, the PRACH transmission can instead not occur in the first SF symbol when CCA and LBT occur in the first SF symbol.

The PRACH transmission structure in FIG. 21 can be beneficial to a coverage limited UE. For a non-coverage limited UE or, in general, for any UE when some coverage loss can be acceptable or can be compensated by time diversity from additional PRACH transmissions, either by separate respective PDCCH orders or by a single PDCCH order also indicating a number of PRACH transmissions in time, the PRACH repetition structure can be same as on an licensed cell over 6 consecutive RBs but also repeat in the frequency domain to provide for repetition gain and frequency diversity gain. For example, in case of two repetitions in the frequency domain, such a transmission structure can provide about a 7 dB gain and overcome most of the coverage loss associated with a regulatory PSD constraint.

To maximize frequency diversity, two repetitions of a PRACH transmission can be located at the two edges of the system BW as there is either no PUCCH region on an unlicensed cell or a PUCCH is transmitted similar to a PUSCH using an interleaved structure over one or more RB clusters. This also results to different clusters of RBs that can be used for PUSCH or PUCCH transmissions being affected by the PRACH transmission. Alternatively, in order to ensure that some RB clusters do not have any overlapping RBs with repetitions of a PRACH transmission, the same RB clusters can be used for the repetitions of the PRACH transmission. For example, only clusters 1 to 6 or only clusters 5 to 10 can be used for repetitions of a PRACH transmission and this can be predetermined in the system operation, or configured to UEs by higher layers, or dynamically indicated by a UE-common DCI format or by the DCI format corresponding to the PDCCH order. In this manner, remaining RB clusters can be ensured to be free of PRACH transmission and this can be beneficial for transmission of information requiring enhanced reliability, such as UCI, that can be configured to occur in the remaining clusters of RBs.

Figure 22:
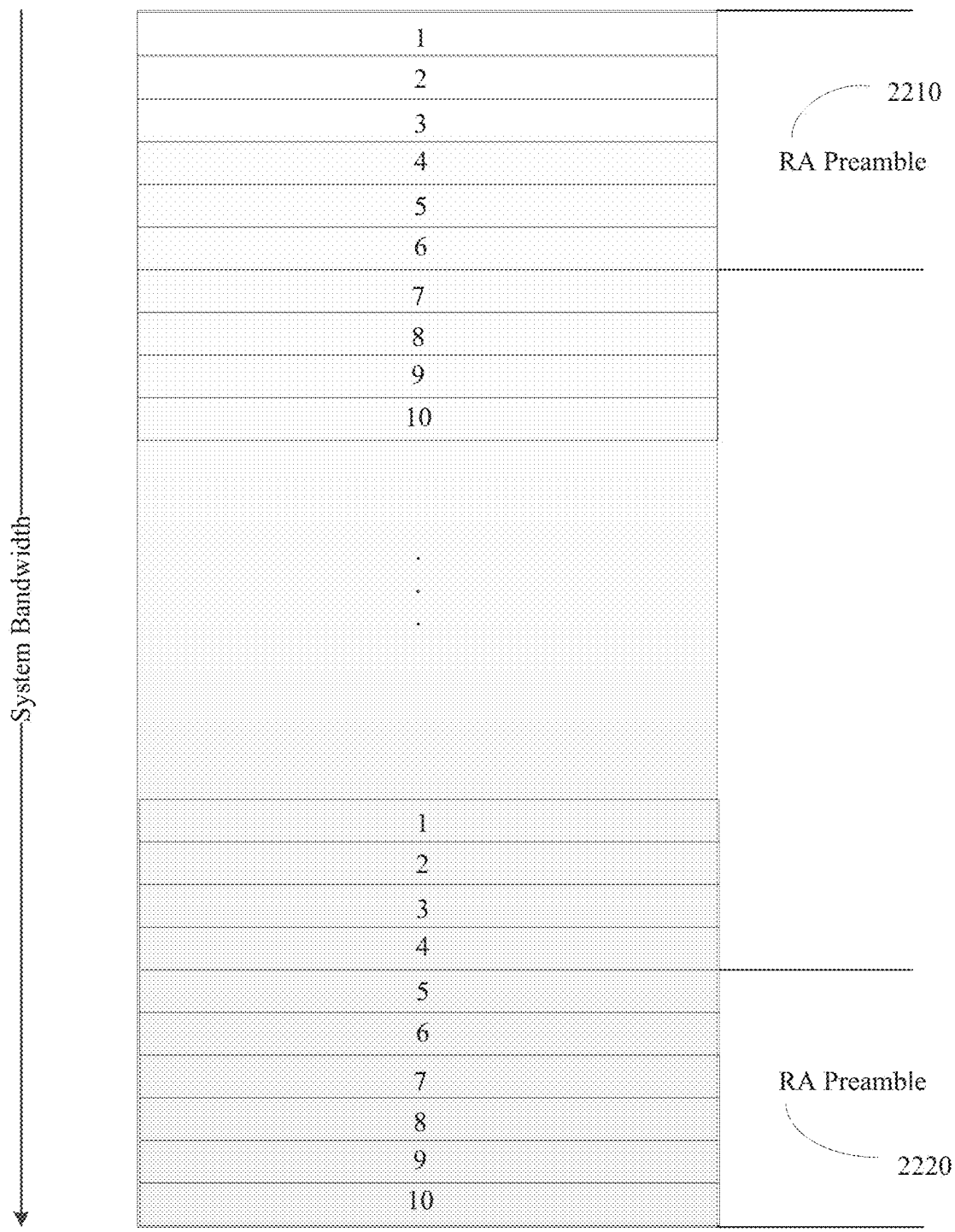
FIG. 22 illustrates a PRACH transmission with two repetitions in the frequency domain during a same SF for a PRACH format based on PRACH Format 0 according to this disclosure.

FIG. 22 illustrates a PRACH transmission with two repetitions in the frequency domain during a same SF for a PRACH format based on PRACH Format 0 according to this disclosure. The embodiment shown in FIG. 22 is for illustration only. Other embodiments could be used without departing from the scope of the present disclosure.

The PRACH transmission is repeated at the two edges of a system BW. A first repetition is over a first 6 RBs of the system BW 2210 and a second repetition is over a last 6 RBs of the system BW 2220. For example, for a system BW of 100 RBs and 10 clusters of RBs with 10 RBs per cluster, the first repetition is over one RB for each of the first 6 clusters and the second repetitions in over one RB for each of the last 6 clusters. As each cluster of RBs can be used for PUSCH or PUCCH transmissions, the PRACH transmission structure in FIG. 22 minimizes a number of clusters where a PUSCH or PUCCH transmission needs to be punctured in order to accommodate a repetition of a PRACH transmission as only the clusters with index 5 and 6 have 2 RBs used for the PRACH transmission while the remaining clusters have 1 RB used for the PRACH transmission.

An indication for a PRACH transmission structure, for example between the ones in FIG. 21 and FIG. 22, can be provided by the DCI format conveying the PDCCH order or can be configured to a UE from an eNB by higher layer signaling, for example depending on whether or not the UE is power limited as the eNB can determine, for example, from a measured received signal power or from a power headroom report from the UE.

A PDCCH order from an eNB to a UE can include information for a number of PRACH repetitions from the UE that the eNB can determine, for example based on a received signal power or on a power headroom report from the UE. The frequency locations for the PRACH repetitions can be derived from the number of PRACH repetitions, as it is next described, or can be indicated by the DCI format conveying the PDCCH order or by a UE-common DCI format.

Let $N_{RB}$ be a number of RBs in a system bandwidth where the RBs are indexed in ascending frequency order. For a PRACH transmission over $N_{PRACH}^{RB}$, such as over $N_{PRACH}^{RB}=6$ RBs, there are a total of $N_{SB}=\lfloor N_{RB}/N_{PRACH}^{RB} \rfloor$ sub-bands of $N_{PRACH}^{RB}$ RBs in the system bandwidth. The $N_{RB}-\lfloor N_{RB}/N_{PRACH}^{RB} \rfloor \cdot N_{PRACH}^{RB}$ RBs that do not belong in a sub-band can be located at the two edges of the system bandwidth in an alternating manner starting, for example, from the lowest RB index, or can be located in the middle of the system bandwidth.

In a first approach, for a PRACH transmission with $R_{PRACH}$ repetitions, the repetitions can be in sub-bands with respective indexes $n_{SB}=(n_{SB,0}+i \cdot \lfloor N_{SB}/R_{PRACH} \rfloor) \bmod N_{SB}$, where $i=0,1,\ldots,R_{PRACH}-1$. The sub-band for the first repetition, $n_{SB,0}$, can be the first of the $N_{SB}$ sub-bands ($n_{SB,0}=0$), or can be configured to a UE by an eNB through higher layer signaling, or can be pseudo-random and, for example, determined as $N_{ID}^{cell} \bmod N_{SB}$ where $N_{ID}^{cell}$ is a physical identity for the eNB.

In a second approach, the sub-bands for $R_{PRACH}$ repetitions of a PRACH transmission can be defined relative to each edge of the system bandwidth and $N_{SB}^{1,2}=\lfloor N_{RB}/(2 \cdot N_{PRACH}^{RB}) \rfloor$ sub-bands are indexed in ascending frequency order from the low end of the system BW and in descending frequency order from the high end of the system bandwidth. PRACH repetitions with even indexes can be in respective sub-bands with indexes $n_{SB}=(n_{SB,0}+i \cdot \lfloor N_{SB}/R_{PRACH} \rfloor) \bmod N_{SB}$, where $i=0, 2, \ldots, R_{PRACH}-1$, and PRACH repetitions with odd indexes can be in respective sub-bands with indexes $n_{SB}=(N_{SB}-n_{SB,0}-(i-1) \cdot \lfloor N_{SB}/N_{PRACH}^{RB} \rfloor) \bmod N_{SB}$, where $i=1, 3, \ldots, R_{PRACH}-1$.

For a PRACH transmission on a licensed cell, from the 864 REs with spacing of 1.25 KHz allocated to PRACH transmission, only 839 REs are used while the remaining 25 REs provide a guard-band of 12.5 REs from each side of the PRACH transmission BW in order to mitigate interference from surrounding PUSCH transmissions as the RE spacing (1.25 KHz) of a PRACH transmission is different than the RE spacing (15 KHz) of a PUSCH transmission. For a PRACH transmission on an unlicensed cell, the transmission can be at the two edges of the system BW. A guard band can therefore be placed only in the interior of the system BW to provide increased protection to the PRACH transmission from data interference and the size of the guard band can be double the one for a PRACH transmission on a licensed cell.

Figure 23:
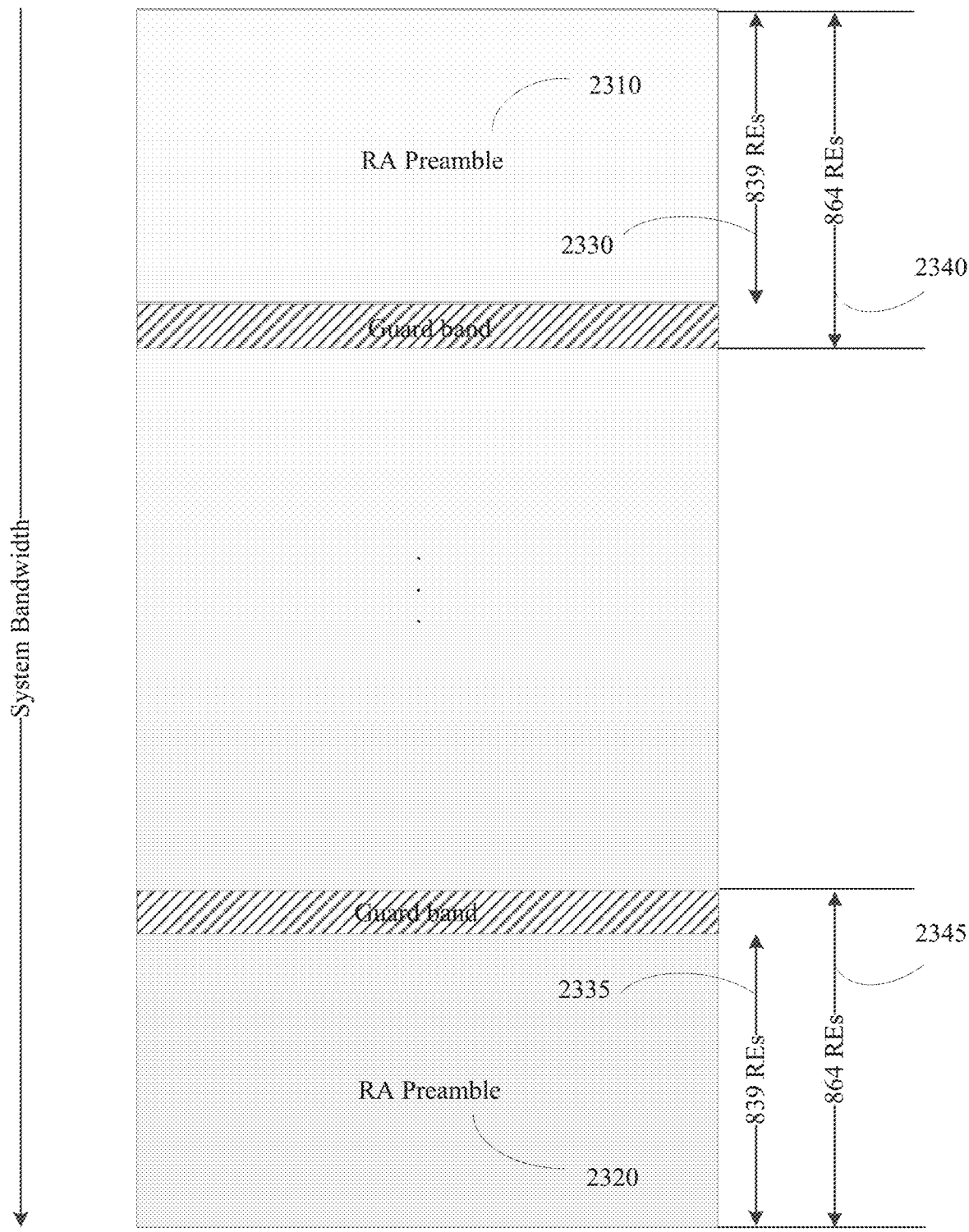
FIG. 23 illustrates a placement of guard-bands for a PRACH transmission on an unlicensed cell when the PRACH is transmitted at either or both edges of a system BW.

FIG. 23 illustrates a placement of guard-bands for a PRACH transmission on an unlicensed cell when the PRACH is transmitted at either or both edges of a system BW. The embodiment shown in FIG. 23 is for illustration only. Other embodiments could be used without departing from the scope of the present disclosure.

A PRACH transmission from a UE is located either at a lower edge of a system BW 2310 or at a higher edge of the system BW 2320, or both in case the PRACH transmission is with repetitions in the system BW. A PRACH is transmitted over a number of consecutive REs, such as 839 REs, 2330 or 2335, that include the first RE or the last RE in the system BW, respectively. A number of additional REs, such as 25 REs, are all placed towards the interior of the system BW, 2340 or 2345, after the REs allocated to the PRACH transmission.

Coexistence of PRACH Transmissions and PUSCH/PUCCH Transmissions on an Unlicensed Cell As a PRACH transmission overlaps with RBs from one or more clusters of RBs allocated to PUSCH or PUCCH transmissions, a UE configured to transmit PUSCH or PUCCH over a number of clusters of RBs that include some of the one or more cluster of RBs needs to be informed of an existence of a PRACH transmission in order to perform appropriate rate matching and exclude RBs used for PRACH transmission from RBs used to transmit the PUSCH or PUCCH.

In a first example, since a non-contention based PRACH transmission is dynamic as triggered by a PDCCH order, it is beneficial to also dynamically indicate to UEs an upcoming PRACH transmission through a UE-common DCI format that is decoded by all UEs communicating on a same unlicensed cell. Given that a PDCCH order in SF n triggers a PRACH transmission in a first available SF $n+k_2$, $k_2 \geq 6$, the UE-common DCI format informing UEs of upcoming PRACH transmissions can be transmitted in SF n or in a later SF. For transmissions on an unlicensed cell that includes a series of DL SFs, followed by a special SF (partial DL SF, GP, partial UL SF), and then followed by a series of UL SFs prior to a next DL SF, when any, a DCI format informing of an upcoming PRACH transmission can be same as a UE-common DCI format, with size equal to a size of DCI Format 1C, that informs at least of a configuration for a number of DL symbols and a number of UL symbols in the special SF (see also REF 2 and REF 3).

When a possible SF for a PRACH transmission is predetermined, such as a first normal UL SF after a series of DL SFs, when any, or the sixth or seventh SF for a maximum channel occupancy time (MCOT) often SFs, and so on, the UE-common DCI format needs to include only one bit to indicate whether a PRACH transmission is expected in the SF. When a possible UL SF for a PRACH transmission is not predetermined, the UE-common DCI format can include an indication of the UL SF (SF offset relative to the SF of the UE-common DCI format transmission). For example, for a maximum number of 8 continuous normal UL SFs in an MCOT of 10 SFs and use of only one SF for PRACH transmission per MCOT, the indication in the UE-common DCI format can be by 3 bits that provide a SF number from the 8 SFs. When multiple SFs can be available for a PRACH transmission, the indication can be by a bit-map when a number of available SFs is not predetermined or can include a combinatorial mapping when a number of available SFs is predetermined. This signaling mechanism for indicating available SFs for a PRACH transmission can be applicable to both contention-based and contention-free PRACH transmissions.

Figure 24:
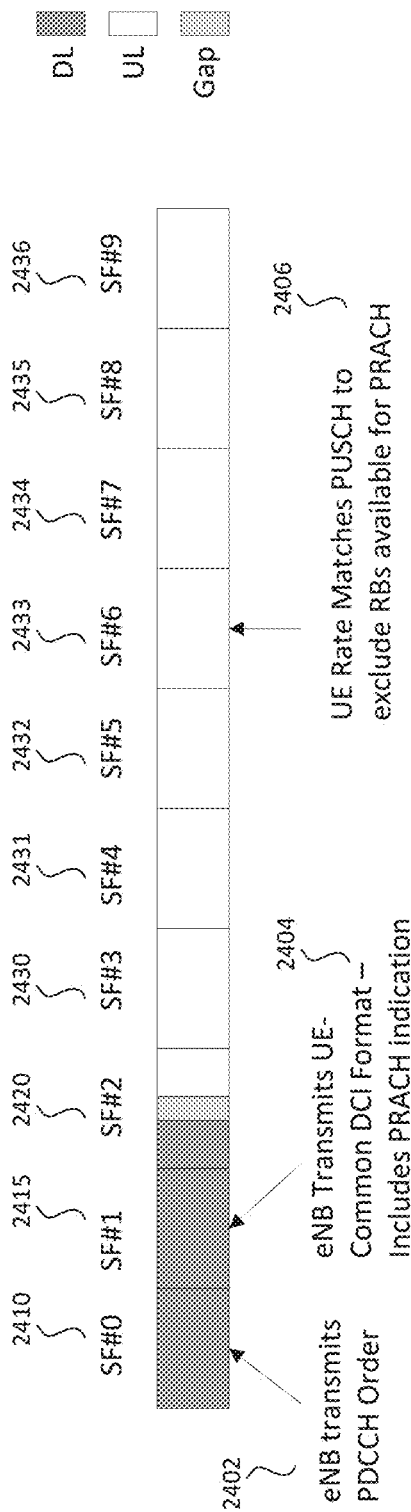
FIG. 24 illustrates a mechanism for indicating an SF for a PRACH transmission according to this disclosure.

FIG. 24 illustrates a mechanism for indicating an SF for a PRACH transmission according to this disclosure. The embodiment shown in FIG. 24 is for illustration only. Other embodiments could be used without departing from the scope of the present disclosure.

An eNB transmits a PDCCH order 2402 in a first SF 2410 often SFs corresponding to an MCOT. The eNB transmits a UE-common DCI format 2404 in a second SF 2415 that indicates that PRACH transmission is enabled during the MCOT. Although the PDCCH order transmission is shown in the first SF 2410, it can instead or also be in the second SF 2415. The UE-common DCI format can also include indication for a number of DL SF symbols and a number of UL SF symbols in a third SF 2420 and also include an indication for a number of UL SFs following the third SF 2420. A UE that detects the UE-common DCI format and is scheduled a PUSCH transmission in SF 2433 that includes one or more RBs that can be used for PRACH transmission, does not transmit the PUSCH in the one or more RBs and rate matches the PUSCH transmission in remaining allocated RBs 2406. The RBs available for the PRACH transmission can be predetermined, for example as in FIG. 22, or can be signaled in a SIB.

In FIG. 24, the SF for the PRACH transmission is either assumed to be predetermined and derived, for example as the sixth SF in the MCOT of ten SFs, or is indicated in the UE-common DCI format. For example, a 2-bit field can indicate whether the SF for the PRACH transmission is the fourth, fifth, sixth, or seventh, SF after the SF of the UE-common DCI transmission, that is, indicate a SF offset after the SF of the UE-common DCI transmission. This implies that a UE that detects the PDCCH order also needs to detect the UE-common DCI format in order to determine the available SF for PRACH transmission. In that sense, the UE-common DCI format provides system information to UEs. Activation by a UE-common DCI format can also apply, in a similar manner as for a PRACH transmission scheduled by a PDCCH order, for a PUSCH transmission scheduled by an UL DCI format.

To further optimize a PRACH transmission in response to a PDCCH order by enabling a UE that detects the PDCCH order and fails to detect the UE-common DCI to be able to transmit the PRACH, the available SF for PRACH transmission can also be indicated in a DCI format conveying the PDCCH order. Moreover, the UE-common DCI can indicate a SF for PRACH transmission for a next MCOT. For example, this can be applicable when regulatory requirements mandate an MCOT of only four SFs. The above consider than only one SF per MCOT can be used for PRACH transmissions based on respective PDCCH orders. When more than one SF can be used, the UE-common DCI format can include respective signaling to indicate the multiple SFs such as for example a bit-map with size equal to the number of UL SFs where a bit value of '1' can indicate a SF available for PRACH transmission.

As an MCOT of an unlicensed cell is limited by regulation, it is also possible to shorten the time for triggering a PRACH transmission on an unlicensed cell to be less than 6 SFs after the SF of the PDCCH order transmission. For example when a UE detects a PDCCH order in SF n, the UE can be expected to transmit an PRACH in a first available SF $n+k_3$, $k_3 \geq 4$.

In a second example, SFs that are available for PRACH transmission are signaled in a SIB. When a UE determines that a SF indicated as available for PRACH transmission in a SIB includes DL transmissions, for example by measuring a RS transmitted by an eNB or by detecting a UE-common DCI format indicating a partitioning of DL SFs and UL SFs in a MCOT, the UE does not transmit a PRACH for contention-based PRACH or, for contention-free PRACH, when the SF satisfies a timing relationship such as being 6 SFs after a SF where the UE detects a PDCCH order. Moreover, UEs having a PUSCH transmission in a SF indicated as available for PRACH transmission, rate match the PUSCH transmission by excluding RBs that can be used for PRACH transmission.

In a third example, a specification of a system operation predefines an SF within an MCOT, when any, to always include resources for a PRACH transmission. For example, the SF can be a last SF in a number of consecutive UL SFs. A UE transmitting PUSCH or PUSCH in the SF rate matches a respective transmission to exclude RBs that can potentially be used for PRACH transmission by other UEs.

The UE-common DCI format can additionally include information for a number of repetitions in the frequency domain, each repetition including Nm RBs, for a PRACH transmission. Based on the number of repetitions, locations for the respective sub-bands in a system bandwidth can be derived, for example as it was previously described by using the first approach or the second approach for determining the sub-bands associated with a number of repetitions for a PRACH transmission. Then, a UE with a PUSCH or PUCCH transmission can determine RBs that, although allocated for the PUSCH or PUCCH transmission, are not used to transmit the PUSCH or PUCCH as they can be used for one or more repetitions of the PRACH transmission. For a UE with a PRACH transmission, a number of repetitions can equal to the number of repetitions indicated by the UE-common DCI format or can be indicated by the DCI format conveying the PDCCH order. For example, a 2-bit field can be included in a UE-common DCI format or in a DCI format conveying a PDCCH order and can indicate a number of repetitions, for example from a set of $\{1, 2, 4, 8\}$ repetitions or from a set of $\{2, 4, 8, 16\}$ repetitions.

Support of Multiple PRACH Opportunities

When a UE detects a PDCCH order for a PRACH transmission on an unlicensed cell, regulations can require for the UE to perform CCA and LBT prior to the PRACH transmission. When the CCA/LBT fails, the UE does not transmit the PRACH. Then, it is highly likely that the eNB fails to detect a PRACH for an associated PDCCH order as there was no actual PRACH transmission. When an unlicensed cell is heavily occupied for communication with various devices and an eNB triggers a single PRACH transmission by a PDCCH order to a UE, the UE can often sense the unlicensed cell as being unavailable (occupied by other transmissions) and the eNB needs to transmit potentially multiple PDCCH orders before detecting a PRACH from the UE. This increases an associated DL control signaling overhead.

To reduce DL control signaling overhead scheduling PDSCH or PUSCH transmissions, multi-SF scheduling is typically considered where a single DCI format schedules a PDSCH transmission to a UE or a PUSCH transmission from a UE over a number of SFs that are indicated by the DCI format. Unlike multi-SF scheduling for PUSCH or PDSCH transmission that always occurs in a number of SFs indicated by an associated DCI format, a multi-SF PDCCH order is equivalent to a dynamic signaling through a DCI format of a parameter preamble TransMax that defines a maximum number of PRACH transmission attempts for a UE. For a licensed cell, the parameter preambleTransMax is only applicable for contention-based PRACH transmissions and is provided to a UE by higher layers (see also REF 4 and REF 5). Therefore, a DCI format providing a PDCCH order for a PRACH transmission, or a UE-common DCI format, can include a field indicating a new parameter, preambleTransMax_SCell, that defines a maximum number of PRACH transmission attempts from a UE.

When a UE detects a PDCCH order, the UE attempts to transmit a PRACH in a first UL SF indicated as being available for PRACH transmission and satisfying a timing relation relative to the SF of the PDCCH order, such as for example being at least 6 SFs later. When the UE succeeds in transmitting the PRACH, the UE attempts to detect a RAR within a RAR window. The eNB configures the UE with a RAR window size in number of SFs. The eNB can separately configure a RAR window for licensed cells and a RAR window for unlicensed cells. For contention-free PRACH transmission triggered by a PDCCH order, a RAR window size can be relatively small as the eNB controls a number of PDCCH orders and few UEs typically require contention-free PRACH transmission during a period of a few SFs. When the UE detects a RAR in response to a RA preamble transmission, the UE does not transmit PRACH for remaining attempts from the number preambleTransMax_SCell attempts. The UE autonomously extends a RAR window after every PRACH transmission. When a RAR transmission is on an unlicensed cell, the UE also autonomously extends a RAR window depending on a determination of availability for the unlicensed cell.

Figure 25A:
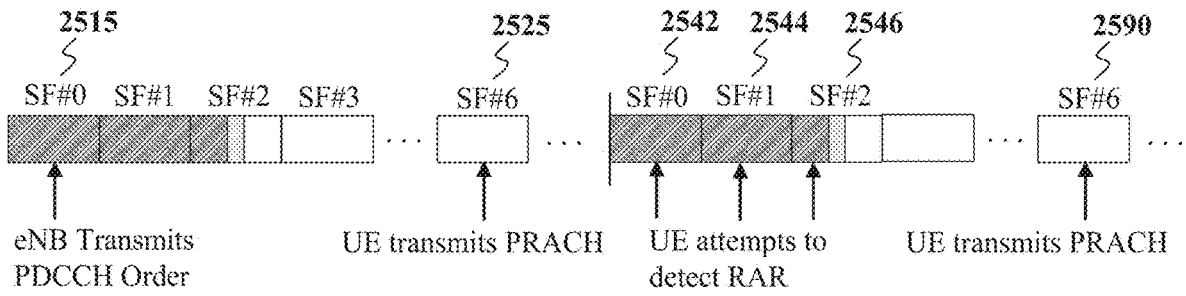
FIGS. 25A and 25B illustrate a process for transmitting a contention-free PRACH with multiple transmission opportunities according to this disclosure.
Figure 25B:
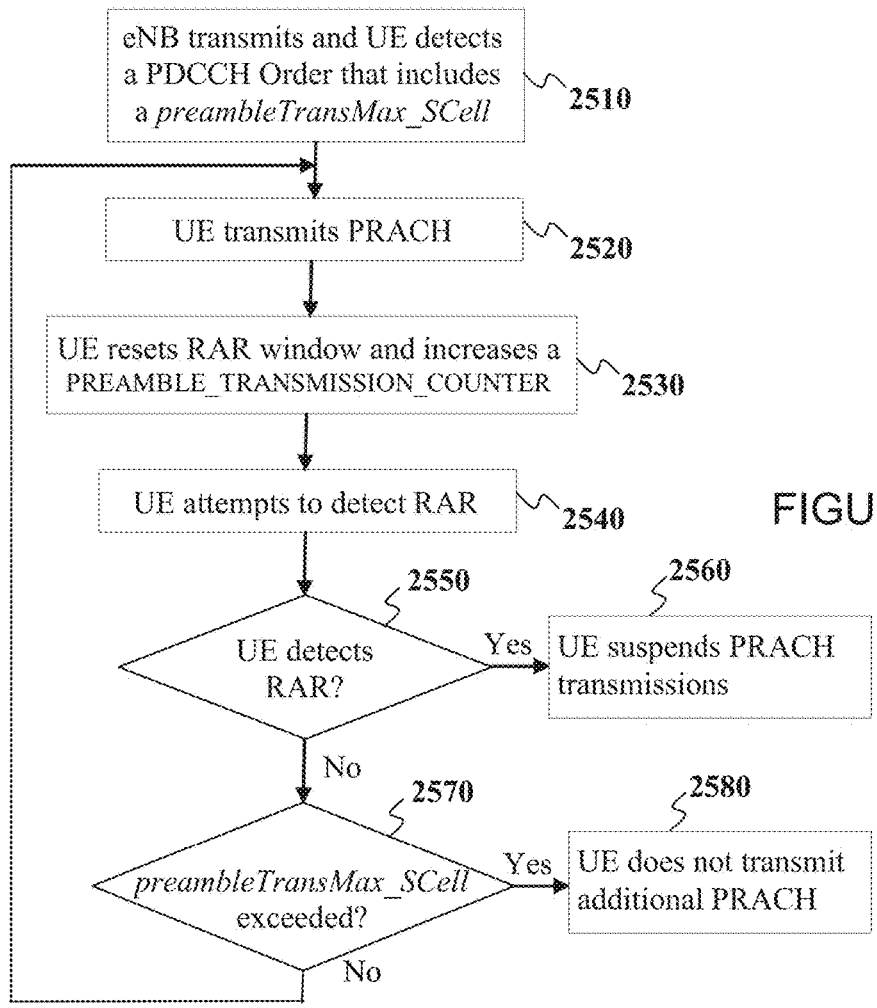

FIGS. 25A and 25B illustrate a process for transmitting a contention-free PRACH with multiple transmission opportunities according to this disclosure. The embodiment shown in FIGS. 25A and 25B is for illustration only. Other embodiments could be used without departing from the scope of the present disclosure.

An eNB transmits a PDCCH order and a UE detects the PDCCH order 2510 in a first SF 2515. The DCI format conveying a PDCCH order includes a field preambleTransMax_SCell indicating a maximum of two PRACH transmissions during SFs that are indicated as available for PRACH transmission by the DCI format or by a UE-common DCI format. Each SF available for PRACH transmission can be further conditioned to occur after a number of SFs where a RAR can be transmitted in response to a previous PRACH transmission. The UE transmits a PRACH 2520 in a second SF 2525. The UE resets a RAR window, for example to start 3 SFs after the SF of the PRACH transmission when the RAR is transmitted on a licensed cell or at a next MCOT when the RAR is transmitted on an unlicensed cell, and increments by 1 a counter PREAMBLE_TRANSMISSION_COUNTER that is initially set to zero 2530. The UE attempts to detect a RAR 2540 during a third number of SFs 2542, 2544, and 2546 (in a next frame or in a next MCOT) to determine whether or not the RAR includes an indication for an RA preamble used in the PRACH transmission 2550. When the UE detects a RAR that includes the RA preamble used in a previous PRACH transmission by the UE, the UE suspends subsequent PRACH transmissions 2560. When the UE does not detect a RAR that includes the RA preamble used in a previous PRACH transmission by the UE, the UE determines whether or not PREAMBLE_TRANSMISSION_COUNTER is larger than preambleTransMax_SCell 2570. When the condition in step 2570 is true, the UE does not transmit any additional PRACH 2580. When the condition in step 2570 is not true, the UE transmits a PRACH during a next available SF 2590 and repeats the steps after a PRACH transmission. When the UE does not transmit a PRACH due to sensing the unlicensed cell to be occupied (LBT fails), the UE does not increase the PREAMBLE_TRANSMISSION_COUNTER.

To accommodate a regulatory requirement for a maximum PSD of $P_{CMAX,reg}$ per MHz, a power for a PRACH transmission from a UE over a contiguous set of 6 RBs in a SF i on an unlicensed cell c, $P_{PRACH}^{U}$, can be determined as:

$$P_{PRACH}^{U}=\min\{\min(P_{CMAX,c}(i),P_{CMAX,reg}),\text{PREAMBLE\_RECEIVED\_TARGET\_POWER}+PL_c\}$$
$$[dBm]$$

where PREAMBLE_RECEIVED_TARGET_POWER= preambleInitialReceivedTargetPower+DELTA_PREAMBLE+(PREAMBLE_TRANSMISSION_COUNTER−1) and preambleInitialReceivedTargetPower and DELTA_PREAMBLE are parameters configured to the UE from an eNB by higher layers.

When a PRACH transmission, from the preambleTransMax_SCell PRACH transmissions, occurs within a RAR window for a previous PRACH transmission, the PRACH transmission is with a same power as the previous PRACH transmission. When a PRACH transmission, from the preambleTransMax_SCell PRACH transmissions, is after a RAR window of a previous PRACH transmission, power ramping can apply where a UE increases a PRACH transmission power by a value (in decibells) provided by a parameter powerRampingStep that is configured to the UE by higher layers. A transmission power increases by powerRampingStep for a first PRACH transmission after a RAR window of an earlier PRACH transmission from the multiple PRACH transmissions expires. Therefore, a parameter PREAMBLE_TRANSMISSION_COUNTER used to determine a PRACH transmission power is incremented, for the purpose of determining the PRACH transmission power, only when a RAR window from an earlier PRACH transmission expires even though there can be other ongoing RAR windows from other previous PRACH transmissions occurring after the earlier PRACH transmission.

To simplify an operation associated with multiple PRACH transmission opportunities, a PRACH transmission opportunity can be restricted to occur only after a RAR window for an immediately previous PRACH transmission opportunity expires, even when SFs available for PRACH transmissions exist within the RAR window. Then, power ramping for PRACH transmissions as described in REF4 can apply and a UE increments a PREAMBLE_TRANSMISSION_COUNTER after each PRACH transmission, when the UE does not receive a RAR for a previous PRACH transmission, until PREAMBLE_TRANSMISSION_COUNTER reaches a value provide by a preambleTransMax_SCell parameter.

A single PDCCH order can also be valid over a number of cells that belong to a same sTAG. Even when a UE cannot simultaneously transmit in more than one cell at a same time, PRACH transmission opportunities on different cells can be staggered in time. For example, a first UE-common DCI format transmitted on a first cell can indicate a different SF as being available for a PRACH transmission that a second UE-common DCI format transmitted on a second cell. By providing to a UE multiple opportunities for a PRACH transmission on respective multiple cells, a probability that the UE is able to transmit PRACH or the eNB is able to detect PRACH in at least one of the multiple cells is improved, for example as a probability of at least one respective LBT succeeding is improved. However, an overall latency for a contention-free random access, and for a contention-based random access, depends on both a latency for a UE to transmit a PRACH and a latency for an eNB to transmit an associated RAR. Therefore, when a PDCCH order is valid over a number of cells, it is beneficial to remove a constraint for the RAR transmission to be on the same (licensed or unlicensed) cell as the PDCCH order transmission and instead also include all cells of a same TAG where the UE can transmit the PRACH.

Figure 26:
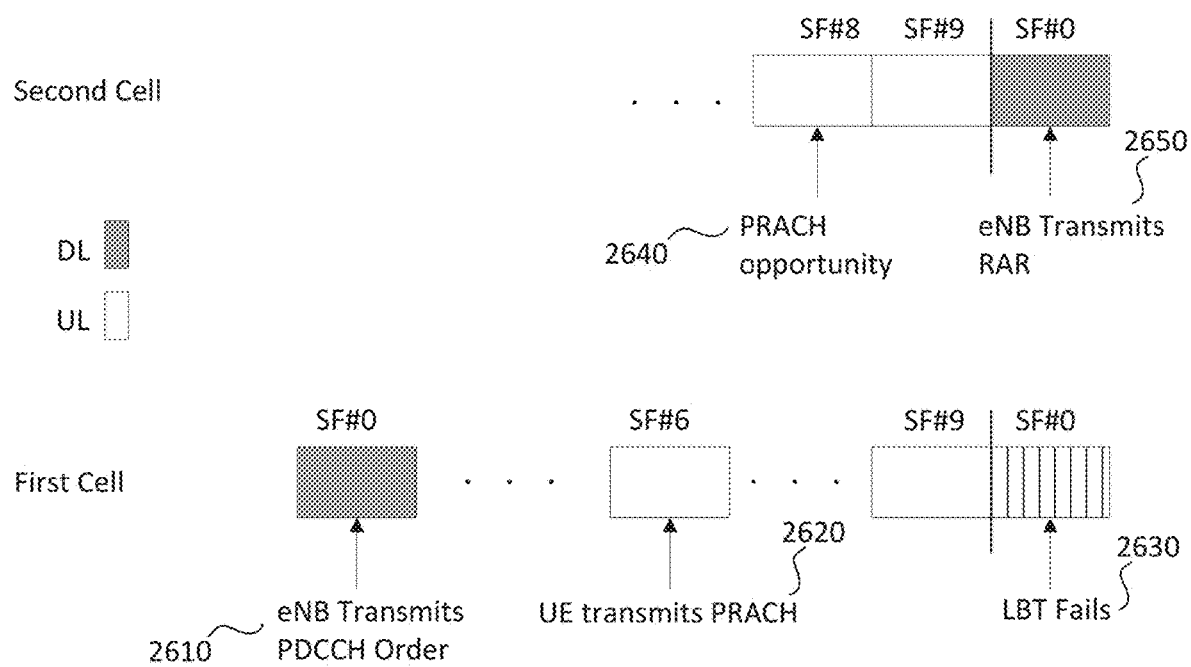
FIG. 26 illustrates a process for transmitting a PRACH and an associated RAR according to this disclosure.

FIG. 26 illustrates a process for transmitting a PRACH and an associated RAR according to this disclosure. The embodiment shown in FIG. 26 is for illustration only. Other embodiments could be used without departing from the scope of the present disclosure.

An eNB transmits a PDCCH order to a UE on a first cell 2610. Upon detecting the PDCCH order, the UE transmits the PRACH 2620. Although the PRACH transmission is shown to be on a same cell as the transmission of the PDCCH order, this is not necessary. The eNB performs an LBT for the first SF of a next MCOT on the first cell and the LBT fails 2630. The UE is also configured for PRACH opportunities on a second cell 2640. The eNB performs an LBT for the first SF of a next MCOT on the second cell, the LBT succeeds, and the eNB transmits a RAR to the UE 2650 in response to the PRACH transmission on the first cell.

A number of cells with PRACH transmission opportunities for a UE can be indicated to the UE through several mechanisms. In a first example, each cell configured for communication to a UE has an index and the DCI format conveying the PDCCH order can include a number of cells, starting for example from the cell where an eNB transmits the PDCCH order, where the cells are ordered according to an ascending cell index. In a second example, the UE can be configured by higher layers the cells that include PRACH transmission opportunities for the UE. In a third example, all cells of a same sTAG that are configured for communication to a UE include PRACH transmission opportunities for the UE.

RAR Contents

A RAR typically includes an UL grant scheduling an Msg3 transmission from a UE, a TA command, and a TC-RNTI. Even when Msg3 retransmissions or, in general, PUSCH transmissions are based on asynchronous HARQ and an UL grant needs to include a HARQ process number field and a redundancy version (RV) number field, these two fields do not need to be included in the UL grant of a RAR as the RAR schedules only an initial transmission of an Msg3 in a PUSCH or of data in a PUSCH and therefore the HARQ process number is 0 and the RV number is 0.

For an Msg3 transmission in a PUSCH that is interleaved in clusters of RBs, for example as in FIG. 9 a frequency hopping flag is not needed. Also, only one cluster or two clusters need to be indicated by the UL grant in the RAR as a transport block size for an Msg3 is sufficiently small and a resource allocation of one cluster of RBs is sufficient. Therefore, assuming for example ten RB clusters in a system BW, the first 10 states of the 16 states of a RB assignment field that includes 4 bits can indicate one of the ten clusters while the remaining 6 states can indicate the pairs of clusters {0, 5}, {1, 6}, {2, 7}, {3, 8}, {4, 9} and the triplet of clusters {0, 4, 9} or {0, 5, 9}. Alternatively, the last state or possibly additional states can indicate whether the UE transmits a PUSCH in a partition of a cluster such as only on even indexed RBs or on odd index RBs of an indicated cluster. This can reduce the minimum RB allocation to half a cluster and allow multiplexing of two UEs in a cluster, and it can be beneficial for small data transport block sizes such as ones associated with an Msg3.

Table 2 provides the contents of an UL grant for an Msg3 transmission from a UE on a licensed cell and on an unlicensed cell. A size of one or more field of the UL grant for transmission on an unlicensed cell can be further reduced as it is subsequently described.

TABLE 2

Contents of an UL grant for Msg3 transmission

| UL grant | Licensed Cell | Unlicensed Cell |
| --- | --- | --- |
| Hopping flag | 1 bit | 0 bit |
| RB Assignment | 10 bits | 4 bits |
| MCS | 4 bits | 4 bits |
| TPC command | 3 bits | 3 bits |
| UL delay | 1 bit | 1 bit |
| CSI-request | 1 bit | 1 bit |

From Table 2 it is observed that a size of an UL grant in a RAR for an Msg3 transmission on an unlicensed cell can be about 13 bits while a size of an UL grant in a RAR for Msg3 transmission on a licensed cell is 20 bits. Moreover, a size of a TA command in a RAR for an Msg3 transmission on a licensed cell is 12 bits allowing coverage over a cell with size of 100 kilometers. The RAR is transmitted in octets as a MAC packet data unit (PDU). One octet can include bits for both the TA command and the UL grant. A TA command and an UL grant for an Msg3 transmission on a licensed cell are conveyed by 4 octets (32 bits). It is therefore possible to reduce to 3 a number of octets required to convey an UL grant and a TA command for an Msg3 transmission on an unlicensed cell either by reducing the TA command by one or more bits or by reducing the UL grant in Table 1 by one or more bits, or both.

A size for a TA command size for an Msg3 transmission on an unlicensed cell can be reduced to 11 bits by limiting communication support to cell sizes of about 50 kilometers. This does not have a material impact as typical sizes for unlicensed cells are much smaller than 50 kilometers. The UL grant size can also be further reduced by interpreting its fields depending on whether the associated random access process is contention-free or contention-based. For example, the CSI-request field is only needed for contention-free random access and can be excluded for contention-based random access. For example, the UL delay field is mostly beneficial for contention-based random access and can be excluded for contention-free random access. In this manner, a size of the UL grant in a RAR is reduced by 1 bit relative to the size in Table 1. Further, the interpretation of the RB assignment can be different. For contention-based random access, a PUSCH transmission scheduled by an UL grant in the RAR conveys an Msg3 and a RB assignment can be as previously discussed. For contention-free random access, a PUSCH transmission scheduled by an UL grant in the RAR conveys data associated with a connection to the SCell (handover) and the RB assignment can have a mapping allocating a larger number of clusters.

Figure 27A:
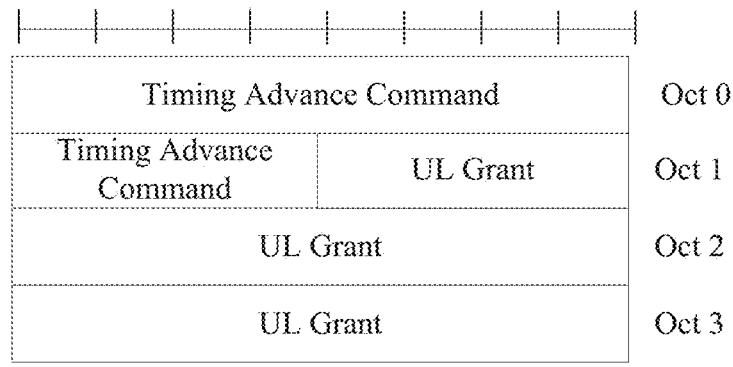
FIGS. 27A and 27B illustrates a size of a RAR message with respect to the octets used to provide a TA command and an UL grant for contention-based random access and for contention-free random access according to this disclosure.
Figure 27B:
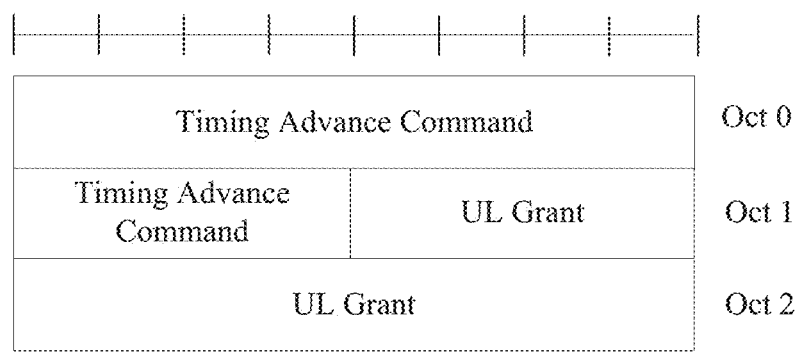

FIGS. 27A and 27B illustrate a size of a RAR message with respect to the octets used to provide a TA command and an UL grant for contention-based random access and for contention-free random access according to this disclosure. The embodiment shown in FIGS. 27A and 27B are for illustration only. Other embodiments could be used without departing from the scope of the present disclosure.

For contention-based random access, four octets are used to provide a TA command and an UL grant as illustrated in FIG. 27A. For contention-free random access, three octets are used to provide a TA command and an UL grant in FIG. 27B. In the latter case, even though the TA command is shown to include 12 bits and the UL grant to also include 12 bits, a different partitioning can also apply and the TA command can include 10 bits or 11 bits and the UL grant can include 14 bits or 13 bits.

Transmission of Uplink Control Information for a Cell Group

A UE can be configured with multiple cells on an unlicensed frequency band and with one cell or a few cells on a licensed frequency band. As transmissions on a cell of a licensed frequency band are not subject to LBT, the UE can be configured a cell on a licensed frequency band for PUCCH transmissions in order to ensure that the UE can transmit UCI. This cell is referred to as primary cell (PCell). A same PCell on a licensed frequency band is typically configured to multiple UEs thereby increasing resource requirements on the PCell for supporting PUCCH transmissions. To alleviate PUCCH resource requirements on a PCell for a UE, the UE can be configured a group of cells for multiplexing a HARQ-ACK codebook in a PUSCH transmission on a cell from the group of cells, in response to PDSCH receptions on cells from the group of cells, instead of transmitting the HARQ-ACK codebook in a PUCCH on the PCell. This group of cells is referred to as UCI cell group or UCG.

A UCG typically includes cells on unlicensed bands. Therefore, even though UCI multiplexing from a UE in a PUSCH transmission on a UCG cell can alleviate UCI resource overhead on a cell of a licensed band, UCI transmission cannot be guaranteed at a given time instance as the UE needs to perform a CCA prior to the PUSCH transmission and when the CCA (or the LBT) fails, the UE suspends the PUSCH transmission. Moreover, as a CCA occurs shortly prior to a PUSCH transmission, it is possible that the UE does not have sufficient processing time to reconfigure a rate matching for a data transmission and multiplex UCI in another PUSCH transmission or in a PUCCH transmission. An eNB can be unable to determine absence of a PUSCH transmission from a UE as a transmission from another device, such as a WiFi device, or even from another UE to a different eNB can occur and be a reason for the LBT failure associated with the PUSCH transmission.

A DL DCI format can include a counter DL assignment indicator (DAI) field and a total DAI field. For a FDD system, a value of a counter DAI in a DCI format scheduling a PDSCH transmission from an eNB to a UE in a cell indicates a number of DL DCI formats transmitted from the eNB to the UE in a SF and scheduling PDSCH transmissions in cells with indexes up to the cell index while a value of a total DAI field indicates a total number of DL DCI formats transmitted from the eNB to the UE in the SF. For a TDD system where for a number of successive DL SFs a UE transmits HARQ-ACK in a same UL SF, a value of the counter DAI in a DL DCI format scheduling a PDSCH transmission counts a number of DL DCI formats an eNB transmits to the UE across cells, according to an ascending order of a cell index, and across SFs according to an ascending order of the SF index, up to the SF and the cell of the of the PDSCH transmission, while a value of a total DAI field counts a total number of DL DCI formats the eNB transmits up to the SF of the DL DCI format transmission. For a FDD system, UL DCI formats do not include a DAI and a UE determines a HARQ-ACK codebook for transmission in a PUSCH in a same manner as for transmission in a PUCCH based on the counter DAI values and on the total DAI values in associated DL DCI formats. For a TDD system, UL DCI format include a DAI and a UE can determine a HARQ-ACK codebook for transmission in a PUSCH either as for transmission in a PUCCH or based on the value of the DAI field.

A HARQ-ACK codebook can depend on whether or not a UE detects UL grants scheduling PUSCH transmissions on UCG cells. When the UE detects UL grants scheduling PUSCH transmissions on UCG cells, the UE multiplexes a HARQ-ACK codebook for UCG cells in one or more of the PUSCH transmissions and multiplexes a HARQ-ACK codebook for non-UCG cells in a PUCCH transmission or in a PUSCH transmission on a non-UCG cell. Conversely, when the UE does not detect UL grants scheduling PUSCH transmissions on UCG cells, the UE multiplexes a HARQ-ACK codebook for both UCG cells and non-UCG cells in a PUCCH transmission or in a PUSCH transmission on a non-UCG cell.

Therefore, there is a need to determine a HARQ-ACK codebook when a UE is configured a UCG for HARQ-ACK multiplexing on one or more PUSCH transmissions.

There is another need to enable a transmission of HARQ-ACK codebook when a CCA fails and a UE suspends a PUSCH transmission where the UE multiplexes the HARQ-ACK codebook.

Finally, there is another need for a UE to inform an eNB of a CCA failure and of a suspended PUSCH transmission with a multiplexed HARQ-ACK codebook.

In the following, unless otherwise explicitly mentioned, each cell of a UCG that an eNB configures to a UE is assumed to be a cell where the UE needs to perform CCA prior to PUSCH transmission. This assumption is not required for the embodiments of the present disclosure, and some of the cells in the UCG need not require CCA prior to respective PUSCH transmissions, but the description of the embodiments of the present disclosure can be simplified by assuming that the UE needs to perform CCA prior to PUSCH transmissions on each respective cell of the UCG.

A UE can be configured with a group of UL cells and with a group of DL cells. Each UL cell from the group of UL cells can be linked to a DL cell from the group of DL cells or there can be one or more UL cells from the group of UL cells not linked to DL from the group of DL cells. The UE can multiplex a HARQ-ACK codebook in response to PDSCH receptions or in response to an SPS PDSCH release on cells from the group of DL cells to one or more PUSCH transmissions on cells from the group of UL cells. The group of DL cells or UL cells is referred to, respectively, as DL or UL UCI cell group or, without ambiguity, as UCG. For brevity, SPS PDSCH release is not explicitly mentioned in the following but it is assumed that a UE generates HARQ-ACK information in response to a detection, or absence of detection, for a DL DCI format indicating a SPS PDSCH release.

HARQ-ACK Codebook Determination

A configuration of a UCG to a UE can be combined with a configuration for simultaneous PUSCH transmissions on UCG cells and PUCCH transmission or PUSCH transmissions on non-UCG cells. Without a capability for a UE to simultaneously transmit PUSCHs on UCG cells and PUCCH on a PCell and assuming that UCI, such as HARQ-ACK information, for non-UCG cells is not multiplexed in a PUSCH transmission on a UCG cell and that transmission of HARQ-ACK information for non-UCG cells is prioritized over transmission of HARQ-ACK information for UCG cells, the UE needs to drop PUSCH transmissions on UCG cells whenever the UE needs to transmit UCI for non-UCG on a PUCCH. When a UE is configured a UCG and the UE has PUSCH transmissions in UCG cells in a SF, the UE multiplexes HARQ-ACK for UCG cells in the PUSCH transmissions in the SF. When a UE is configured a UCG and the UE does not have PUSCH transmissions in UCG cells in a SF, the UE can multiplex HARQ-ACK for UCG cells on a PUCCH or in a PUSCH transmission on a non-UCG cell in the SF.

When a UE is not configured a UCG, values of DAI fields in respective DL DCI formats scheduling PDSCH transmissions on non-UCG cells and values of DAI fields in respective DL DCI formats scheduling PDSCH transmissions on UCG cells are jointly determined as described in REF 3. When a UE is configured with a UCG, the present disclosure provides two approaches for a functionality of a DAI field.

In a first approach, DAI values in DL DCI formats scheduling PDSCH transmissions on non-UCG cells are independent of DAI values in DL DCI formats scheduling PDSCH transmissions on UCG cells. The first approach can be combined with an absence or a non-use of a DAI field in UL DCI formats. Having independent DAI values in DL DCI formats for non-UCG cells and for UCG cells enables a UE to determine a first HARQ-ACK codebook for non-UCG cells and a second HARQ-ACK codebook for UCG cells. The UE uses the first HARQ-ACK codebook for multiplexing HARQ-ACK information in a PUSCH on a non-UCG cell and uses the second HARQ-ACK codebook for multiplexing HARQ-ACK information in a PUSCH on a UCG cell. The UE can use a union of the two HARQ-ACK codebooks for HARQ-ACK multiplexing in a PUCCH. The union can be as described in REF 3, or the second HARQ-ACK codebook can be appended to the first HARQ-ACK codebook, and so on. Moreover, when present, DAI values in UL DCI formats scheduling PUSCH transmissions on non-UCG cells are independent of DAI values in UL DCI formats scheduling PUSCH transmissions on UCG cells when a UE is configured a UCG. The UE uses a DAI value in an UL DCI format scheduling a PUSCH transmission on a non-UCG cell to determine an HARQ-ACK codebook for multiplexing in the PUSCH transmission on the non-UCG cell and the UE uses a DAI value in an UL DCI format scheduling a PUSCH transmission on a UCG cell to determine an HARQ-ACK codebook for multiplexing in the PUSCH transmission on the UCG cell.

Figure 28:
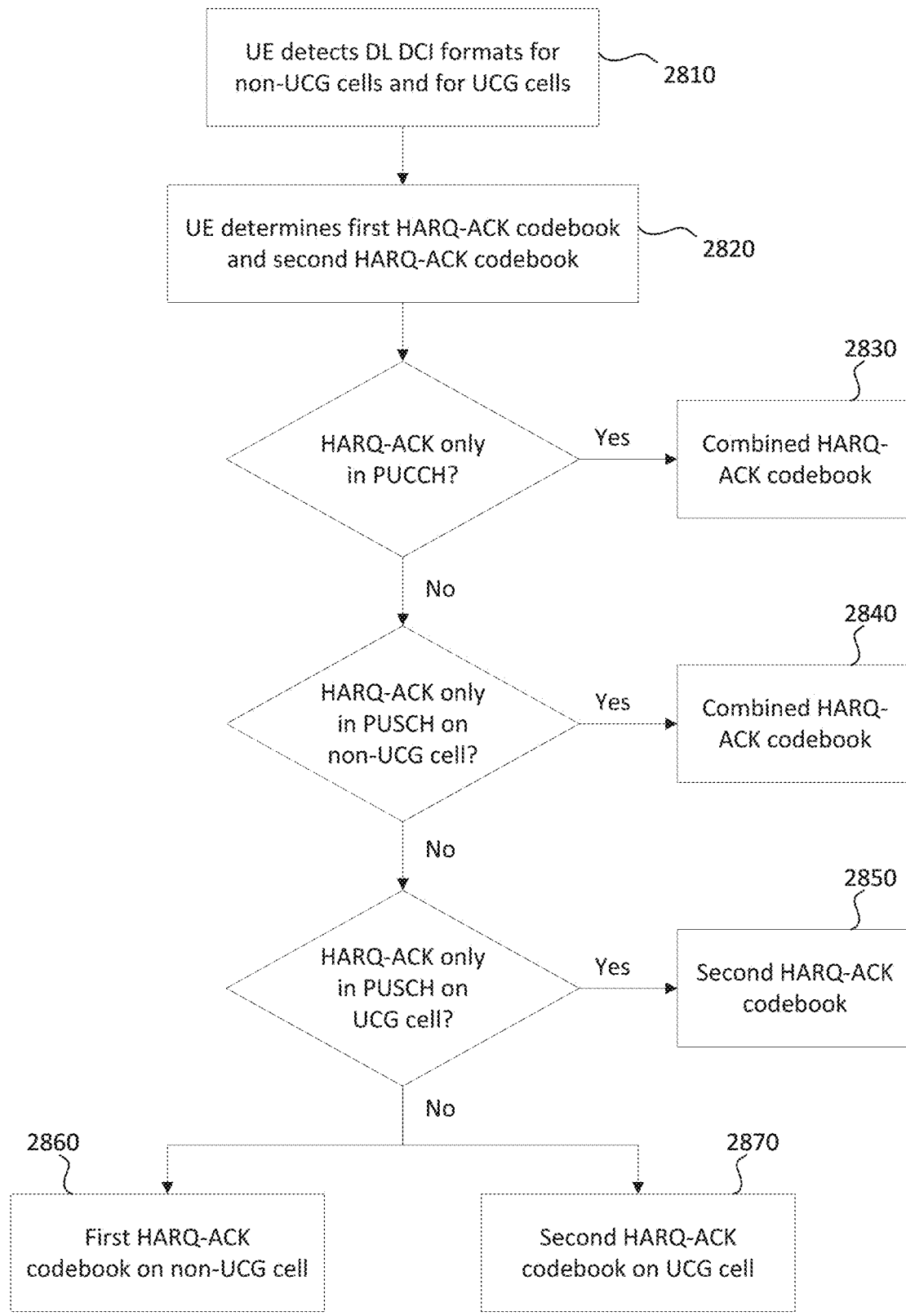
FIG. 28 illustrates an example for a determination of a HARQ-ACK codebook based on DAI fields in DL DCI formats for uplink control information (UCI) cell group (UCG) cells and non-UCG cells according to this disclosure.

FIG. 28 illustrates an example for a determination of a HARQ-ACK codebook based on DAI fields in DL DCI formats for UCG cells and non-UCG cells according to this disclosure. The embodiment shown in FIG. 28 is for illustration only. Other embodiments could be used without departing from the scope of the present disclosure.

A UE detects DL DCI formats scheduling respective PDSCH transmissions on non-UCG cells and UCG cells. The UE determines a first HARQ-ACK codebook based on values of respective DAI fields in detected DL DCI formats scheduling PDSCH transmissions in non-UCG cells and determines a second HARQ-ACK codebook based on values of respective DAI fields in detected DL DCI formats scheduling PDSCH transmissions in UCG cells 2820. For HARQ-ACK transmission in a PUCCH on a PCell, the UE combines the first HARQ-ACK codebook and the second HARQ-ACK codebook 2830, for example by either determining a single HARQ-ACK codebook based on values of DAI fields in DL DCI formats for all cells (non-UCG cells and UCG cells) as described in REF 3 (in that case, step 2820 can be omitted), or by appending the second HARQ-ACK codebook to the first HARQ-ACK codebook. For HARQ-ACK codebook transmission only in a PUSCH on a non-UCG cell, the UE determines a HARQ-ACK codebook either based on a value of a DAI field in an UL DCI format scheduling the PUSCH transmission or, in case a DAI field in the UL DCI format does not exist, based on a same combined HARQ-ACK codebook as for transmission in a PUCCH 2840. For HARQ-ACK codebook transmission only in a PUSCH on a UCG cell, the UE determines a HARQ-ACK codebook either based on a value of a DAI field in an UL DCI format scheduling the PUSCH transmission or, in case a DAI field in the UL DCI format does not exist, based on the second HARQ-ACK codebook 2850. For HARQ-ACK codebook transmission both in a first PUSCH or a PUCCH on a non-UCG cell and in a second PUSCH on a UCG cell, the UE determines a first HARQ-ACK codebook for transmission in the first PUSCH or in the PUSCH 2860 based either on a DAI field in a first UL DCI format scheduling the first PUSCH transmission or based on the first HARQ-ACK codebook, for example when the first UL DCI format does not include a DAI field, and the UE determines a second HARQ-ACK codebook for transmission in the second PUSCH 2870 based either on a DAI field in a second UL DCI format scheduling the second PUSCH transmission or based on the second HARQ-ACK codebook for example when the second UL DCI format does not include a DAI field. When present, a value of a DAI field in the first UL DCI format can be different than a value of a DAI field in the second DCI format.

In a second approach, values of DAI fields in respective DL DCI formats scheduling PDSCH transmissions on non-UCG cells and values of DAI fields in respective DL DCI formats scheduling PDSCH transmissions on UCG cells are jointly considered. The second approach requires an existence of a DAI field in UL DCI formats. Having values of DAI fields in DL DCI formats jointly consider non-UCG cells and UCG cells is effectively equivalent to having a single CG and a HARQ-ACK codebook determination as described in REF 3 per CG can apply for multiplexing a HARQ-ACK codebook in a PUCCH. For multiplexing a HARQ-ACK codebook in a PUSCH, a value of a DAI field in an UL DCI format scheduling a PUSCH transmission on a non-UCG cell can be independently set from a value of a DAI field in an UL DCI format scheduling a PUSCH transmission on a UCG cell. Having values of DAI fields in UL DCI formats being independently set for non-UCG cells and for UCG cells is effectively equivalent to having two separate CGs for HARQ-ACK codebook determination for transmission in a PUSCH. A first HARQ-ACK codebook is determined from the value of DAI fields in UL DCI formats scheduling PUSCH transmissions in non-UCG cells and a second HARQ-ACK codebook is determined from the value of DAI fields in UL DCI formats scheduling PUSCH transmissions in UCG cells. Therefore, for HARQ-ACK codebook transmission only in a PUCCH or only in a PUSCH on a non-UCG cell, there is one CG that includes both non-UCG cells and UCG cells while for HARQ-ACK codebook transmission in a PUCCH or a PUSCH on a non-UCG cell and HARQ-ACK codebook transmission in a PUSCH on a UCG cell there are two CGs where the first CG includes non-UCG cells and the second CG includes UCG cells. A determination of HARQ-ACK codebooks for each of the above cases can be as in FIG. 7 with the exception of using a combined codebook determined as in REF 3 for HARQ-ACK codebook transmission in a PUCCH and using a value of DAI fields (all assumed to have a same value) in UL DCI formats scheduling PUSCH transmissions on cells of a UCG for HARQ-ACK codebook transmission in a PUSCH on a UCG cell while using a value of DAI fields (all assumed to have a same value) in UL DCI formats scheduling PUSCH transmissions on cells of a non-UCG for HARQ-ACK codebook transmission in a PUSCH on a non-UCG cell.

A UE suspends a PUSCH transmission on a cell, such as a UCG cell, when a CCA test the UE performs prior to the PUSCH transmission indicates that the channel medium on the cell is occupied by transmissions from other devices. With respect to transmission of a HARQ-ACK codebook in a SF, a CCA failure is functionally different than a failure to detect an UL DCI format scheduling a PUSCH transmission at least because a CCA failure probability can be materially larger than a probability of a missed detection for the UL DCI format and because, without prior actions to anticipate a CCA failure, a UE cannot transmit HARQ-ACK codebook on another channel in the SF as the UE does not have sufficient time to switch the HARQ-ACK transmission from a PUSCH on the cell to a PUCCH or to a PUSCH on another cell.

A UE implementation can address a probability of CCA failure for a PUSCH transmission with a multiplexed HARQ-ACK codebook by preparing in advance an alternative channel to multiplex the HARQ-ACK codebook and use the alternative channel to transmit the HARQ-ACK codebook in case the UE does not transmit the PUSCH due to a CCA failure. For example, a UE can prepare in advance a multiplexing of a HARQ-ACK codebook for UCG cells in a PUCCH transmission on a PCell and transmit the PUCCH on the PCell when a CCA for a PUSCH transmission on a UCG cell fails. For example, a UE can multiplex a HARQ-ACK codebook for UCG cells in more than one PUSCH transmissions, when any, on UCG cells. Otherwise, when a HARQ-ACK codebook for UCG cells that the UE multiplexes in a PUSCH the UE is scheduled to transmit on a UCG cell is not also multiplexed on another channel when a CCA for the PUSCH fails, the UE needs to drop the PUSCH transmission and therefore the transmission of the HARQ-ACK codebook.

Figure 29:
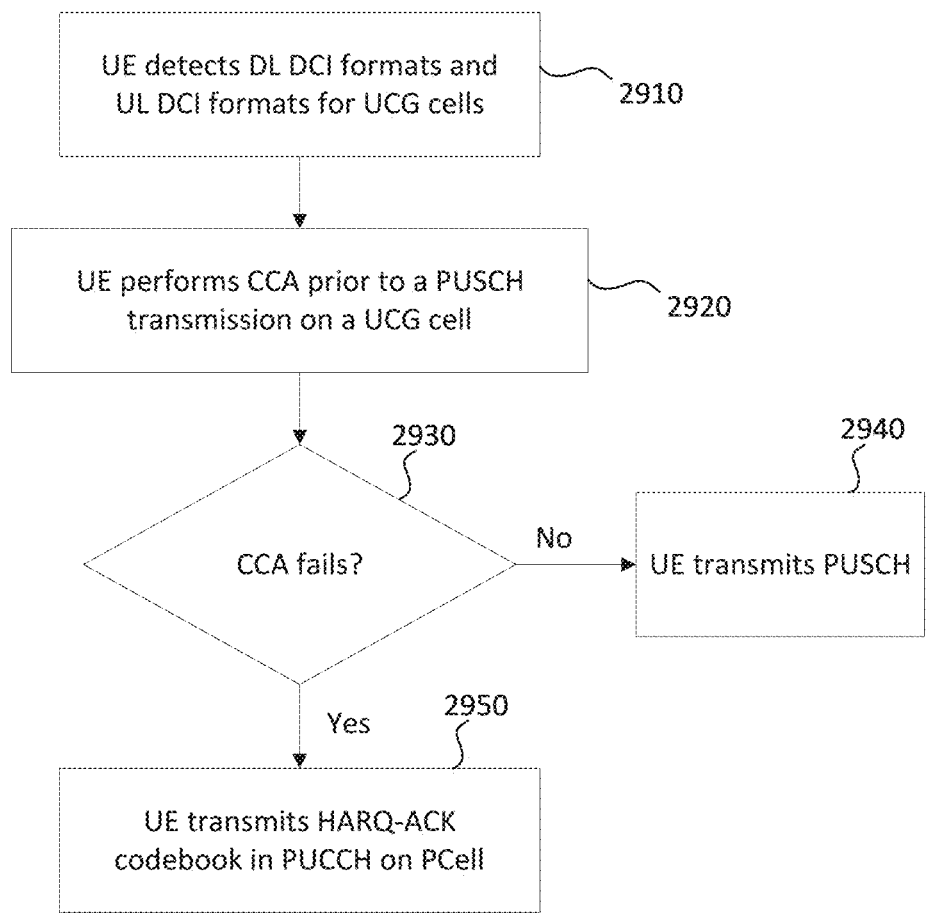
FIG. 29 illustrates an example for a UE to transmit a HARQ-ACK codebook for UCG cells either in a PUSCH on a UCG cell or on a PUCCH in a (primary cell) PCell.

FIG. 29 illustrates an example for a UE to transmit a HARQ-ACK codebook for UCG cells either in a PUSCH on a UCG cell or on a PUCCH in a PCell. The embodiment shown in FIG. 29 is for illustration only. Other embodiments could be used without departing from the scope of the present disclosure.

A UE detects DL DCI formats scheduling PDSCH transmissions on UCG cells and UL DCI formats scheduling PUSCH transmission on UCG cells 2910. The UE performs CCA prior to a PUSCH transmission on a UCG cell where the UE multiplexes a HARQ-ACK codebook 2920. The UE determines whether the CCA fails 2930. When the CCA does not fail, the UE transmits the PUSCH and multiplexes the HARQ-ACK codebook 2940. When the CCA fails, the UE transmits the HARQ-ACK codebook in a PUCCH on a PCell 2950. This can be further conditioned on the UE having a second HARQ-ACK codebook for non-UCG cells to transmit in the PUCCH on the PCell and the UE preparing a first version for the PUCCH transmission containing only the second HARQ-ACK codebook and a second version containing both HARQ-ACK codebooks and selecting the first version when the CCA does not fail and selecting the second version when the CCA fails.

When a UE fails to detect UL grants for PUSCH transmissions on UCG cells, the UE transmits HARQ-ACK for UCG cells in a PUCCH or in a PUSCH on a non-UCG cell. Therefore, the HARQ-ACK codebook in a PUCCH or in a PUSCH in a SF can depend on whether or not the UE detects UL grants scheduling PUSCH transmissions on UCG cells in the SF as a PUCCH transmission can include HARQ-ACK for non-UCG cells when the UE detects UL grants for PUSCH transmissions on UCG cells and includes HARQ-ACK for all cells when the UE does not detect UL grants for PUSCH transmissions on UCG cells.

An eNB can receive a HARQ-ACK codebook in a PUCCH or in a PUSCH on a non-UCG cell according to a hypothesis that a UE transmitted the PUSCHs on UCG cells and according to a hypothesis that the UE did not transmit PUSCHs on UCG cells. When TBCC with CRC is used for encoding the HARQ-ACK codebook, this hypothesis testing is sufficient for the eNB to determine the HARQ-ACK codebook size. When Reed-Muller coding is used for encoding the HARQ-ACK codebook, the eNB cannot determine the HARQ-ACK codebook size as the eNB has no means to determine whether the HARQ-ACK codebook is one that corresponds to a HARQ-ACK codebook for non-UCG cells or one that corresponds to a HARQ-ACK codebook for both non-UCG cells and UCG cells. One approach to resolve this problem is for the eNB to configure the UE to use of TBCC encoding with CRC attachment for a HARQ-ACK codebook when the eNB configures a UCG to the UE. Another approach is for the UE to use OCC $\{1, -1\}$ for the DMRS per slot of PUCCH Format 3 when the UE transmits a HARQ-ACK codebook for both non-UCG cells and UCG cells and use OCC $\{1, 1\}$ when the UE transmits a HARQ-ACK codebook only for non-UCG cells.

When a UE fails a CCA check and does not transmit a PUSCH with a multiplexed HARQ-ACK codebook on a UCG cell in a SF, the UE typically does not have sufficient time to multiplex the HARQ-ACK codebook on another channel the UE is scheduled to transmit in the SF. In a first approach, the UE can drop the transmission of a HARQ-ACK codebook for UCG cells in the SF. In a second approach, the UE can generate two versions for a PUCCH or PUSCH transmission, a first version that includes HARQ-ACK for UCG cells and a second version that does not, and transmit either the first version when the CCA fails or the second version when the CCA does not fail (and the UE transmits the HARQ-ACK codebook for UCG cells in a PUSCH on a UCG cell). In a third approach, the UE can transmit the HARQ-ACK codebook for UCG cells in a later SF.

For the third approach, the UE can transmit the HARQ-ACK codebook either in a PUSCH on a UCG cell or in a PUCCH or in a PUSCH on a non-UCG cell. In the following, it is assumed that the UE encodes the HARQ-ACK codebook using TBCC with CRC.

In a first case, the UE transmits a PUSCH in a SF on a UCG cell. When the UE has new HARQ-ACK information to multiplex in the SF, the UE encodes in a same HARQ-ACK codebook both the new HARQ-ACK information and the HARQ-ACK information the UE had to transmit in a previous SF; otherwise, when the UE does not have new HARQ-ACK information to multiplex in the SF, the UE encodes in a HARQ-ACK codebook the HARQ-ACK information the UE had to transmit in a previous SF and the UE multiplexes the HARQ-ACK codebook in the PUSCH. The multiplexing of the HARQ-ACK codebook the UE had to transmit in a previous SF can be a default action by the UE and can be expected by the eNB or, as it will be subsequently described, can be requested by the eNB for example by including a new field, HARQ-ACK_request in an UL DCI format to explicitly request a transmission from the UE of a HARQ-ACK codeword the UE had to transmit in a previous SF.

When it is a default action by a UE to multiplex in a PUSCH transmission in a SF a HARQ-ACK codeword the UE had to transmit in a previous SF, the previous SF can be up to the last SF prior to the SF of the PUSCH transmission. When an eNB can reliably detect a PUSCH DTX in the previous SF due to a CCA failure by the UE, the eNB knows that the UE includes in the PUSCH transmission in the SF the HARQ-ACK codebook the UE had to but was not able to transmit in the previous SF. When the eNB cannot reliably detect a PUSCH DTX in the previous SF due to a CCA failure by the UE for transmitting the PUSCH in the previous SF, one hypothesis by the eNB can be that a failed CRC check for a presumed received HARQ-ACK codeword in the previous SF was due to a CCA failure by the UE. This can be further conditioned on a failed CRC check for the data TB. The eNB can then decode the PUSCH in the SF according to a first hypothesis that there is a HARQ-ACK codebook and includes a HARQ-ACK codebook the UE had to transmit in the previous SF in addition to a HARQ-ACK codebook, when any, the UE has to transmit in the SF, and according to a second hypothesis that the HARQ-ACK codebook includes only HARQ-ACK information, when any, the UE has to transmit in the SF. This implies that the eNB performs two decoding operations for a data TB in the PUSCH; one decoding operation according to a first RE mapping for a hypothesis that the UE multiplexes a HARQ-ACK codebook the UE had to transmit in the previous SF, and one decoding operation according to a second RE mapping for a hypothesis that the UE does not multiplex a HARQ-ACK codebook the UE had to transmit in the previous SF.

To enable an eNB to avoid having to perform two decoding operations for a data TB in a PUSCH transmission from a UE, depending on whether or not the UE multiplexes in the PUSCH a HARQ-ACK codebook the UE had to transmit in a previous SF, the UE can separately encode and transmit information about the HARQ-ACK codebook in a SF. For example, using a 1-bit field that is separately transmitted from a HARQ-ACK codebook in a SF, the UE can indicate whether or not the UE multiplexes a HARQ-ACK codebook the UE had to transmit in a previous SF in the PUSCH transmission in the SF. This is similar to the UE transmitting a PUSCH_Tx_ind as it was previously described.

UCI Transmission in Multiple PUSCHs or PUCCHs

For brevity, the following descriptions are with respect to HARQ-ACK information but they are also directly applicable to A-CSI. When a UE needs to perform CCA before transmitting a PUSCH, or a PUCCH when it exists on a UCG cell, and when the UE is scheduled by an eNB for multiple PUSCH transmissions on respective multiple cells in a SF, the UE can multiplex a HARQ-ACK codebook in more than one PUSCH transmissions in the SF in order to improve a probability for transmission of the HARQ-ACK codebook. A number of PUSCH transmissions in a SF for a UE to multiplex a HARQ-ACK codebook can be configured to the UE by an eNB or can include all PUSCH transmission from the UE in the SF. Similar, in case a UE is scheduled for PUSCH transmissions over multiple respective SFs on a cell, the UE can multiplex a HARQ-ACK codebook in each of the multiple PUSCH transmissions in order to improve a probability that a CCA succeeds in at least one of the multiple SFs and the UE transmits the PUSCH with the multiplexed HARQ-ACK codebook. Moreover, in case a UE has different HARQ-ACK codebooks to transmit in different SFs, the UE can jointly encode the HARQ-ACK codebooks the UE had to transmit in earlier SFs with a HARQ-ACK codebook, when any, in a later SF for transmission in the later SF in case the UE failed CCA tests in the respective earlier SFs.

To reduce an overhead associated with replicating multiplexing of a HARQ-ACK codebook over multiple PUSCH transmission either across multiple cells in a same SF or across multiple SFs or across both multiple cells and multiple SFs, or both, an eNB can configure a UE different $\beta_{PUSCH}^{HARQ-ACK}$ values (also described in REF 2 and REF 3) for use when the UE multiplexes a HARQ-ACK codebook in a respective different number of PUSCH transmissions. For example, the eNB can configure a first $\beta_{PUSCH}^{HARQ-ACK}$ value for use when the UE is scheduled to multiplex a HARQ-ACK codebook in one PUSCH transmission and configure a second $\beta_{PUSCH}^{HARQ-ACK}$ value when the UE is scheduled to multiplex the HARQ-ACK codebook in more than one PUSCH transmission. The eNB can configure a set of $\beta_{PUSCH}^{HARQ-ACK}$ values and indicate to the UE one $\beta_{PUSCH}^{HARQ-ACK}$ value from the set of $\beta_{PUSCH}^{HARQ-ACK}$ values through a field in an UL DCI format scheduling a PUSCH transmission. For example, the eNB can configure a UE with two $\beta_{PUSCH}^{HARQ-ACK}$ values and use a field that includes one binary element in an DCI format scheduling a PUSCH transmission to indicate use of a first $\beta_{PUSCH}^{HARQ-ACK}$ value when the UE is scheduled to multiplex a HARQ-ACK codebook in one PUSCH transmission and indicate use of a second $\beta_{PUSCH}^{HARQ-ACK}$ value when the UE is scheduled to multiplex the HARQ-ACK codebook in more than one PUSCH transmissions. For example, when an eNB schedules a single PUSCH transmission to a UE, the eNB can indicate a maximum $\beta_{PUSCH}^{HARQ-ACK}$ value from a set of configured $\beta_{PUSCH}^{HARQ-ACK}$ values while when the eNB schedules three PUSCH transmissions to the UE, the eNB can indicate a $\beta_{PUSCH}^{HARQ-ACK}$ value that can result to a target HARQ-ACK codeword BLER when the UE transmits at least two from the three scheduled PUSCH transmissions.

Figure 30:
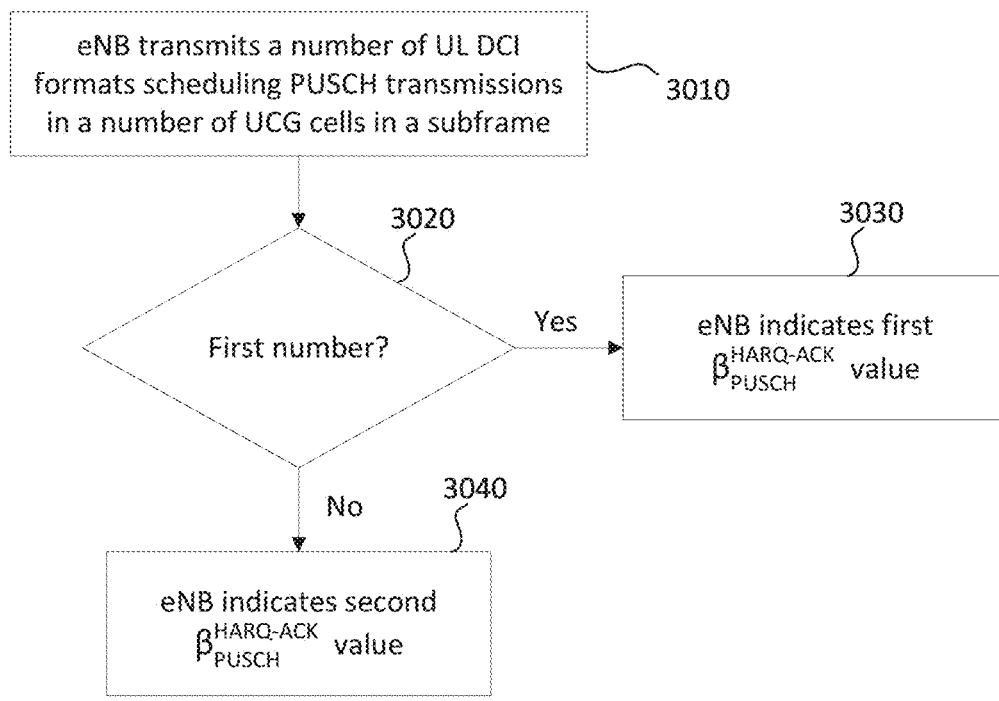
FIG. 30 illustrates a use of a $\beta_{PUSCH}^{HARQ\text{-}ACK}$ value for determining resources for multiplexing a HARQ-ACK codebook in a number of scheduled PUSCH transmissions depending on the number of scheduled PUSCH transmission according to this disclosure.

FIG. 30 illustrates a use of a $\beta_{PUSCH}^{HARQ-ACK}$ value for determining resources for multiplexing a HARQ-ACK codebook in a number of scheduled PUSCH transmissions depending on the number of scheduled PUSCH transmission according to this disclosure. The embodiment shown in FIG. 30 is for illustration only. Other embodiments could be used without departing from the scope of the present disclosure.

Dropped Transmission of HARQ-ACK Codebook or Erroneously Detected HARQ-ACK Codebook An eNB cannot be generally assumed to be able to detect an absence of a PUSCH transmission on a UCG cell, especially with accuracy of 99% or better, at least because there can be a transmission from another device, including an LTE UE associated with a different operator, on the UCG cell. Consequences from an inability of a UE to transmit a PUSCH with multiplexed HARQ-ACK codebook on a UCG cell due a CCA failure can vary depending on a coding method for the HARQ-ACK codebook. When TBCC with CRC is used for encoding the HARQ-ACK codebook, the CRC check is expected to fail as no HARQ-ACK codebook is transmitted. Then, a consequence is that the eNB retransmits all associated PDCCHs/PDSCHs. When a Reed-Muller code is used for HARQ-ACK encoding, a consequence can be more damaging as there is no CRC protection and the eNB can make several HARQ-ACK errors leading to dropped data TBs, for example when a NACK is interpreted as ACK, and requiring higher layer ARQ assistance. When repetition coding is used for HARQ-ACK encoding, the eNB can in principle detect an absence of a HARQ-ACK codebook. Therefore, a consequence from a CCA failure for a PUSCH transmission is at least a DL throughput loss due to PDCCH retransmissions and PDSCH retransmissions for the data TBs that the UE failed to provide a HARQ-ACK codebook.

To enable an eNB avoid unnecessary retransmissions of PDCCHs and PDSCHs due to a UE inability to transmit a PUSCH with a multiplexed HARQ-ACK codebook, the UE can transmit information, referred to as PUSCH_Tx_ind, to indicate whether or not the UE transmits PUSCH in a SF and assist the eNB in determining a presence or absence of a PUSCH transmission. A PUSCH_Tx_ind transmission can be further conditioned on a UE detecting an UL DCI format scheduling a PUSCH transmission on a UCG cell.

In a first approach, a PUSCH_Tx_ind is a sequence of binary elements that a UE multiplexes in a PUSCH transmission. A length of the sequence can be determined in a same manner as a number of REs used to multiplex a HARQ-ACK codebook of one binary element in a PUSCH based on an offset $\beta_{PUSCH}^{IND}$ that an eNB configures to the UE and based on the MCS for the data TB. The sequence can be a series of 1 values or −1 values, similar to a UE transmitting a NACK or an ACK, respectively, or a series of alternating 1 values and −1 values on, in general, a predefined pattern of 1s and −1s. The eNB can determine whether or not the UE transmits a PUSCH in a SF by determining whether or not the UE transmits a PUSCH_Tx_ind for example by the eNB determining whether or not the eNB detects a respective sequence pattern. When a UE does not transmit a PUSCH in a SF and other devices transmit in PUSCH resources in the SF, the length of the PUSCH_Tx_ind sequence can be configured to be long enough so that a probability for incorrectly determining presence or absence of the sequence is sufficiently small such as below 0.01. The first approach is particularly applicable when a UE does not multiplex a HARQ-ACK codebook in a PUSCH.

Figure 31:
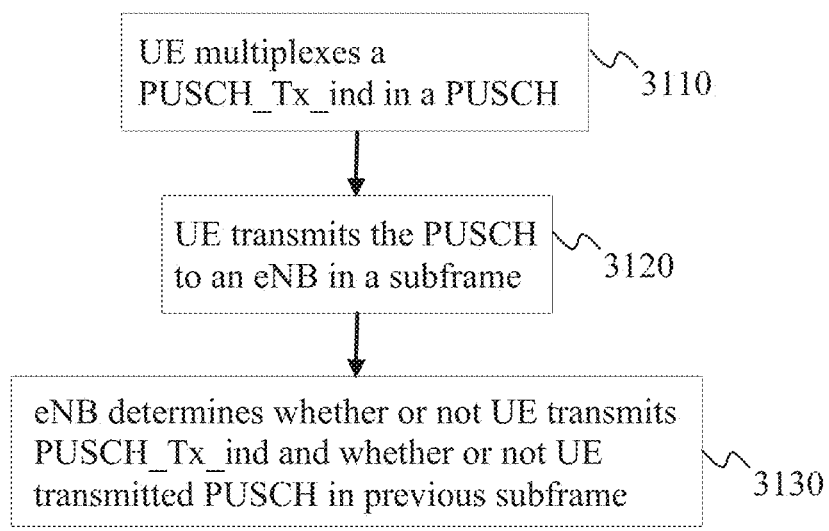
FIG. 31 illustrates a multiplexing of a PUSCH_Tx_ind in a PUSCH transmission according to this disclosure.

FIG. 31 illustrates a multiplexing of a PUSCH_Tx_ind in a PUSCH transmission according to this disclosure. The embodiment shown in FIG. 31 is for illustration only. Other embodiments could be used without departing from the scope of the present disclosure.

A UE multiplexes a PUSCH_Tx_ind information in a PUSCH 3110. The UE transmits the PUSCH in a SF 3120. The PUSCH_Tx_ind information is a binary element indicating whether or not the UE was able to transmit a PUSCH on a UCG cell in a previous SF. The multiplexing of the PUSCH_Tx_ind information can be conditioned on the UE having a multiplexed HARQ-ACK codeword in the PUSCH transmission in the previous SF. The eNB detects whether or not the UE transmits the PUSCH_Tx_ind in the SF (and the eNB can implicitly determine whether or not the UE succeeded a CCA) and from the PUSCH_Tx_ind the eNB can determine whether or not the UE transmitted a PUSCH in the previous SF 3130.

In a second approach, when a UE multiplexes a HARQ-ACK codeword in a PUSCH or in a PUCCH, the UE includes a PUSCH_Tx_ind information of one or more bits in a HARQ-ACK codebook together with HARQ-ACK information, for example before or after the HARQ-ACK information. As for the first approach, the PUSCH_Tx_ind indicates a number of previous PUSCH transmissions with a multiplexed HARQ-ACK codeword that the UE had to drop due to a CCA failure. For example, the PUSCH_Tx_ind can include 1 or 2 binary elements where, in case of 2 binary elements, a mapping for a first value ('00') can indicate there was no PUSCH transmission with a multiplexed HARQ-ACK codeword that was dropped in the previous 3 scheduled PUSCH transmissions with a multiplexed HARQ-ACK codeword, and a mapping for the second, third, and fourth values ('01', '10', and '11' respectively) can indicate there were 1, 2, and 3 PUSCH transmissions with a multiplexed HARQ-ACK codeword that the UE dropped prior to transmitting the current HARQ-ACK codeword.

Figure 32:
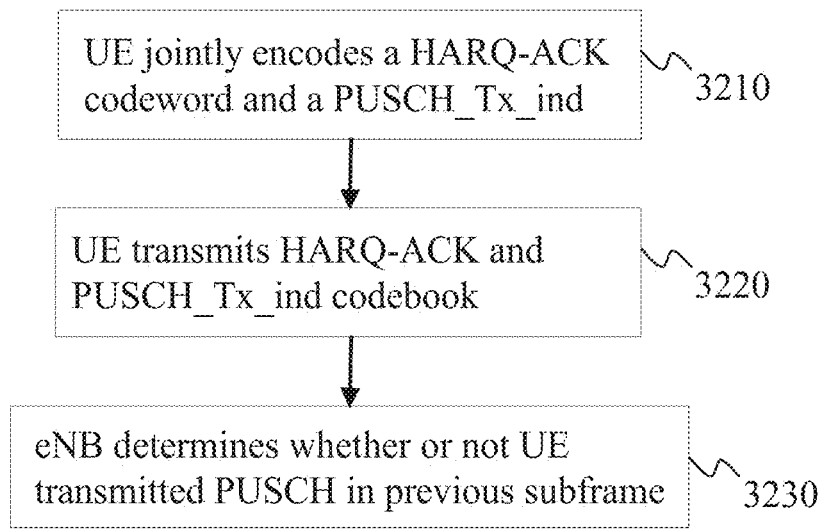
FIG. 32 illustrates a multiplexing of a PUSCH_Tx_ind with HARQ-ACK information in a HARQ-ACK codebook according to this disclosure.

FIG. 32 illustrates a multiplexing of a PUSCH_Tx_ind with HARQ-ACK information in a HARQ-ACK codebook according to this disclosure. The embodiment shown in FIG. 32 is for illustration only. Other embodiments could be used without departing from the scope of the present disclosure.

A UE jointly encodes HARQ-ACK information and a PUSCH_Tx_ind 3210. The UE transmits the HARQ-ACK and PUSCH_Tx_ind codebook 3220. The transmission can be in a PUSCH or in a PUCCH. The eNB detects the HARQ-ACK and PUSCH_Tx_ind codebook and can determine whether or not the UE transmitted a PUSCH in the previous SF when the detection is correct 3230.

In a third approach, when an eNB fails to detect a HARQ-ACK codebook transmitted from a UE, as the eNB determines based on a failed CRC check for a HARQ-ACK codebook that the eNB assumes to receive, the eNB can schedule in a SF the UE to retransmit the HARQ-ACK codebook. The scheduling can be by a DCI format that can have a same size as a DL DCI format or an UL DCI format that the UE decodes in the SF. The DCI format can further include an explicit HARQ-ACK request field or a reserved code-point in the DCI format can serve to indicate an HARQ-ACK request. For example, for an UL DCI format, a value for the CS and OCC field for a DMRS, such as the '111' value, can be reserved to instead indicate a HARQ-ACK request. In a first realization, a UE can determine a HARQ-ACK codebook to transmit due to a detection of HARQ-ACK request from a unique time relationship to a SF where the UE detects a DCI format conveying the HARQ-ACK request. For example, when the UE detects the DCI format with HARQ-ACK request in SF n, the UE transmits a HARQ-ACK codebook that the UE was scheduled to transmit (or that the UE transmitted) in a first SF prior to, for example, SF n−3. In a second realization, a UE can determine a HARQ-ACK codebook to transmit due to a detection of HARQ-ACK request in a DCI format the UE detects from a field in the DCI format that explicitly indicates a SF from a number of previous SFs where the UE was scheduled to transmit (or transmitted) the HARQ-ACK codebook. For example, a 4-bit field in a DCI format a UE detects in SF n can indicate one of 16 previous SFs starting from a predetermined SF such as, for example, SF n−2. For example, a 4-bit field in a DCI format a UE detects in SF n can be a bit-map indicating up to 4 of the previous 4 SFs starting from a predetermined SF such as, for example, subframe n−2, where the UE was schedule to transmit (or transmitted) a HARQ-ACK codebook. In case the DCI format schedules only transmission of a HARQ-ACK codebook, the 4-bit field can use same elements as a HARQ process number of 4 bits that indicates a HARQ process number in case the DCI format schedules a PUSCH transmission. When a UE is scheduled to multiplex a first HARQ-ACK codebook in a PUSCH transmission or a PUCCH transmission and the UE also detects a DCI format with a HARQ-ACK request for a previous second HARQ-ACK codebook, the UE can jointly encode the first and second HARQ-ACK codebooks and transmit the encoded joined HARQ-ACK codebook. Alternatively, at least when a size of a joint HARQ-ACK codebook is larger than a predetermined threshold, the UE can separately encode the first HARQ-ACK codebook and the second HARQ-ACK codebook.

Figure 33:
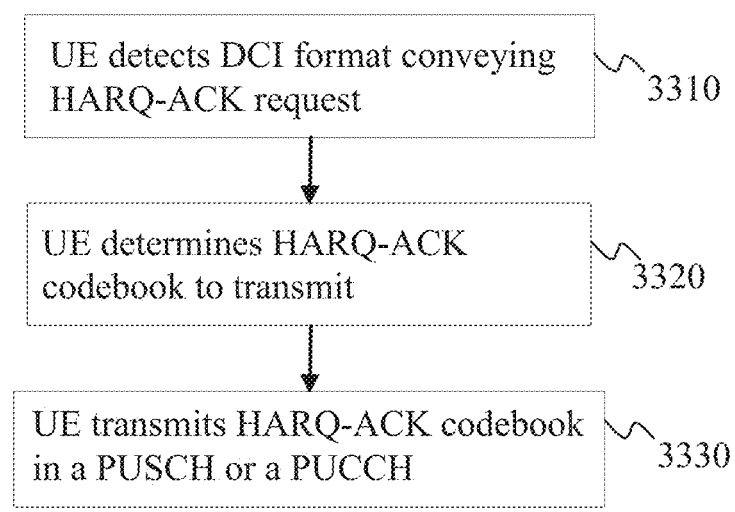
FIG. 33 illustrates a transmission of a HARQ-ACK codebook by a UE in response to a detection of a DCI format conveying a HARQ-ACK request according to this disclosure.

FIG. 33 illustrates a transmission of a HARQ-ACK codebook by a UE in response to a detection of a DCI format conveying a HARQ-ACK request according to this disclosure. The embodiment shown in FIG. 33 is for illustration only. Other embodiments could be used without departing from the scope of the present disclosure.

A UE detects a DCI format conveying a HARQ-ACK request in SF n 3310. Based either on a predetermined timing relative to SF n or on an explicit indication in the DCI format, the UE determines a HARQ-ACK codebook to transmit in a PUSCH or PUCCH with transmission parameters scheduled by the DCI format 3320. The UE transmits the PUSCH or the PUCCH including the HARQ-ACK codebook 3330.

Figure 34:
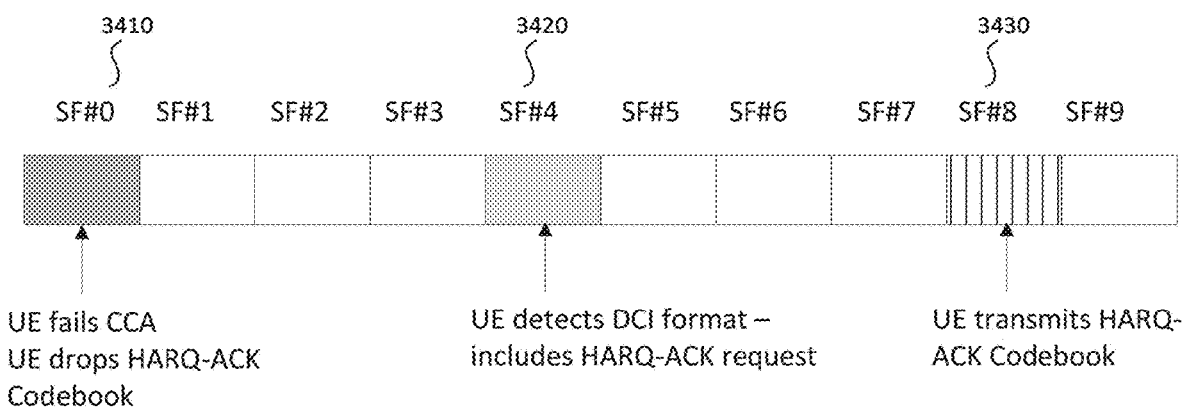
FIG. 34 illustrates an example timeline for a transmission of a HARQ-ACK codebook by a UE according to this disclosure.

FIG. 34 illustrates an example timeline for a transmission of a HARQ-ACK codebook by a UE according to this disclosure. The embodiment shown in FIG. 34 is for illustration only. Other embodiments could be used without departing from the scope of the present disclosure.

A UE is scheduled to transmit a HARQ-ACK codebook to an eNB in a first SF on a cell. The UE fails a CCA test and drops the transmission of the HARQ-ACK codebook 3410. The eNB determines an incorrect reception or an absence of reception for the HARQ-ACK codebook and transmits a DCI format to the UE that includes a HARQ-ACK request and the UE detects the DCI format in a second SF on a same cell or on a different cell 3420. The UE transmits the HARQ-ACK codebook to the eNB in a third SF in a PUSCH or in a PUCCH 3430. Although the first, second, and third SFs are shown to be separated by four SFs, this is only for illustrative purposes and other time separation for the three SFs can also apply, for example depending on an availability for a respective cell.

In a fourth approach, similar to the third approach, a HARQ-ACK codeword transmission is triggered by a DCI format, but the DCI format indicates HARQ-ACK information the UE generates for a number of SFs and not only for a single DL SF. For a number of HARQ processes, such as 16 HARQ processes, and for a number of cells where the UE is configured to receive PDSCH transmissions, such as 20 cells, the DCI format can indicate to the UE to report HARQ-ACK information for a subset of the HARQ processes or for a subset of cells. The fourth approach is beneficial for reducing a number of PUSCH transmissions required to convey HARQ-ACK information, as a PUSCH transmission does not need to be scheduled in each SF, and HARQ-ACK information for several SFs can be included in a HARQ-ACK codeword transmitted in a single PUSCH. The fourth approach is also beneficial for controlling a number of HARQ-ACK information bits transmitted in a PUSCH and in this manner ensure that coverage can be provided for a particular UE. It can also enable transmission of HARQ-ACK information that was incorrectly received in a previous SF, with new HARQ-ACK information as it was also described for the third approach. This largely removes a requirement from an eNB to determine whether or not a UE actually transmitted a PUSCH conveying the HARQ-ACK codeword as the outcome of incorrect HARQ-ACK codeword detection (as determined from an incorrect CRC check) is same in both cases.

For example, a field that includes 2 bits in a DCI format can indicate to the UE to transmit a HARQ-ACK codeword in a PUSCH that includes HARQ-ACK information for the first four HARQ process when a binary value for the field is '00', and for the second, third, or fourth four HARQ processes when a binary value for the field is respectively '01, '10', or '11'. For example, a field that includes 3 bits in a DCI format can indicate to the UE to transmit a HARQ-ACK codeword in a PUSCH that includes HARQ-ACK information for the first, second, third, or fourth, four HARQ process when a binary value for the field is respectively '000', '001', '010', and '011', or that includes HARQ-ACK information for the first and second, first and third, first and fourth, second and third, second and fourth, or third and fourth, four HARQ process when a binary value for the field is respectively '100', '101', '110', and '111'.

For example, the cells can be divided by a configuration from an eNB into a number of groups, such as four cell groups that include the first, second, third, or fourth 5 cells from the 20 cells, respectively, and a DCI format transmitted to a UE can include a field indicating groups of cells for the UE to report HARQ-ACK information in a PUSCH transmission. For example, a field that includes 2 bits can indicate the first, second, third, or fourth group of cells using respective values of '00', '01', '10', and '11' or a field that includes 3 bits can indicate the first, second, third, fourth, first and second, first and third, first and fourth, second and third, second and fourth, or third and fourth groups of cells using respective values of '000', '001', '010', '011', '100', '101', '110', '111'.

In case of multi-SF PUSCH scheduling, a field in a respective DCI format can indicate to a UE a HARQ-ACK codeword to be transmitted in a first SF. The UE can transmit in remaining SFs additional HARQ-ACK codewords in a predetermined order. For example, in case the DCI format indicates transmission of HARQ-ACK information for the second four HARQ processes in a PUSCH and schedules PUSCH transmissions over four SFs, the UE transmits HARQ-ACK information for the second, third, fourth, and first HARQ processes in the first, second, third, and fourth SFs, respectively. For example, in case a UE is scheduled PUSCH transmissions over two SFs and is triggered transmission of HARQ-ACK information, the UE can multiplex HARQ-ACK information for a first group of cells in a transmission in a first SF and multiplex HARQ-ACK information for a second group of cells in a transmission in a second SF.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A user equipment (UE), comprising:
a transceiver configured to receive:
first transport blocks (TBs) in first physical downlink shared channels (PDSCHs) that are scheduled by first downlink control information (DCI) formats in first physical downlink control channels (PDCCHs), and
second TBs in second PDSCHs that are scheduled by second DCI formats in second PDCCHs, wherein a DCI format from the second DCI formats includes a hybrid automatic repeat request acknowledgement (HARQ-ACK) request field; and
a processor operably coupled to the transceiver, the processor configured to determine whether the HARQ-ACK request field has a first value indicating that only second HARQ-ACK bits should be reported or a second value indicating that both first HARQ-ACK bits and the second HARQ-ACK bits should be reported,
wherein the transceiver is further configured to transmit a first physical uplink control channel (PUCCH) that includes one of:
only the second HARQ-ACK information bits based on the first value for the HARQ-ACK request field, and
both the first HARQ-ACK information bits and the second HARQ-ACK information bits based on the second value for the HARQ-ACK request field, and
wherein:
the first HARQ-ACK information bits are in response to transmission of the first TBs, and
the second HARQ-ACK information bits are in response to the transmission of the second TBs.

2. The UE of claim 1, wherein the DCI format includes a field that indicates the second HARQ-ACK information bits associated with the second PDSCHs.

3. The UE of claim 1, wherein the processor is further configured to determine an order of:
the first HARQ-ACK information bits based on a counter downlink assignment index (DAI) field in each of the first DCI formats that counts only the first DCI formats, and
the second HARQ-ACK information bits based on a counter DAI field in each of the second DCI formats that counts only the second DCI formats.

4. The UE of claim 1, wherein the transceiver is further configured to jointly encode the first HARQ-ACK information bits and the second HARQ-ACK information bits.

5. The UE of claim 1, wherein:
the processor is further configured to determine:
a first transmission time for the first PUCCH, and
a second transmission time for a second PUCCH; and
the transceiver is further configured to transmit:
the first PUCCH during the first transmission time, and
the second PUCCH during the second transmission time, wherein the second PUCCH includes the second HARQ-ACK information bits.

6. The UE of claim 5, wherein the second transmission time starts before the first transmission time.

7. The UE of claim 1, wherein:
the processor is further configured to determine an indication to the transceiver to suspend transmission of a second PUCCH that includes the second HARQ-ACK information bits based on a condition; and
the transceiver is further configured to suspend transmission of the second PUCCH based on the indication.

8. A base station, comprising:
a transceiver configured to transmit:
first transport blocks (TBs) in first physical downlink shared channels (PDSCHs) that are scheduled by first downlink control information (DCI) formats in first physical downlink control channels (PDCCHs), and
second TBs in second PDSCHs that are scheduled by second DCI formats in second PDCCHs, wherein a DCI format from the second DCI formats includes a hybrid automatic repeat request acknowledgement (HARQ-ACK) request field,
wherein the transceiver is further configured to receive a first physical uplink control channel (PUCCH) that includes one of:
only second HARQ-ACK information bits based on a first value for the HARQ-ACK request field, the first value indicating that only the second HARQ-ACK bits should be reported, and
both first HARQ-ACK information bits and the second HARQ-ACK information bits based on a second value for the HARQ-ACK request field, the second value indicating that both the first HARQ-ACK bits and the second HARQ-ACK bits should be reported, and
wherein:
the first HARQ-ACK information bits are in response to transmission of the first TBs, and
the second HARQ-ACK information bits are in response to the transmission of the second TBs.

9. The base station of claim 8, wherein the DCI format includes a field that indicates the second HARQ-ACK information bits associated with the second PDSCHs.

10. The base station of claim 8, wherein:
the first HARQ-ACK information bits are ordered based on a counter downlink assignment index (DAI) field in each of the first DCI formats that counts only the first DCI formats, and
the second HARQ-ACK information bits are ordered based on a counter DAI field in each of the second DCI formats that counts only the second DCI formats.

11. The base station of claim 8, wherein the transceiver is further configured to jointly decode the first HARQ-ACK information bits and the second HARQ-ACK information bits.

12. The base station of claim 8, wherein the transceiver is further configured to receive:
the first PUCCH during a first reception time, and
a second PUCCH during a second reception time, wherein the second PUCCH includes the second HARQ-ACK information bits.

13. The base station of claim 12, wherein the second reception time starts before the first reception time.

14. A method for transmitting hybrid automatic repeat request acknowledgement (HARQ-ACK) information bits, the method comprising:
receiving:
first transport blocks (TBs) in first physical downlink shared channels (PDSCHs) that are scheduled by first downlink control information (DCI) formats in first physical downlink control channels (PDCCHs), and
second TBs in second PDSCHs that are scheduled by second DCI formats in second PDCCHs, wherein a DCI format from the second DCI formats includes a hybrid automatic repeat request acknowledgement (HARQ-ACK) request field;
determining whether the HARQ-ACK request field has a first value indicating that only second HARQ-ACK bits should be reported or a second value indicating that both first HARQ-ACK bits and the second HARQ-ACK bits should be reported; and
transmitting a first physical uplink control channel (PUCCH) that includes one of:
only the second HARQ-ACK information bits based on the first value for the HARQ-ACK request field, and
both the first HARQ-ACK information bits and the second HARQ-ACK information bits based on the second value for the HARQ-ACK request field,
wherein:
the first HARQ-ACK information bits are in response to transmission of the first TBs, and
the second HARQ-ACK information bits are in response to the transmission of the second TBs.

15. The method of claim 14, wherein the DCI format includes a field that indicates the second HARQ-ACK information bits associated with the second PDSCHs.

16. The method of claim 14, further comprising determining an order of:
- the first HARQ-ACK information bits based on a counter downlink assignment index (DAI) field in each of the first DCI formats that counts only the first DCI formats, and
- the second HARQ-ACK information bits based on a counter DAI field in each of the second DCI formats that counts only the second DCI formats.

17. The method of claim 14, further comprising encoding jointly the first HARQ-ACK information bits and the second HARQ-ACK information bits.

18. The method of claim 14, further comprising:
determining:
- a first transmission time for the first PUCCH, and
- a second transmission time for a second PUCCH; and transmitting:
- the first PUCCH during the first transmission time, and
- the second PUCCH during the second transmission time, wherein the second PUCCH includes the second HARQ-ACK information bits.

19. The method of claim 18, wherein the second transmission time starts before the first transmission time.

20. The method of claim 14, further comprising:
determining to suspend transmission of a second PUCCH that includes the second HARQ-ACK information bits based on a condition; and
suspending transmission of the second PUCCH.

\* \* \* \* \*